(12) United States Patent
Chappaz

(10) Patent No.: US 7,054,392 B2
(45) Date of Patent: May 30, 2006

(54) PROCESS AND DEVICE FOR ESTIMATING THE SUCCESSIVE VALUES OF DIGITAL SYMBOLS, IN PARTICULAR FOR THE EQUALIZATION OF AN INFORMATION TRANSMISSION CHANNEL IN MOBILE TELEPHONY

(75) Inventor: David Chappaz, Saint Julien en Genevois (FR)

(73) Assignee: STMicroelectronics N.V., Amsterdam (NL)

( * ) Notice: Subject to any disclaimer, the term of this patent is extended or adjusted under 35 U.S.C. 154(b) by 792 days.

(21) Appl. No.: 10/006,995

(22) Filed: Dec. 3, 2001

(65) Prior Publication Data

US 2002/0126775 A1    Sep. 12, 2002

(30) Foreign Application Priority Data

Dec. 4, 2000  (EP) .................................. 00125395
May 29, 2001  (EP) .................................. 01112095

(51) Int. Cl.
*H03D 1/00*  (2006.01)
*H04L 27/06*  (2006.01)

(52) U.S. Cl. ...................... 375/341; 375/262; 375/265; 714/792; 714/795; 714/796

(58) Field of Classification Search ........ 375/229–233, 375/262, 265, 285, 227, 341, 346, 350; 708/300, 708/319–323; 714/792, 795, 796
See application file for complete search history.

(56) References Cited

U.S. PATENT DOCUMENTS

| 5,144,644 | A | 9/1992 | Borth ........................... 375/96 |
| 5,375,129 | A | 12/1994 | Cooper ........................ 371/43 |
| 6,347,125 | B1 * | 2/2002 | Dent ............................ 375/341 |
| 6,622,283 | B1 * | 9/2003 | Cohen ........................ 714/794 |
| 6,707,849 | B1 * | 3/2004 | Zangi et al. ................. 375/233 |
| 6,829,297 | B1 * | 12/2004 | Xia et al. .................... 375/232 |

FOREIGN PATENT DOCUMENTS

EP     0858196     8/1998

OTHER PUBLICATIONS

Mueller et al., "Reduced-State Soft-Output Trellis-Equalization Incorporating Soft Feedback", Global Telecommunications Conference (Globecom), US, New York, IEEE, Nov. 18, 1996, pp. 95-100, XP000742133.

* cited by examiner

*Primary Examiner*—Jean B. Corrielus
(74) *Attorney, Agent, or Firm*—Lisa K. Jorgenson; Allem, Dyer, Doppelt, Milbrath & Gilchrist, P.A.

(57) ABSTRACT

A process for estimating successive values of digital symbols which can each take M different possible values, on the basis of the successive values of digital samples each of which results from the combination of at most L successive symbols. This process includes a stage by stage progression through a trellis of the Viterbi type with $M^k$ states, with k being less than or equal to L−1. All the stages are respectively provided with aggregate metrics.

60 Claims, 31 Drawing Sheets

PROCESS AND DEVICE FOR ESTIMATING THE SUCCESSIVE VALUES OF DIGITAL SYMBOLS, IN PARTICULAR FOR THE EQUALIZATION OF AN INFORMATION TRANSMISSION CHANNEL IN MOBILE TELEPHONY

FIELD OF THE INVENTION

The invention relates to the estimation of the successive values of digital symbols which can each take M different possible values. The invention applies advantageously but not exclusively to the equalization of an information transmission channel. The transmission channel may be, for example, in the cellular mobile telephone field, such as that provided for in the Global System for Mobile Communications (GSM) system.

BACKGROUND OF THE INVENTION

A transmission channel conveys information from a sender to a receiver via propagation. Propagation can be air in the case of cellular mobile telephones, or any other means of propagation such as a cable, for example, in other applications.

A fundamental factor limiting the performance of a digital communication system is the phenomenon known as inter-symbol interference, which is well known to the person skilled in the art. Inter-symbol interference causes at the receiver level a tempory occupation of each symbol (e.g., bit) transmitted, which is longer than the initial duration of the symbol. The symbol may also be referred to as the bit time, for example.

Stated otherwise, the signal received at a given instant does not depend on one symbol alone (e.g., a bit), but also on the other bits or symbols sent which extend over durations greater than those of a bit time. The signal received at a given instant depends on the symbols concerned, and also on the adjacent symbols.

The causes of inter-symbol interference are multifold. One of them is due in particular to the multiple propagations of the signal between the sender and the receiver when the signal is reflected or diffracted by various obstacles, leading, on reception, to several signal copies mutually shifted in time. Moreover, this interference between symbols is produced not only by the propagation between the sender and the receiver, but also by the sending/receiving devices themselves (i.e., modulator, filter, etc.).

During communications with interference between symbols, the problem arises of estimating the impulse response of the transmission channel. The quality of this estimate depends on the capacity to eliminate the interference between symbols, and hence to take correct decisions regarding symbols sent.

Generally, the estimate of the impulse response of the channel, or more simply the channel estimate, is effected within the GSM telephone domain by using least squares techniques, and by using a predetermined sequence of symbols known to the sender and to the receiver. This is referred to by the person skilled in the art by the term training sequence. This training sequence is present within each symbol train or burst sent. When the characteristics of the channel are sufficiently well estimated, the estimated coefficients of the impulse response of the channel are used in an equalization processing operation, also well known to the person skilled in the art, to decode the signal received that is, to retrieve the logic values of the bits (data) sent in the train.

The equalization processing operation is conventionally followed by channel decoding processing operations intended for correcting any errors. The channel decoding is itself conventionally followed by another decoding operation called source decoding, which is intended for reconstructing the information (e.g., speech) initially coded at the level of the sender.

At the level of the receiver, a signal is received that comprises versions of the signal sent which are temporarily delayed with gains that may be different. The channel equalization processing includes reversing the effect of the channel to obtain samples representative of a single symbol. The Viterbi algorithm forms part of the conventional processing operations well known to the person skilled in the art for equalizing the channel during transmissions with inter-symbol interference.

More precisely, when the transmission channel has an impulse response with L coefficients for example, and delivers successive digital samples corresponding to successively transmitted symbols each of which can take M different possible values, the estimation of the successive values of the symbols by using the Viterbi algorithm comprises a stage-by-stage progression through a trellis. All the states of all the stages are respectively provided with "aggregate metrics" according to a terminology well known to the person skilled in the art. These aggregate metrics are, for example, error information aggregated (e.g., calculated with the aid of a Euclidean norm) between the observed values and the expected values of the samples. This is on the basis of an assumption regarding the values of the symbols.

In a conventional implementation, the number of states of the trellis is equal to $M^{L-1}$, with M denoting the number of different possible values each of the symbols can take. In step n, that is to say on taking into account the sample of rank n, we take $M^{L-1}$ decisions regarding the symbol of rank n−L+1. This is based upon that ultimately only one decision will have to be produced. This decision is obtained by backtracking through the most probable path. Each of these decisions, also commonly designated by the person skilled in the art as a hard decision, is provided with a symbol-confidence index or confidence.

Furthermore, at each node or state of the stage of rank n, M paths or transitions converge, respectively arising from M states or nodes of the preceding stage, and corresponding to the M different values of the symbol of rank n−L+1. The so-called surviving path, according to terminology known to the person skilled in the art, allows progression through the trellis from one stage to another and is chosen as having the minimum aggregate metric.

After a sufficiently long delay, typically a delay corresponding to 5L samples, all the surviving sequences are assumed to take the same hard decision with a high probability. A decision is then taken regarding the symbol of rank n−5L−(L−1). More precisely, to ascertain the hard decision and the symbol-confidence index associated with this decision, we backtrack through the path having the minimum aggregate metric.

Apart from the fact that such estimation processing makes it possible to obtain decisions regarding the symbols with a relatively large delay, it is necessary to store, during this time span, all the intermediate hard decisions along the various surviving paths or all the associated confidence indices. This is done to ultimately retrieve with regard to the symbol of rank n−5L−(L−1) its value and its symbol-confident index. This information is stored in two arrays, one of symbols and the other of symbol-confidence indices, which each including $M^{L-1}$ rows and 5L columns. When the modulation is a high order, i.e., when M is large, this size is even larger.

SUMMARY OF THE INVENTION

In view of the foregoing background, an object of the present invention is to provide an estimation which makes it possible to take hard decisions more rapidly and which requires very little memory, as compared with the memory size required in the prior art, for the formulation of the decisions and the symbol-confidence indices corresponding to these decisions.

Another object of the present invention is to formulate bit-confidence indices associated with the various bits of the symbols.

The invention therefore provides a process for estimating successive values of digital symbols which can each take M different possible values, on the basis of the successive values of digital samples each of which results from the combination of at most L successive symbols. This process comprises a stage-by-stage progression through a trellis of the Viterbi type with $M^k$ states, with k being less than or equal to L−1. All the stages are respectively provided with aggregate metrics.

According to a general characteristic of the invention, when taking into account the sample of rank n, all the transitions arriving at the various states of the current stage of the trellis are partitioned into M groups, with each group containing all the transitions arising from the states of the preceding stage which are associated with one of the M possible values of the symbol of rank n−k. The various aggregate metrics are calculated for these various states of the current stage of the trellis. A transition which leads to the state provided with a extremum aggregate metric is determined in each group. Also, a unique decision is taken regarding the value of the symbol of rank n−k by detecting the group associated with the extremum of these M extremum aggregate metrics. This unique decision is provided with a symbol-confidence index formulated from these M extremum aggregate metrics.

The invention applies advantageously but not limitingly to the equalization of an information transmission channel. For such an application, the number L then also denotes the number of coefficients of the impulse response of the transmission channel. The transmission channel delivers successive digital samples corresponding to successively transmitted symbols each of which can take M different possible values. Here again, in a manner similar to what was mentioned above according to the invention, on receipt of the sample of rank n, all the transitions arriving at the various states of the current stage of the trellis of the Viterbi type are partitioned into M groups. Also, the same elementary processing operations as those just mentioned are performed to take a unique decision regarding the value of the symbol of rank n−k and to formulate a symbol-confidence index assigned to this unique decision. The invention applies to a complete trellis (k=L−1) or to a reduced trellis (k<L−1).

The aggregate metrics may be error information aggregated between the observed values and the expected values of the samples. This may be on the basis of an assumption regarding the values of the symbols. In this case, according to a mode of implementation of the process according to the invention, in each group one of the transitions which leads to the state provided with a minimum aggregate metric is determined. Also, a unique decision is taken regarding the value of the symbol of rank n−k by detecting the group associated with the smallest of these M minimum aggregate metrics. The unique decision is provided with a symbol-confidence index formulated from these M minimum aggregate metrics.

When the number M is equal to 2, that is, when binary modulation is involved, the detection of the group associated with the smaller of the two minimum aggregate metrics comprises the calculation of the difference between the two minimum aggregate metrics. The sign of this difference then yields the unique decision regarding the value of the symbol of rank n−k. The absolute value of this difference yields the value of the symbol-confidence index.

In the case where M is greater than 2, for example, for 4PSK or 8PSK modulation, the detection of the group associated with the smallest of the M minimum aggregate metrics comprises a first selection of the smallest of these M minimum aggregate metrics. The formulation of the symbol-confidence index assigned to the unique decision comprises a second selection, from among the M−1 remaining minimum aggregate metrics not selected on completion of the first selection, of the smallest of these M−1 remaining minimum aggregate metrics, and the calculation of the difference between the two minimum aggregate metrics arising respectively from the first and from the second selections. The positive value of this difference yields the value of the symbol-confidence index.

As a variation, the aggregate metrics may be resemblance information aggregated between the observed values and the expected values of the samples. This may be on the basis of an assumption regarding the values of the symbols. In such a case, according to one implementation of the invention, in each group one of the transitions which leads to the state provided with a maximum aggregate metric is determined, and a unique decision is taken regarding the value of the symbol of rank n−k by detecting the group associated with the largest of these M maximum aggregate metrics. This unique decision is provided with a symbol-confidence index formulated from these M maximum aggregate metrics.

When M is equal to 2, the decision of the group associated with the larger of the two maximum aggregate metrics comprises the calculation of the difference between the two maximum aggregate metrics. The sign of this difference yields the unique decision regarding the value of the symbol of rank n−k. The absolute value of this difference yields the value of the symbol-confidence index.

According to a mode of implementation, when M is greater than 2, the detection of the group associated with the largest of the M maximum aggregate metrics comprises a first selection of the largest of these M maximum aggregate metrics. The formulation of the symbol-confidence index assigned to the unique decision comprises a second selection, from among the M−1 remaining maximum aggregate metrics not selected on completion of the first selection, of the largest of these M−1 remaining maximum aggregate metrics, and the calculation of the difference between the two maximum aggregate metrics arising respectively from the first and from the second selections. The positive value of this difference yields the value of the symbol-confidence index.

As indicated above, one of the objects of the invention is to formulate a bit-confidence index for each of the bits of the symbol of rank n−k elected on completion of the unique decision. More precisely, according to a mode of implementation of the invention, when each symbol is formed of b bits, with M equal to $2^b$, this confidence index is formulated for each of the bits of the symbol of rank n–k elected on completion of the unique decision. This is done by using the elected symbol and at least one auxiliary symbol formulated from the elected symbol by complementing at least the value of the relevant bit.

Several variations are possible for formulating the bit-confidence index for a relevant bit of the elected symbol. According to a first variation, in which the aggregate metrics are error information, this formulation of the bit-confidence index for a relevant bit of the elected symbol comprises the following steps.

A first step formulates a single auxiliary symbol by complementing only the value of the relevant bit while leaving unchanged the values of the other bits of the elected symbol. A second step selects the minimum aggregate metric associated with the group of transitions to which the auxiliary symbol belongs. A third step determines the difference between the minimum aggregate metric associated with the group of transitions to which the elected symbol belongs, and the minimum aggregate metric associated with the group of transitions to which the auxiliary symbol belongs. The result of this difference yields the value of the bit-confidence index.

According to a second variation of the invention, in which the aggregate metrics are error information, the formulation of the bit-confidence index for a relevant bit of the elected symbol comprises the following steps.

A first step formulates a set of auxiliary symbols by complementing the value of the relevant bit, and by conferring all the possible values on the other bits of the elected symbol respectively. A second step respectively selects the minimum aggregate metrics associated with the groups of transitions to which the auxiliary symbols respectively belong. A third step respectively selects the smallest of the minimum aggregate metrics respectively selected in the second step. A fourth step determines the difference between the minimum aggregate metric associated with the group of transitions to which the elected symbol belongs, and the minimum aggregate metric selected in the third step. The result of this difference yields the value of the bit-confidence index.

According to another variation of the invention, in which the aggregate metrics are resemblance information, the formulation of the bit-confidence index for a relevant bit of the elected symbol comprises the following steps.

A first step formulates a single auxiliary symbol by complementing only the value of the relevant bit while leaving unchanged the values of the other bits of the elected symbol. A second step selects the maximum aggregate metric associated with the group of transitions to which the auxiliary symbol belongs. A third step determines the difference between the maximum aggregate metric associated with the group of transitions to which the auxiliary symbol belongs. The result of this difference yields the value of the bit-confidence index.

According to yet another variation of the invention, in which the aggregate metrics are again resemblance information, the formulation of the bit-confidence index for a relevant bit of the elected symbol comprises the following steps.

A first step formulates a set of auxiliary symbols by complementing the value of the relevant bit, and by conferring all the possible values on the other bits respectively of the elected symbol. A second step respectively selects the maximum aggregate metrics associated with the groups of transitions to which the auxiliary symbols respectively belong. A third step respectively selects the largest of the maximum aggregate metrics in the second step. A fourth step determines the difference between the maximum aggregate metric associated with the group of transitions to which the elected symbol belongs, and the maximum aggregate metric selected in the third step. The result of this difference yields the value of the bit-confidence index.

Another aspect of the invention is to also provide a device for estimating the successive values of digital symbols which can each take M different possible values. This device comprises reception means able to receive successive values of digital samples each of which results from the combination of at most L successive symbols, and estimation means able to estimate the successive values of the symbols by progressing stage-by-stage through a trellis of the Viterbi type having $M^k$ states, with $k \leq L-1$. All the states of all the stages are respectively provided with aggregate metrics.

According to a general characteristic of the invention, the estimation means comprises the following. Partitioning means is able, on taking into account the sample of rank n, to partition all the transitions arriving at the various states of the current stage of the trellis into M groups. Each group contains all the transitions arising from the states of the preceding stage which are associated with one of the M possible values of the symbol of rank n–k. Calculation means is able to calculate for these various states of the current stage of the trellis. Determination means is able to determine in each group one of the transitions which leads to the state provided with the extremum aggregate metric. Decision taking means is able to take a unique decision regarding the value of the symbol of rank n–k by detecting the group associated with the extremum of these M extremum aggregate metrics. First formulation means is able to formulate, from these M extremum aggregate metrics, a symbol-confidence index assigned to this unique decision.

Another aspect of the invention is to also provided a device for equalizing an information transmission channel. The device comprises a memory containing L coefficients representative of the impulse response of the transmission channel, reception means able to receive successive digital samples corresponding to successively transmitted symbols, each of which can take M different possible values, and an equalization block comprising estimation means able to estimate the successive values of the symbols by progressing stage-by-stage through a trellis of the Viterbi type having $M^k$ states, with $k \leq L-1$. All the states of all the stages are respectively provided with aggregate metrics.

According to a general characteristic of the invention, the estimation means comprises the following. Partitioning means is able, on receipt of the sample of rank n, to partition all the transitions arriving at the various states of the corresponding current stage of the trellis into M groups. Each group contains all the transitions arising from the states of the preceding stage which are associated with one of the M possible values of the symbol of rank n–k. Calculation means is able to calculate for these various states of the current stage of the trellis the various aggregate metrics. Determination means is able to determine in each group one of the transitions which leads to the state provided with a extremum aggregate metric. Decision taking means is able to take a unique decision regarding the value of the symbol of rank n–k by detecting the group associated with the extremum of these M extremum aggregate metrics. First formulation means is able to formulate, from these M extremum aggregate metrics, a symbol-confidence index assigned to this unique decision.

According to one embodiment, in which the aggregate metrics are error information aggregated between the observed values and the expected values of the samples (on the basis of an assumption regarding the values of the symbols), the determination means is able to determine in each group one of the transitions which leads to the state provided with a minimum aggregate metric. The decision taking means is able to take a unique decision regarding the value of the symbol of rank n−k by detecting the group associated with the smallest of these M minimum aggregate metrics. The first formulation means is then able to formulate the symbol-confidence index from these M minimum aggregate metrics.

According to another embodiment of the invention, in which M is equal to 2, the decision taking means comprises a subtractor able to calculate the difference between the two minimum aggregate metrics. The sign of this difference yields the unique decision regarding the value of the symbol of rank n−k. The first formulation means comprises the subtractor, and the absolute value of the difference calculated by the subtractor yields the value of the symbol-confidence index.

According to yet another embodiment of the invention, in which M is greater than 2, the decision taking means comprises first selection means able to perform a first selection of the smallest of these M minimum aggregate metrics. The first formulation means comprises second selection means that is able to perform a second selection, from among the M−1 remaining minimum aggregate metrics not selected on completion of the first selection, the smallest of these M−1 remaining minimum aggregate metrics, and a subtractor able to calculate the difference between the two minimum aggregate metrics respectively arising from the first and from the second selections. The positive value of this difference yields the value of the symbol-confidence index.

According to one embodiment of the invention, in which the aggregate metrics are resemblance information aggregated between the observed values and the expected values of the samples (on the basis of an assumption regarding the values of the symbols), the determination means is able to determine in each group one of the transitions which leads to the state provided with a maximum aggregate metric. The decision taking means is able to take a unique decision regarding the value of the symbol of rank n−k by detecting the group associated with the largest of these M extremum aggregate metrics. Also, the first formulation means is able to formulate the symbol-confidence index from these M extremum aggregate metrics.

When M is equal to 2, and the metrics are resemblance information, the decision taking means advantageously comprises a subtractor able to calculate the difference between the two maximum aggregate metrics. The sign of this difference yields the unique decision regarding the value of the symbol of rank n−k. The first formulation means advantageously comprises the subtractor. The absolute value of the difference calculated by the subtractor yields the value of the symbol-confidence index.

According to one embodiment of the invention, when M is greater than 2, and the metrics are resemblance information, the decision taking means comprises first selection means that is able to perform a first selection of the largest of these M maximum aggregate metrics. The first formulation means comprises second selection means that is able to perform a second selection, from among the M−1 remaining maximum aggregate metrics not selected on completion of the first selection, the largest of these M−1 remaining maximum aggregate metrics, and a subtractor able to calculate the difference between the two maximum aggregate metrics respectively arising from the first and from the second selections. The positive value of this difference yields the value of the symbol-confidence index.

According to one embodiment of the invention, in which each symbol is formed of b bits, with M equal to $2^b$, the device comprises second formulation means that is able to formulate a bit-confidence index for each of the bits of the symbol of rank n−k elected on completion of the unique decision. This is done by using the elected symbol and at least one auxiliary symbol formulated from the elected symbol by complementing at least the value of the relevant bit.

According to another embodiment of the invention, compatible with aggregate error information regarded as aggregate metrics, the second formulation means comprises the following. Auxiliary formulation means that is able to formulate a single auxiliary symbol by complementing only the value of the relevant bit while leaving unchanged the values of the other bits of the elected symbol. Auxiliary selection means that is able to select the minimum aggregate metric associated with the group of transitions to which the auxiliary symbol belongs. An auxiliary subtractor is able to form the difference between the minimum aggregate metric associated with the group of transitions to which the elected symbol belongs, and the minimum aggregate metric associated with the group of transitions to which the auxiliary symbol belongs. The result of this difference yields the value of the bit-confidence index.

According to another embodiment of the invention, likewise compatible with aggregate error cues regarded as aggregate metrics, the second formulation means comprises the following. Auxiliary formulation means is able to formulate a set of auxiliary symbols by complementing the value of the relevant bit and by conferring all the possible values on the other bits respectively of the elected symbol. First auxiliary selection means is able to select respectively the minimum aggregate metrics associated with the groups of transitions to which the auxiliary symbols respectively belong. Second auxiliary selection means is able to select the smallest of the minimum aggregate metrics respectively selected by the first auxiliary selection means. An auxiliary subtractor is able to form the difference between the minimum aggregate metric associated with the group of transitions to which the elected symbol belongs, and the minimum aggregate metric selected by the second auxiliary selection means. The result of this difference yields the value of the bit-confidence index.

According to another embodiment of the invention, compatible with aggregate resemblance information regarded as aggregate metrics, the second formulation means comprises the following. Auxiliary formulation means is able to formulate a single auxiliary symbol by complementing only the value of the relevant bit while leaving unchanged the values of the other bits of the elected symbol. Auxiliary selection means is able to select the maximum aggregate metric associated with the group of transitions to which the auxiliary symbol belongs. An auxiliary subtractor is able to form the difference between the maximum aggregate metric associated with the group of transitions to which the elected symbol belongs, and the maximum aggregate metric associated with the group of transitions to which the auxiliary symbol belongs. The result of this difference yields the value of the bit-confidence index.

According to another embodiment of the invention, likewise compatible with aggregate resemblance information regarded as aggregate metrics, the second formulation means comprises the following. Auxiliary formulation means is able to formulate a set of auxiliary symbols by complementing the value of the relevant bit and by conferring all the possible values on the other bits of the elected symbol. First auxiliary selection means is able to select respectively the maximum aggregate metrics associated with the groups of transitions to which the auxiliary symbols respectively belong. Second auxiliary selection means is able to select the largest of the maximum aggregate metrics respectively selected by the first auxiliary selection means. An auxiliary subtractor is able to form the difference between the maximum aggregate metric associated with the group of transitions to which the elected symbol belongs, and the maximum aggregate metric selected by the second auxiliary selection means. The result of this difference yields the value of the bit-confidence index.

Another aspect of the invention is to also provide a digital information receiver, in particular a cellular mobile telephone, incorporating a device as defined above. Yet another aspect of the invention is to also provide a program product recorded on a medium which can be used in a processor, comprising program-code means implementing the process as defined above when the product is executed within a processor.

BRIEF DESCRIPTION OF THE DRAWINGS

Other advantages and characteristics of the invention will become apparent on examining the detailed description of modes of implementation and embodiments, which are in no way limiting, and the appended drawings, in which.

DETAILED DESCRIPTION OF THE PREFERRED EMBODIMENTS

Figure 1:
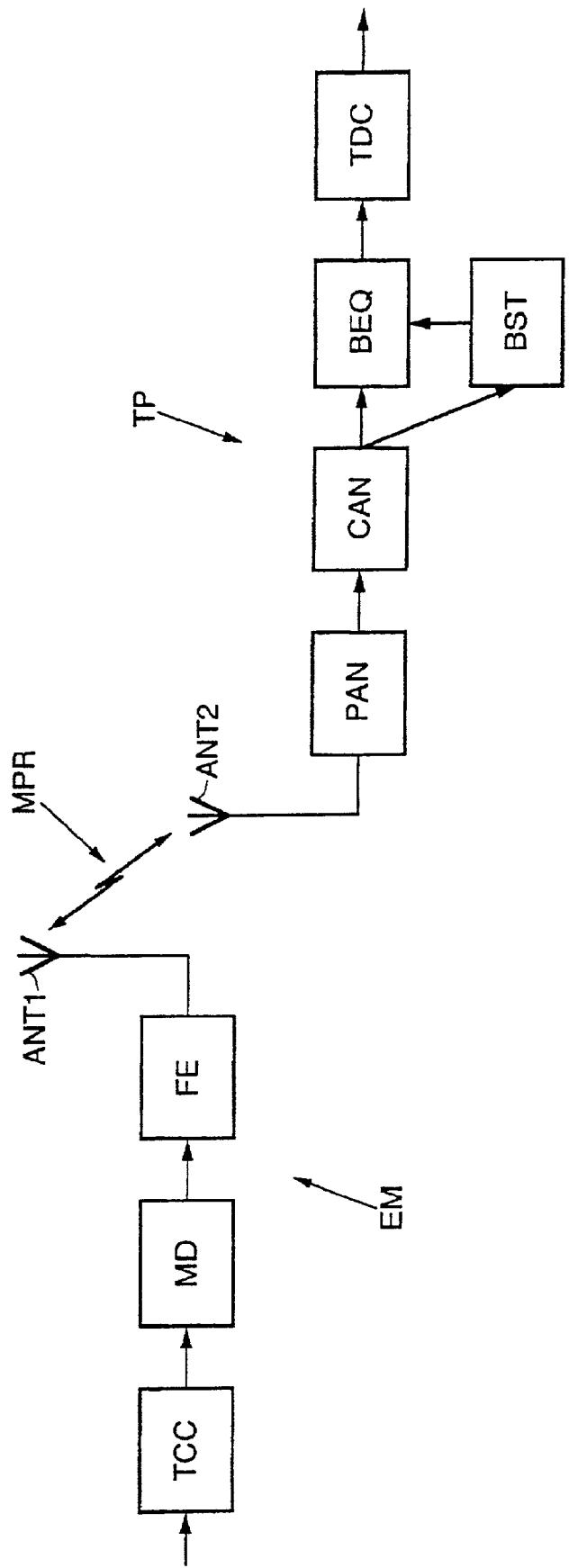
FIG. 1 is a block diagram of an information receiver incorporating a device according to the present invention.

It is now assumed, while referring more particularly to FIG. 1, that the invention applies, for example, to cellular mobile telephone telephones, such as in the GSM network. In FIG. 1, the reference EM denotes a transmitter comprising upstream a coding block TCC receiving the usable data to be transmitted, for example speech, and performing in particular conventional channel coding processing operations which introduces redundancies into the data stream. The output from the TCC block includes binary information blocks.

The TCC block is followed conventionally by a modulator performing, for example, a quadrature modulation of the QPSK type or an M-PSK phase shift modulation according to terminology well known to the person skilled in the art for transforming the binary signal into an analog signal. This analog signal is then filtered in a transmission filter FE before being transmitted towards the receiver via an antenna ANT1.

The propagation MPR between a transmitter EM and a receiver TP, such as for a cellular mobile telephone, may be air. The receiver TP, or cellular mobile telephone, essentially comprises at the front end an antenna ANT2 coupled to an analog stage PAN for essentially carrying out a frequency conversion to bring the modulated signal received into baseband, and a filtering so as to retain only the useful part of the spectrum. After sampling and analog/digital conversion in a converter CAN, the role of the digital stage is to produce an estimate of the transmission channel (BST block) to eliminate the inter-symbol interference by virtue of these estimates (by an equalization performed in a block BEQ), and in general to perform an error correction, i.e., a conventional channel decoding (block TDC).

The transmission channel is formed of the elements situated upstream of the channel estimator, which are in particular the analog sending and receiving devices as well as of the physical means of the propagation MPR. It is also possible to find and take into account digital processing operations (e.g., filtering) performed upstream of the channel estimator but downstream of the analog reception stage.

It is assumed, by way of example, that the impulse response H of the transmission channel taken as a whole is a polynomial in $z^{-1}$ with L complex coefficients $c_0$–$c_{L-1}$ which one seeks to estimate. Such an estimation is performed, for example, in a conventional manner known by the person skilled in the art. More precisely, this estimation can be a so-called "learned" estimation, that is, one which uses training sequences formed of successions of bits of known value. The mathematical system whose unknowns are the coefficients of the impulse response of the channel can be solved using a method of least squares which determines the polynomial H as being the vector which minimizes the norm (Euclidean) of an additional vector representative in particular of the interference and of the thermal noise.

Of course, other methods are also used to estimate the coefficients of the impulse response of the channel. These other methods are also well known to the person skilled in the art, and these other methods will not be discussed in further detail. It is also possible to use blind estimations, that is, no predetermined training sequence is used.

The person skilled in the art is also aware of the various methods making it possible to perform blind estimations of the impulse response of a channel. By way of indication, mention may be made of the article by Jitendra K. Tugnait entitled "Blind Estimation of Digital Communication Channel Impulse Response", IEEE Transactions On Communications, Vol. 42, Nos. 2/3/4, February/March/April 1994.

In terms of hardware, the entire block BST can be embodied by a signal processor, for example. The processing operations performed in this block are carried out via software. With this being so, an entirely hardware implementation of the BST block is also possible, for example, in the form of an application specific integrated circuit (ASIC).

Figure 2:
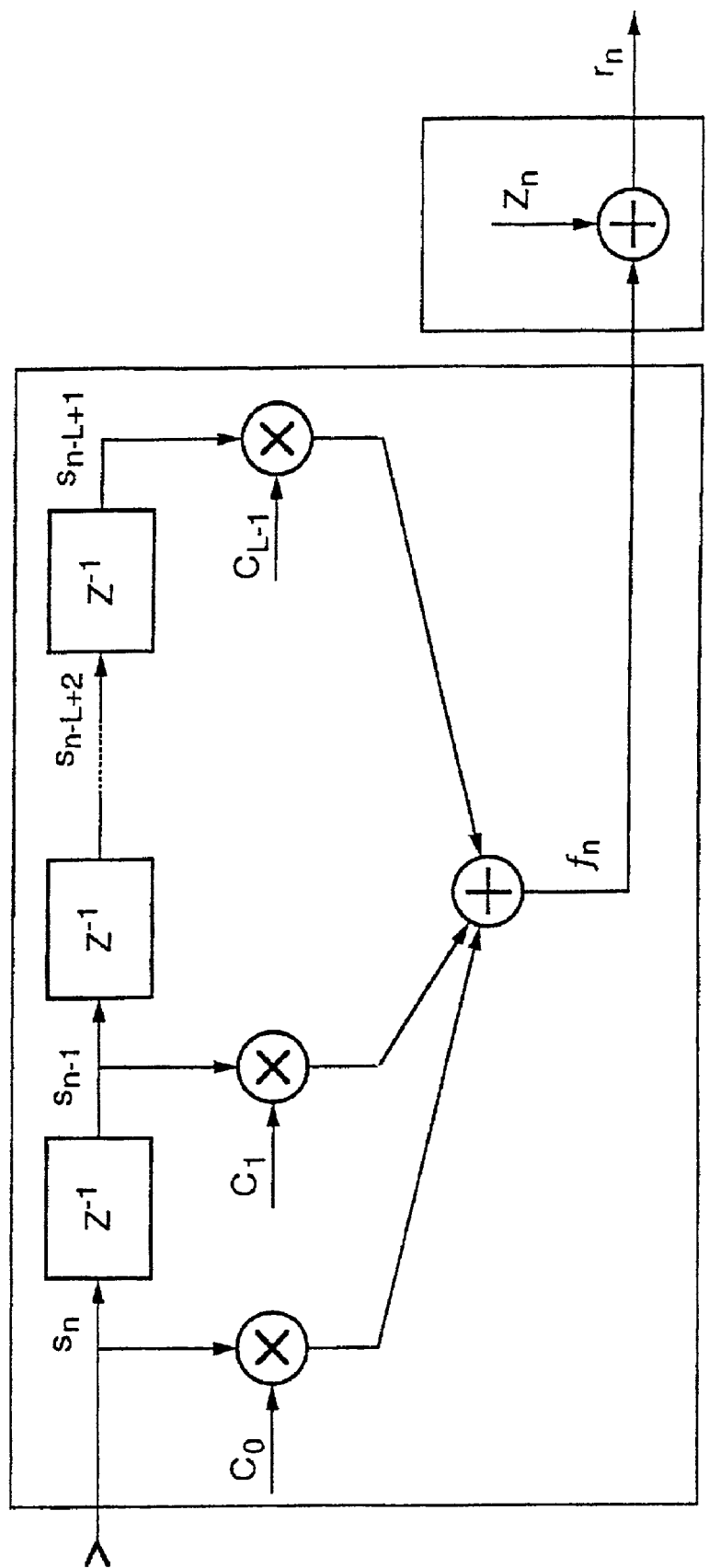
FIG. 2 is a mathematical representation of a transmission channel according to the present invention.

As illustrated now more particularly in FIG. 2, the transmission channel is equivalent to a finite impulse response filter having L coefficients $c_0$–$c_{L-1}$. Each digital sample received $r_n$ at the instant n is defined by formula (I) below:

$$r_n = f_n + Z_n \quad (I)$$

in which $Z_n$ denotes a noise sample, and in which $f_n$ is defined by formula (II) below:

$$f_n = \sum_{i=0}^{L-1} C_i S_{n-i} \quad (II)$$

and $s_i$ denotes the symbol of rank i.

Figure 3:
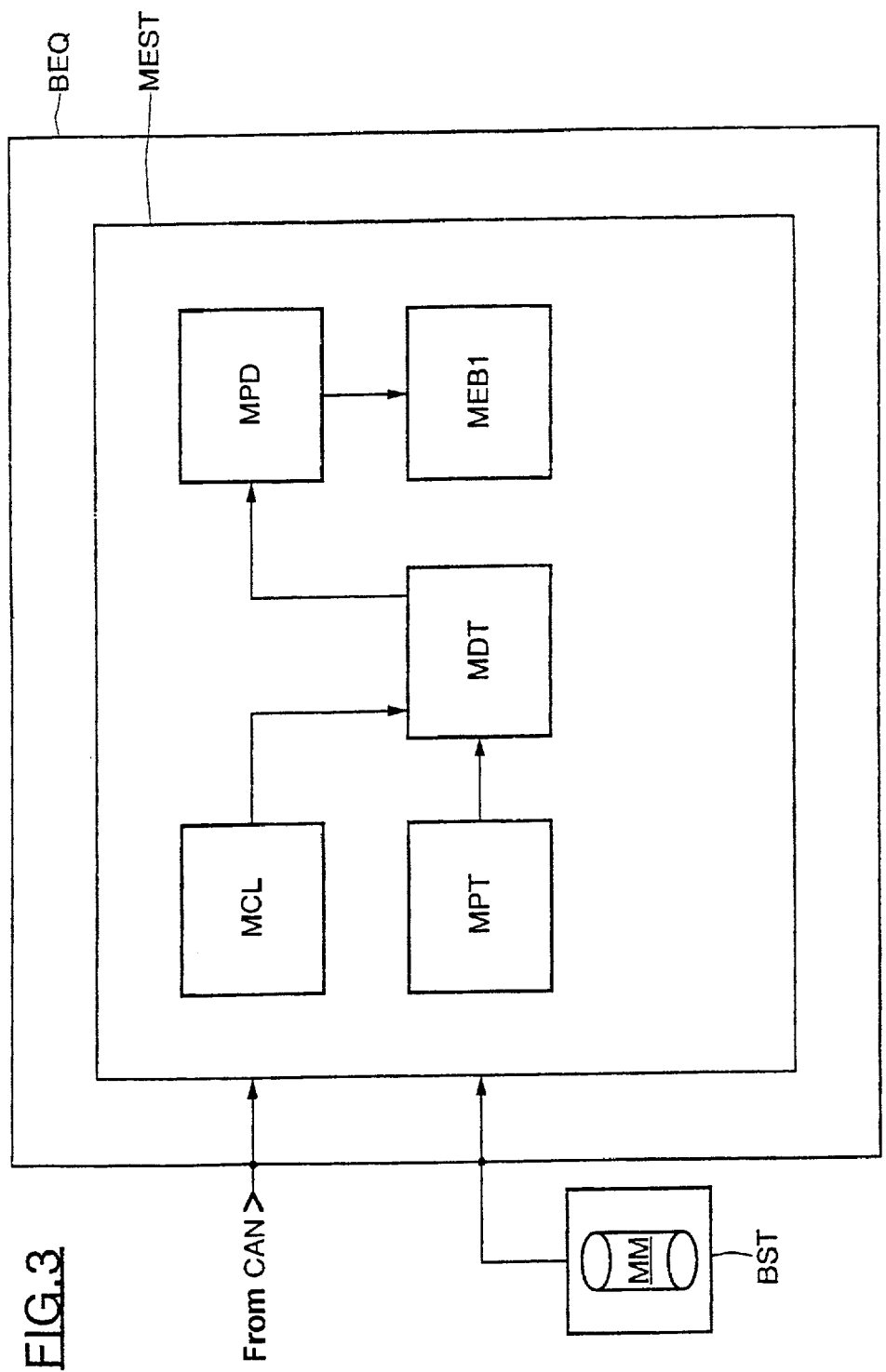
FIG. 3 is a block diagram illustrating an equalization block of the device of FIG. 1.

The equalization block BEQ then comprises estimation means MEST (FIG. 3) that is able to estimate the successive values of the symbols $s_i$ by progressing stage-by-stage through a trellis of the Viterbi type. All of the states of all of the stages are respectively provided with aggregate metrics.

To do this, the estimation means use the digital samples successively delivered by the analog/digital converter CAN, as well as the L coefficients representative of the impulse response of the transmission channel contained in a memory MM of the block BST.

Each stage of the trellis has, in general, at most $M^{L-1}$ states or nodes, with M denoting the M different possible values which can be taken by each symbol $s_i$. Furthermore, a trellis of the Viterbi type has at most M transitions or paths arriving at each state and arising from certain of the states of the preceding stage.

In general, the number of states of the trellis is equal to $M^k$, where k is an integer less than or equal to L–1 and greater than or equal to 1. Thus, in general, according to the invention, at each step of progression through the trellis, a decision is produced regarding the symbol of rank n–k.

In the case where the trellis is a complete trellis, that is, in the case where there is a complete correspondence between a state of the channel and a state of the trellis plus a transition, the number of states is equal to $M^{L-1}$ (k=L–1) and the number of transitions is equal to M. With this being so, the invention applies also to reduced Viterbi trellises, that is, those with a number of states less than $M^{L-1}$ and/or a number of transitions less than M.

In the subsequent text, and for reasons of simplification, we shall base ourselves on an example of a complete trellis with sixteen states (M=four and L=three) corresponding, for example, to a 4PSK modulation with a transmission channel whose impulse response has three coefficients. In a 4PSK modulation, each symbol s is capable of taking four values (e.g., the values 0, 1, 2 and 3 in decimal notation) and is represented by two bits.

Figure 16:
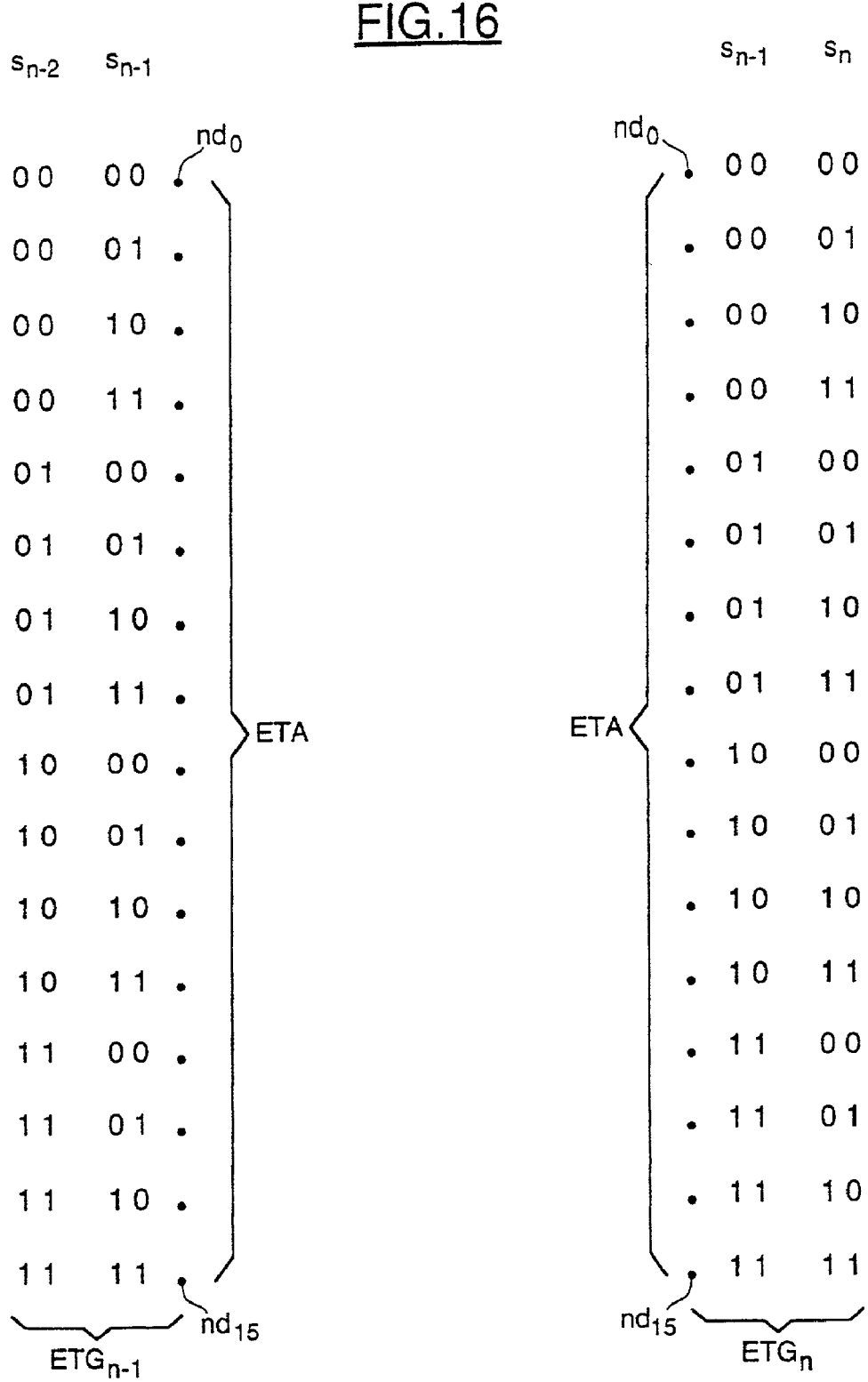
FIG. 16 illustrates, for a particular case, a progression through a trellis allowing implementation of the process according to the invention.
Figure 17:
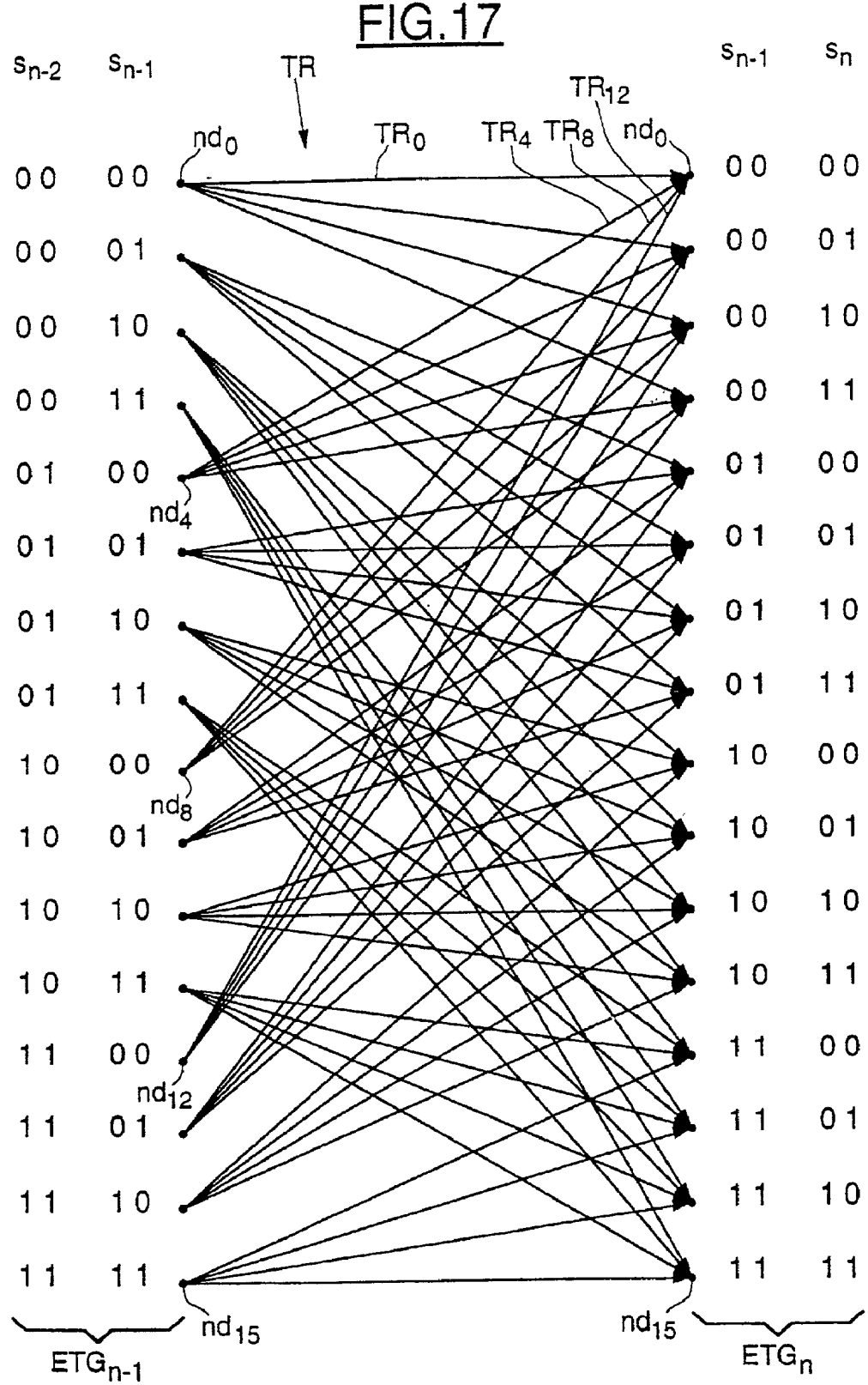
FIG. 17 illustrates paths or transitions according to the invention.
Figure 18:
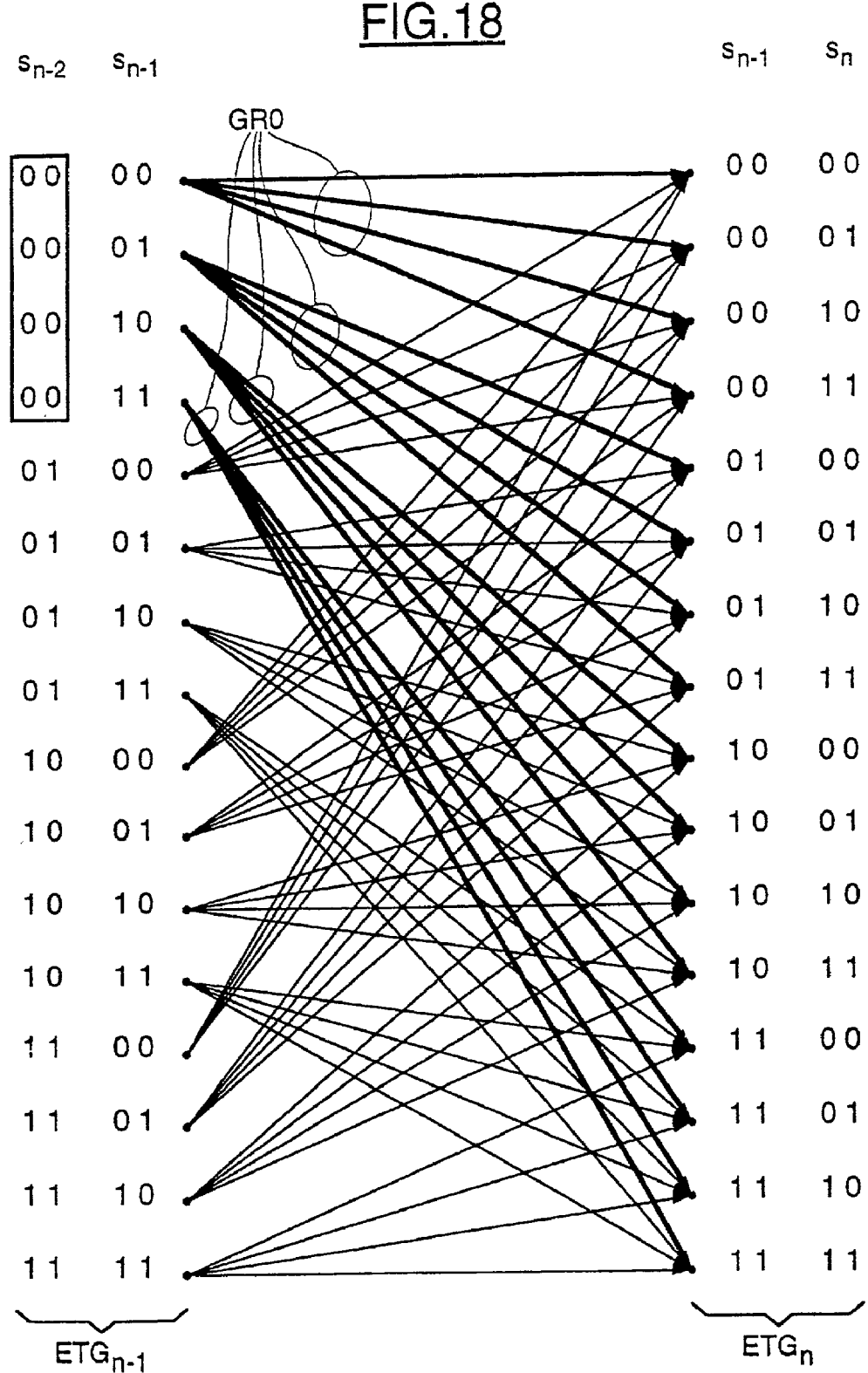
FIG. 18 illustrates a partitioning of a first group of transitions according to the invention.
Figure 19:
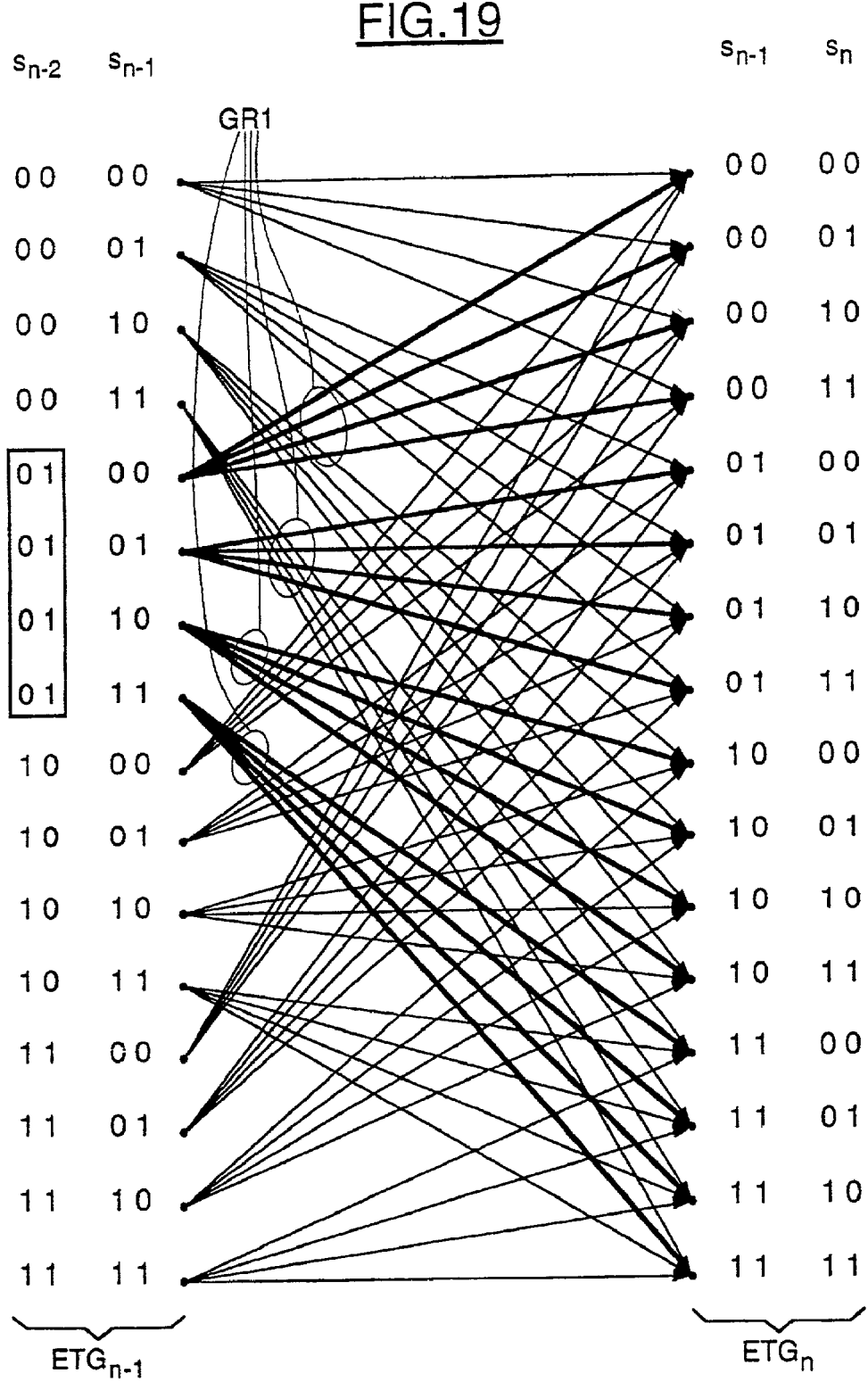
FIG. 19 illustrates a partitioning of a second group of transitions according to the invention.
Figure 20:
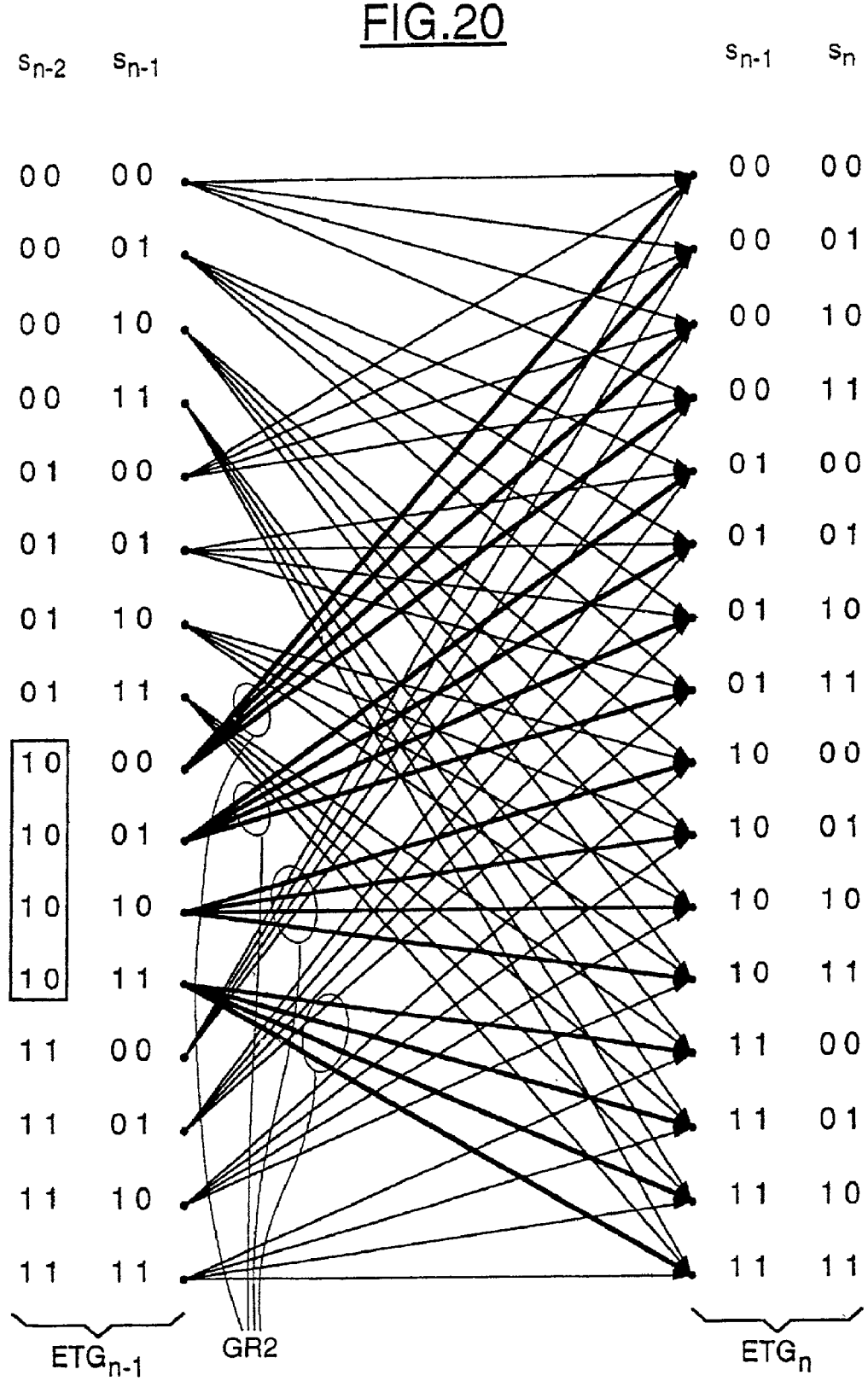
FIG. 20 illustrates a partitioning of a third group of transitions according to the invention.
Figure 21:
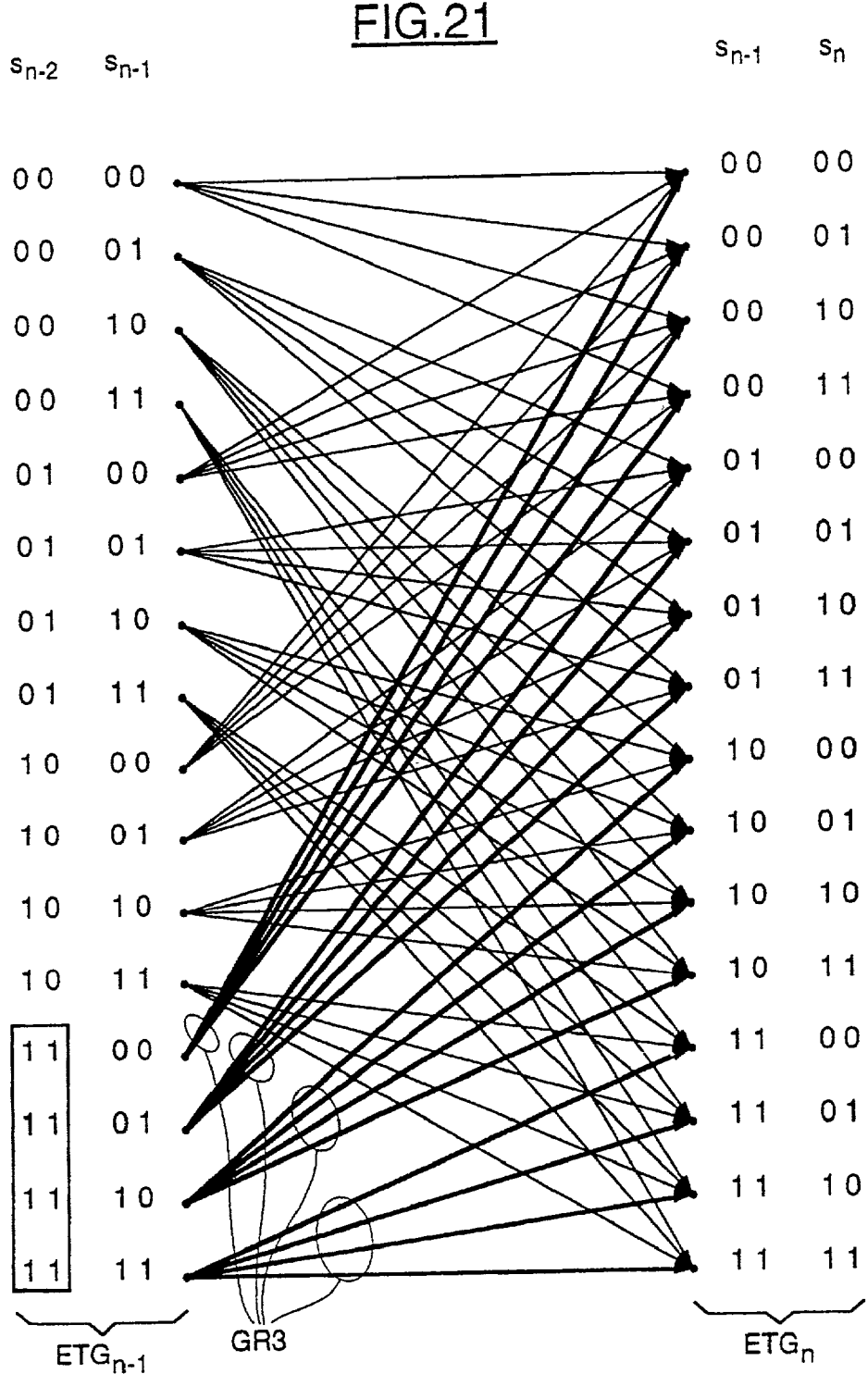
FIG. 21 illustrates a partitioning of a fourth group of transitions according to the invention.

FIGS. 16 and 17 more particularly represent such a trellis and more particularly the stage $ETG_{n-1}$ of rank n–1, as well as the current stage of rank n referenced $ETG_n$. The set of states ETA of the trellis is therefore formed by sixteen states or nodes $nd_0$–$nd_{15}$. The states of the stage $ETG_{n-1}$ correspond to the assumptions regarding the symbols $s_{n-2}$ and $s_{n-1}$, respectively of rank n–2 and of rank n–1. The states $nd_0$–$nd_{15}$ of stage $ETG_n$ are representative of the assumptions regarding the values of the symbols $s_{n-1}$ and $s_n$, respectively of rank n–1 and of rank n.

Furthermore, states or nodes $nd_0$–$nd_{15}$ of stage $ETG_n$ may be reached from the states $nd_0$–$nd_{15}$ of stage $ETG_{n-1}$ via paths or transitions TR (FIG. 17), as a function of the assumption made regarding the value of the symbol $s_n$.

The estimation means (MEST) comprises (FIG. 3) calculation means MCL that is able to calculate for the various states of the current stage $ETG_n$ of the trellis the various aggregate metrics. In this regard, for a given node of stage $ETG_n$, the aggregate metric $M_n$ is defined by formula (III) below:

$$M_n = M_{n-1} + MTR_n \quad (III)$$

in which $M_{n-1}$ denotes the aggregate metric of the node of the preceding stage $ETG_{n-1}$ from which we have arrived at the relevant node of the stage $ETG_n$ by using a given transition or path. Also, $MTR_n$ denotes the metric associated with this path connecting the two relevant nodes of the two stages $ETG_{n-1}$ and $ETG_n$.

Thus, by way of example, referring more particularly to FIG. 17, the aggregate metric of node $nd_0$ of stage $ETG_n$ arising from node $nd_0$ of stage $ETG_{n-1}$ via the transition $TR_0$, is equal to the sum of the aggregate metric of the node $Nd_0$ of stage $ETG_{n-1}$ and of the transition metric associated with the transition $TR_0$.

Several possibilities are offered for determining the transition metrics MTR associated with the various transitions of the trellis. According to a first variation of the invention, the aggregate metrics may be error information aggregated between the observed values and the expected values of the samples (on the basis of an assumption regarding the values of the symbols). In this case, the transition metric or branch metric $MTR_n$ can be a Euclidean metric such as that defined by formula (IV) below:

$$MTR_n = \left| r_n - \sum_{i=0}^{L-1} C_i S_{ni} \right|^2 \qquad (IV)$$

According to another variation of the invention, the aggregate metrics may be resemblance, information aggregated between the observed values and the expected values of the samples (on the basis of an assumption regarding the values of the symbols). In this case, it is necessary to have at the input of the equalization block BEQ, a matched filter whose impulse response is equal to $H^*(z^{-1})$, with the notation "*" denoting the complex conjugate.

A modified transition metric or branch metric of this type is, for example, defined by the formula below:

$$MTR_n = Re\left[ s_n^* \cdot \left( 2 \cdot y_n - x_0 \cdot s_n - 2 \cdot \sum_{i=1}^{L-1} x_i \cdot S_{n-1} \right) \right] \qquad (V)$$

where $y_n$ is the output of the matched filter obtained from the samples received $r_n$, Re denotes the real part, and $x_n$ denotes the autocorrelation function of the channel calculated from the coefficients $c_i$ of the impulse response:

$$y_n = \sum_{i=0}^{L-1} C_{L-1-i}^* \cdot Y_{n+1} \text{ and } x_n = \sum_{i=0}^{L-1-n} C_i^* \cdot C_{n+1}$$

A modified metric of this type is used, for example, in an Ungerboeck receiver, such as the one described in the article entitled "Unification of MLSE Receivers and Extension to Time-Varying Channels", Gregory E. Bottomley, IEEE Transactions on Communications, Vol. 46, No. 4, April 1998. The person skilled in the art will be able to refer to this article for further details regarding this modified metric.

With regards to the initial values of the first symbols transmitted, they may be taken equal to 0. The person skilled in the art is aware, as illustrated in FIG. 17, that a certain number of transitions or paths arising from certain of the states of the preceding stage arrive at each state or node of the stage $ETG_n$. The progression through the trellis, from one stage to another, is then effected by choosing from among these paths a surviving path defined as being the one which leads, for the relevant state of stage $ETG_n$, to the obtaining of a minimum aggregate metric in the case where one chooses a Euclidean branch metric (formula IV), or maximum if one chooses a metric of the modified type (formula V).

Thus, by way of example, referring to FIG. 17, four transitions $TR_0$, $TR_4$, $TR_8$ and $TR_{12}$, respectively arising from states $nd_0$, $nd_4$, $nd_8$ and $nd_{12}$, converge onto the state $nd_0$ of stage $ETG_n$. The calculation means will therefore calculate four aggregate metrics for the state $nd_0$ of stage $ETG_n$ by applying formula (III) and (IV) above in the case of a Euclidean metric, respectively using the aggregate metrics of the nodes $nd_0$, $nd_4$, $nd_8$, and $nd_{12}$ of stage $ETG_{n-1}$ as well as the transition metrics MTR of transitions $TR_0$, $TR_4$, $TR_8$ and $TR_{12}$.

Next, the minimum aggregate metric (in the case of a Euclidean metric) or maximum aggregate metric (in the case of a modified metric) will be chosen for node $nd_0$ of stage ETGN with a view to the progressions through the trellis towards stage $ETG_{n+1}$. Apart from this calculation of the aggregate metrics for the stage-by-stage progression through the Viterbi trellis, the estimation means will take a unique decision regarding the value of the symbol of rank n−L+1 (here the symbol of rank n−2) and will provide this unique decision with a symbol-confident index.

The taking of a unique decision as well as this formulating of the symbol-confidence index will now be described in greater detail. In this regard, the estimating means MEST comprises partitioning means MPT that is able, upon taking into account the sample of rank n, to partition all the transitions arriving at the various states of the current stage $ETG_n$ of the trellis into M groups. Each group contains all the transitions arising from the states of the preceding stage which are associated with one of the M possible values of the symbol of rank n−L+1 (steps 80 and 81, FIG. 8).

This partitioning is illustrated in the example used in FIGS. 18, 19, 20 and 21. More precisely, a first group of transitions GR0 (FIG. 18) represented in bold characters corresponds to the transitions arising from the states of the stage $ETG_{n-1}$ which are associated with the value 00 of the symbol $s_{n-2}$.

The group of transitions GR1 (FIG. 19) contains all the transitions arising from the states of the stage $ETG_{n-1}$ which are associated with the value 01 of the symbol $s_{n-2}$. The group GR2 (FIG. 20) contains all the transitions arising from the states of the stage $ETG_{n-1}$ which are associated with the value 10 of the symbol $s_{n-2}$, and the group GR3 (FIG. 21) contains all the transitions arising from the states of the stage $ETG_{n-1}$ which are associated with the value 11 of the symbol $s_{n-2}$.

The calculation means MCL then determines, for each of the groups GR0–GR3, the various aggregate metrics for the various states $nd_0$–$nd_{15}$ of the stage $ETG_n$ of the trellis. This calculation is performed using formulas (III) and (IV) or formulas (III) and (V) depending on the branch metric used. As indicated above, with a view to the progression through the trellis, only one surviving path is selected for each node.

The estimation means MEST also comprises determination means MDT that is able to determine in each group one of the transitions which leads to the state provided with the extremum aggregate metric. If a branch metric of the error cue type is used (e.g., Euclidean metric), the determination means will detect (step 82, FIG. 8) in each group of the transitions which leads to the state provided with the minimum aggregate metric.

Conversely, if a metric of the resemblance cue type is used (e.g., a modified Ungerboeck metric), the determination means will determine (step 83, FIG. 8) in each group one of the transitions which leads to the state provided with the maximum aggregate metric.

Figure 22:
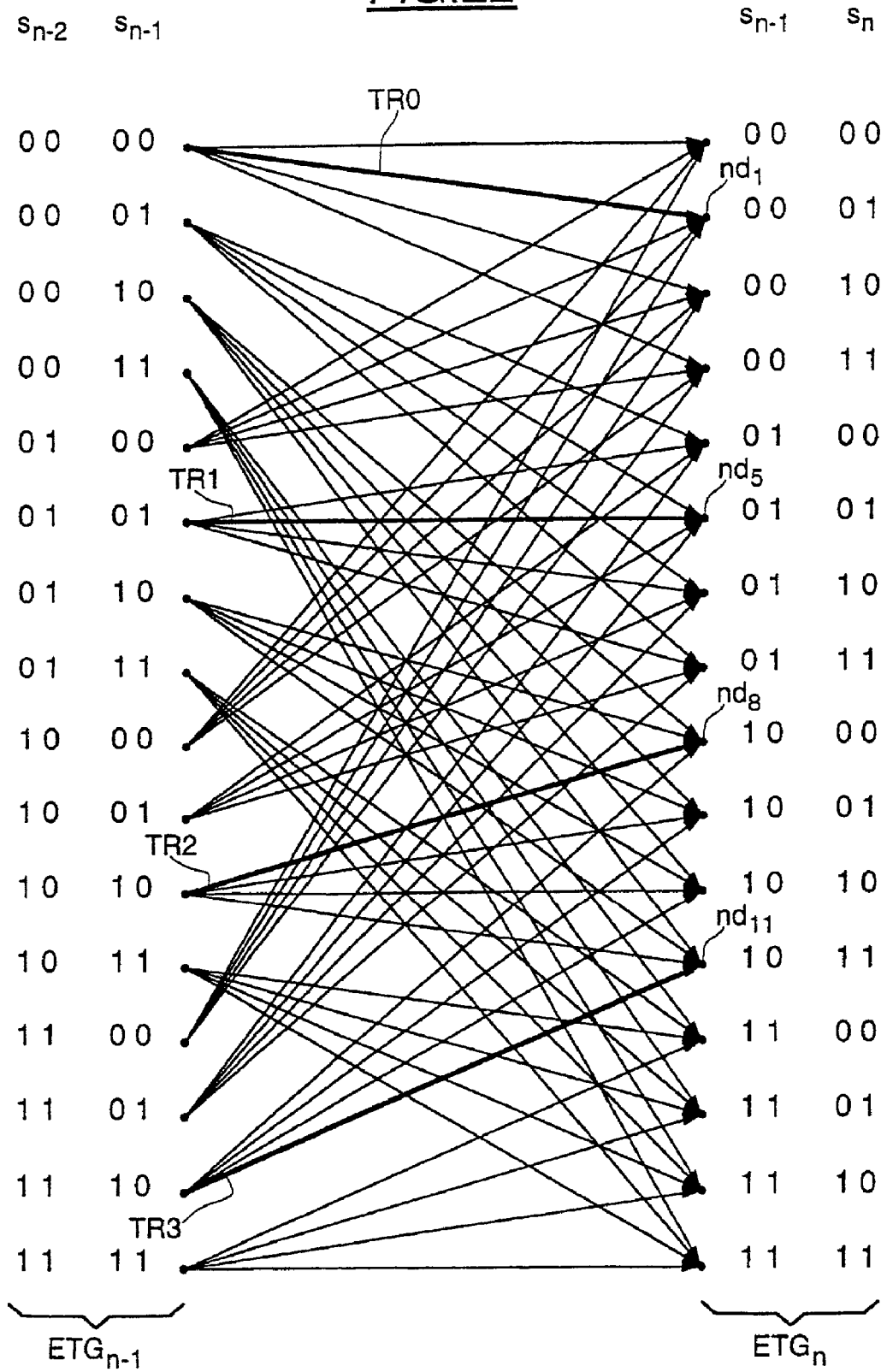
FIG. 22 illustrates an exemplary case of the process according to the invention.
Figure 23:
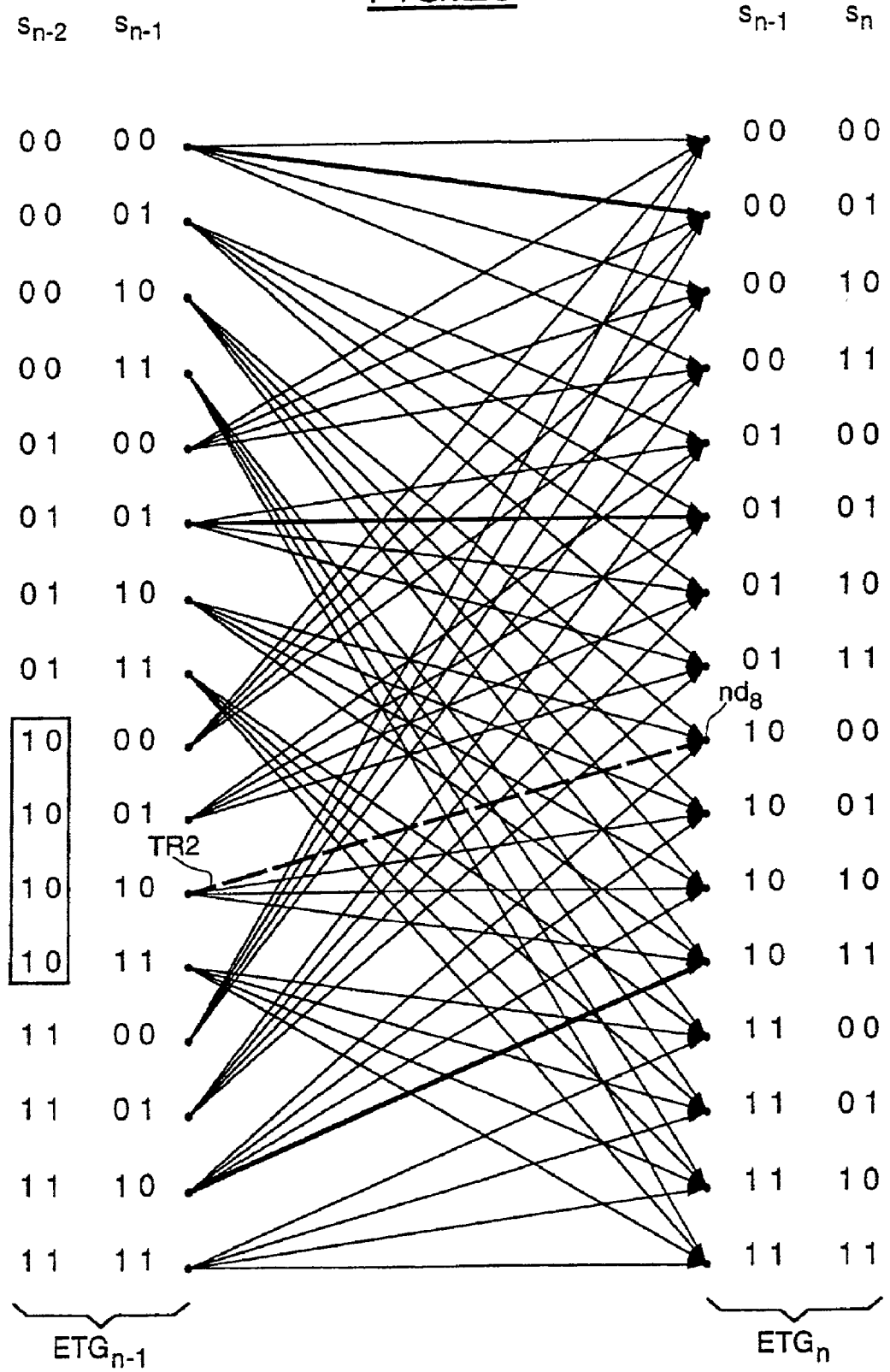
FIG. 23 illustrates an exemplary case of the process according to the invention.

Thus, by way of example, as illustrated in FIG. 22, it is assumed that it is the transition TR0 in the group GR0 which leads to the minimum aggregate metric (or maximum depending on the case), whereas it is the transition TR1 in the group GR1, the transition TR2 in the group GR2, and the transition TR3 in the group GR3.

Figure 8:
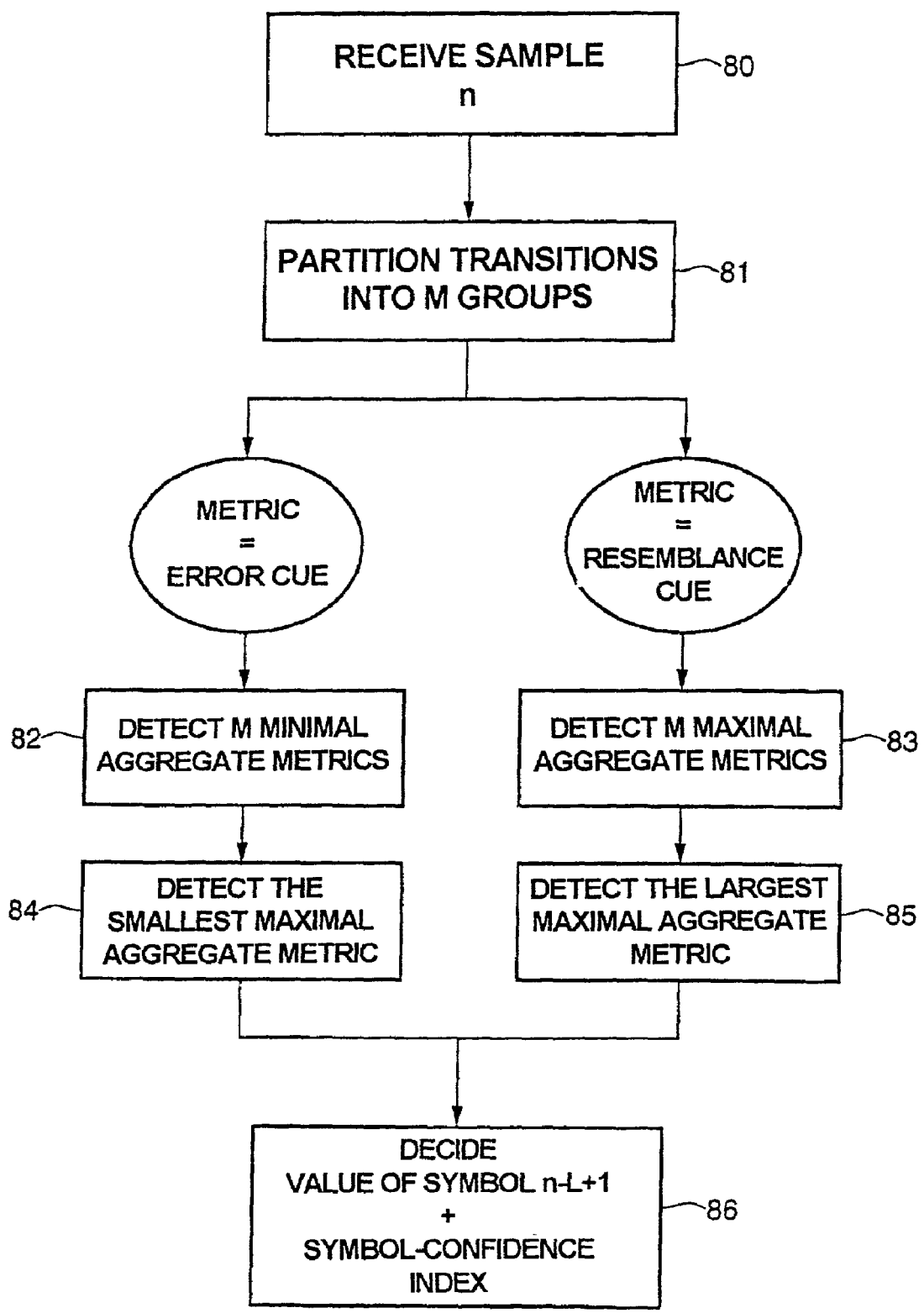
FIG. 8 is a flowchart illustrating a mode of implementation of the process according to the present invention.

The estimation means MEST then comprises decision taking means MPD (FIG. 3) that is able to take a unique decision regarding the value of the symbol $s_{n-2}$ by detecting the group associated with the extremum of these M extremum aggregate metrics (step 86, FIG. 8). More precisely, again referring more particularly to FIG. 22, the decision taking means will detect, in the case of a branch metric of the error cue type (e.g., Euclidean metric), the smallest of the four aggregate metrics respectively associated with the states $nd_1$, $nd_5$, $nd_8$ and $nd_{11}$ of stage $ETG_n$.

In the case where the branch metric used is a metric of the resemblance cue type, the decision taking means will detect the largest of these four aggregate metrics. It is assumed, by way of example, that it is the metric of node $nd_8$ which has been detected as being the smallest (or the largest) of these four metrics. This extremum metric is consequently associated with the transition TR2 which itself forms part of the group GR2. Consequently, at the instant n, the decision taking means decides that the symbol of rank n–L+1 (in this instance n–2) has the value 10 (i.e., the value 3 in decimal).

In the case where M is equal to 2, that is, the case where a binary modulation is present (each symbol is equal to +1 or –1, for example), the decision taking means MPD comprises (FIG. 4) a subtractor STR that is able to calculate the difference between the two minimum aggregate metrics M0 and M1 (step 90, FIG. 9) formulated by the determination means.

The decision taking means MPD also comprises, apart from the subtractor STR, a sign operator SGN capable of determining the sign of the difference between the two minimum aggregate metrics M0 and M1 (step 91). The sign of this difference then yields the unique decision. Stated otherwise, if the sign is positive the symbol of rank n–L+1 is equal to the value +1, while if the sign is negative the value of this symbol is equal to –1.

Figure 4:
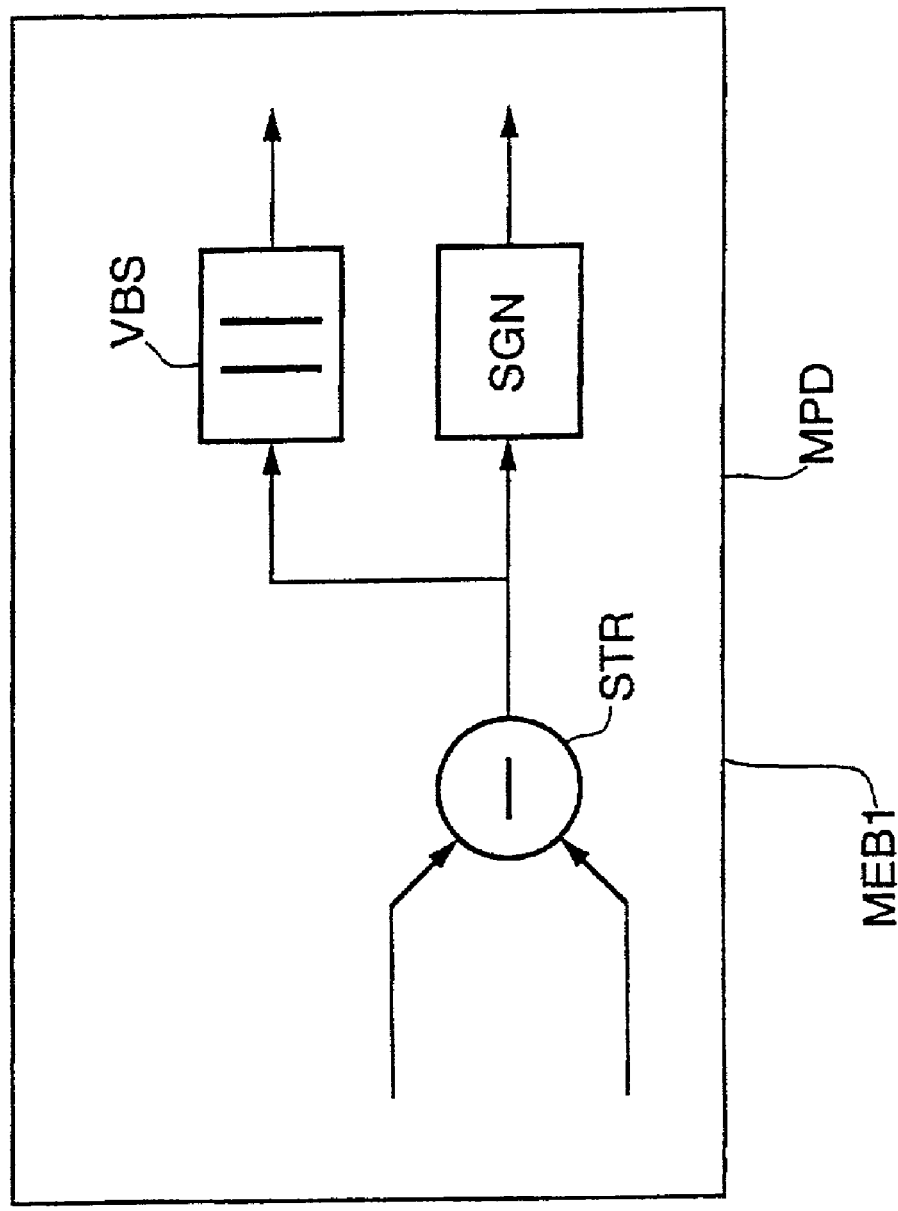
FIG. 4 is a block diagram illustrating a decision taking means of the equalization block of FIG. 3.
Figure 9:
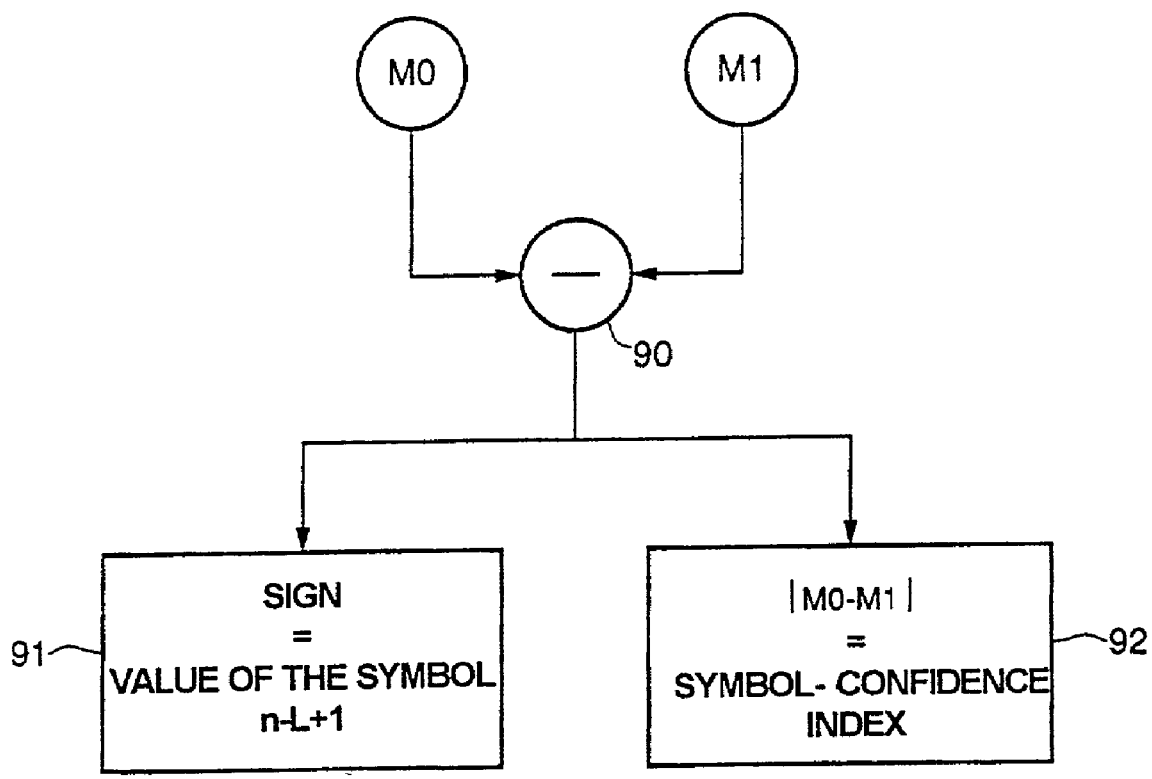
FIG. 9 is a flowchart illustrating a process for calculating the difference between the two minimum aggregate metrics according to the present invention.

What has just been described with reference to FIGS. 4 and 9 also applies in the case where the branch metrics are modified metrics of the resemblance cue type. In this case, M0 and M1 designate the two maximum aggregate metrics delivered by the determination means.

Figure 5:
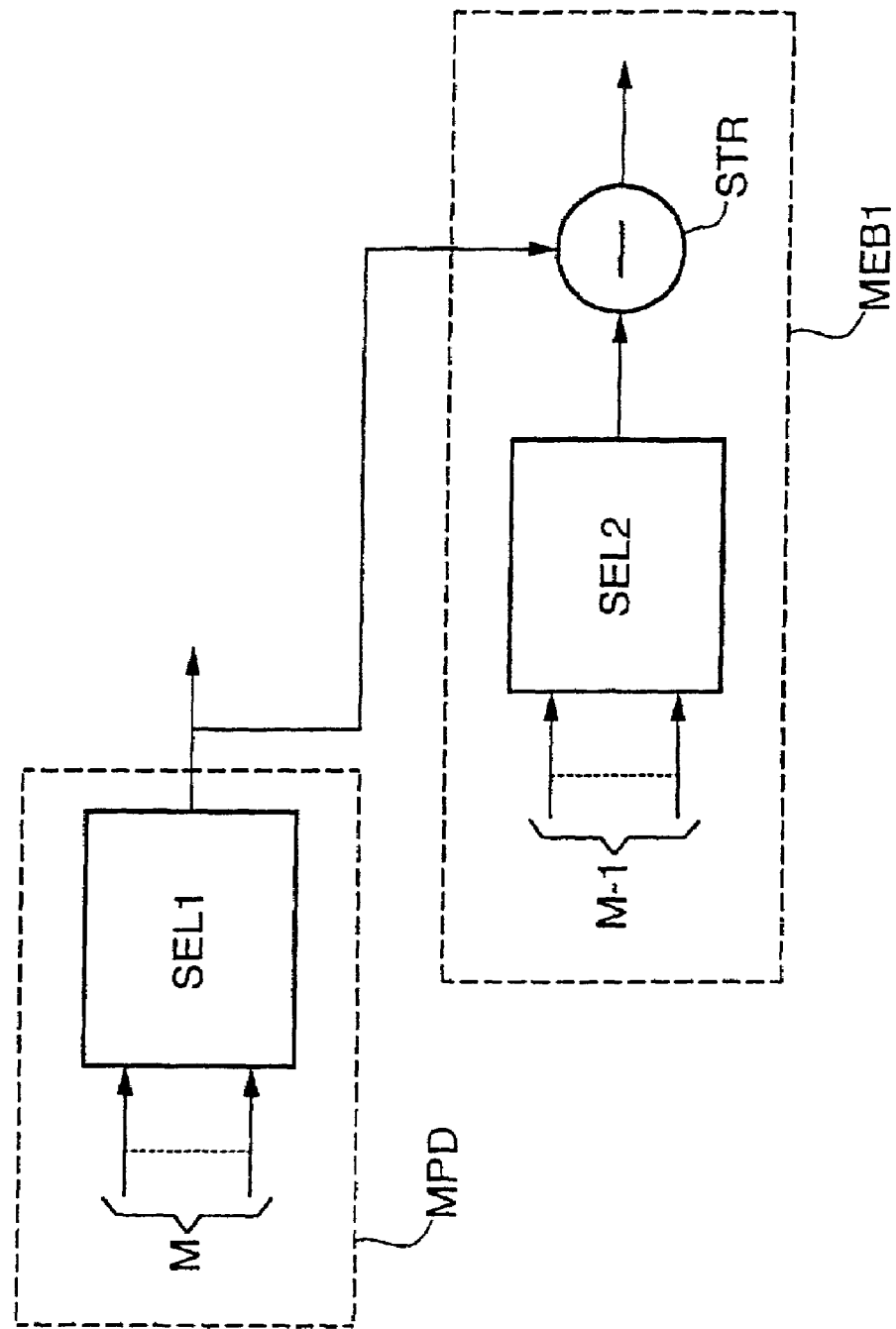
FIG. 5 is a block diagram illustrating a subtractor for calculating the difference between two minimum aggregate metrics in accordance with the invention.
Figure 10:
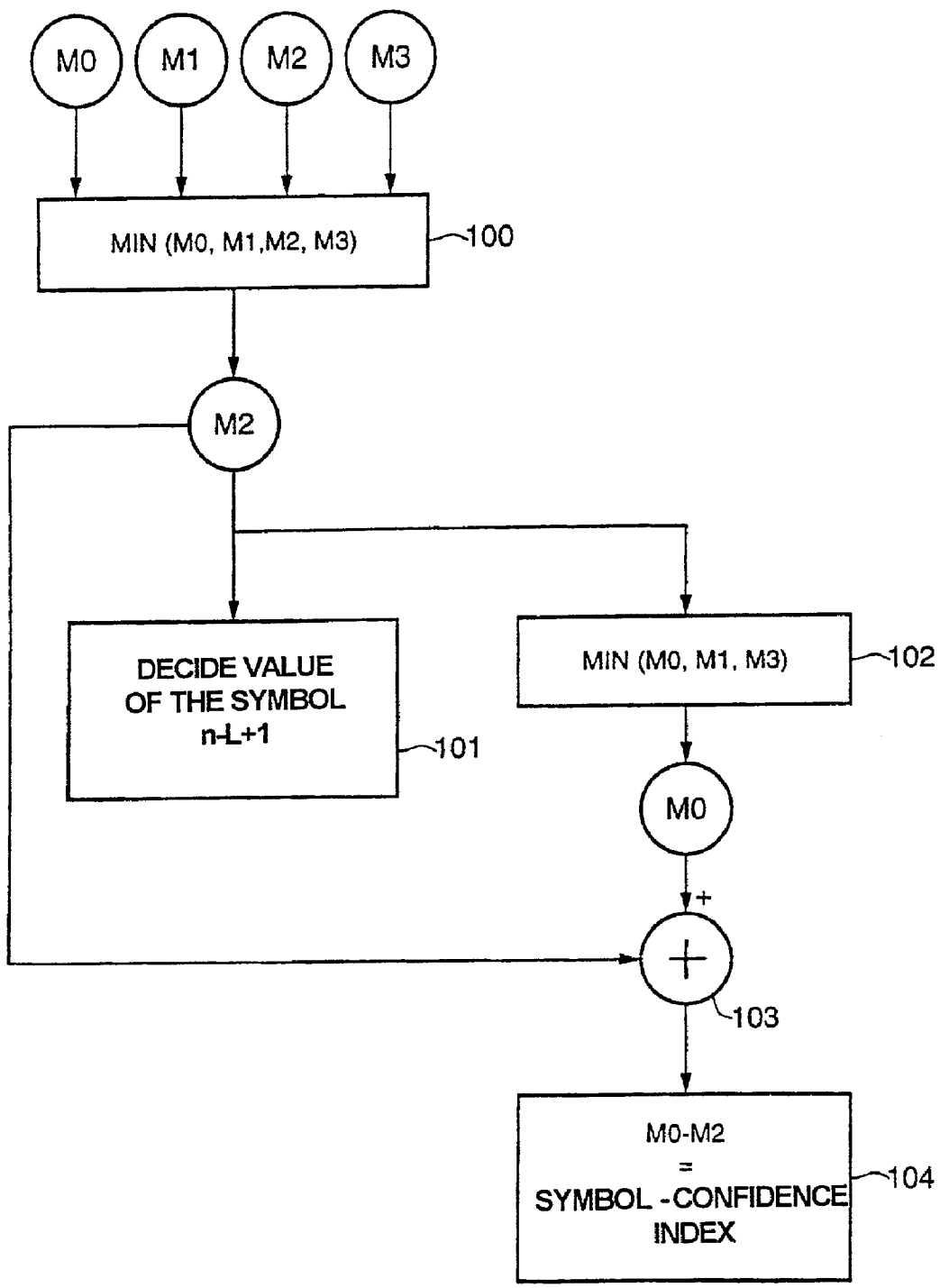
FIG. 10 is a flowchart illustrating a process for the first selection means to perform a first selection of the smallest of the M minimum aggregate metrics according to the present invention.

Referring now more particularly to FIGS. 5 and 10 to illustrate the decision taking with regards to the value of the symbol of rank n–L+1, an M-ary modulation (M>2) and a branch metric of the error cue type (e.g., Euclidean metric) will be used. The decision taking means MPD comprises first selection means SEL1 that is able to perform a first selection of the smallest of the M minimum aggregate metrics MO, M1, M2, M3 (step 100, FIG. 10) delivered by the determination means. These minimum aggregate metrics M0–M3 are, in the example illustrated in FIG. 22, those assigned to states $nd_1$, $nd_5$, $nd_8$ and $nd_{11}$ of stage $ETG_n$.

It is assumed, as already indicated above, that the smallest metric is the metric M2, that is, the one assigned to node $nd_8$. This then results (step 101, FIG. 10) in a taking of a decision regarding the value of the symbol of rank n–L+1, as explained above.

Figure 11:
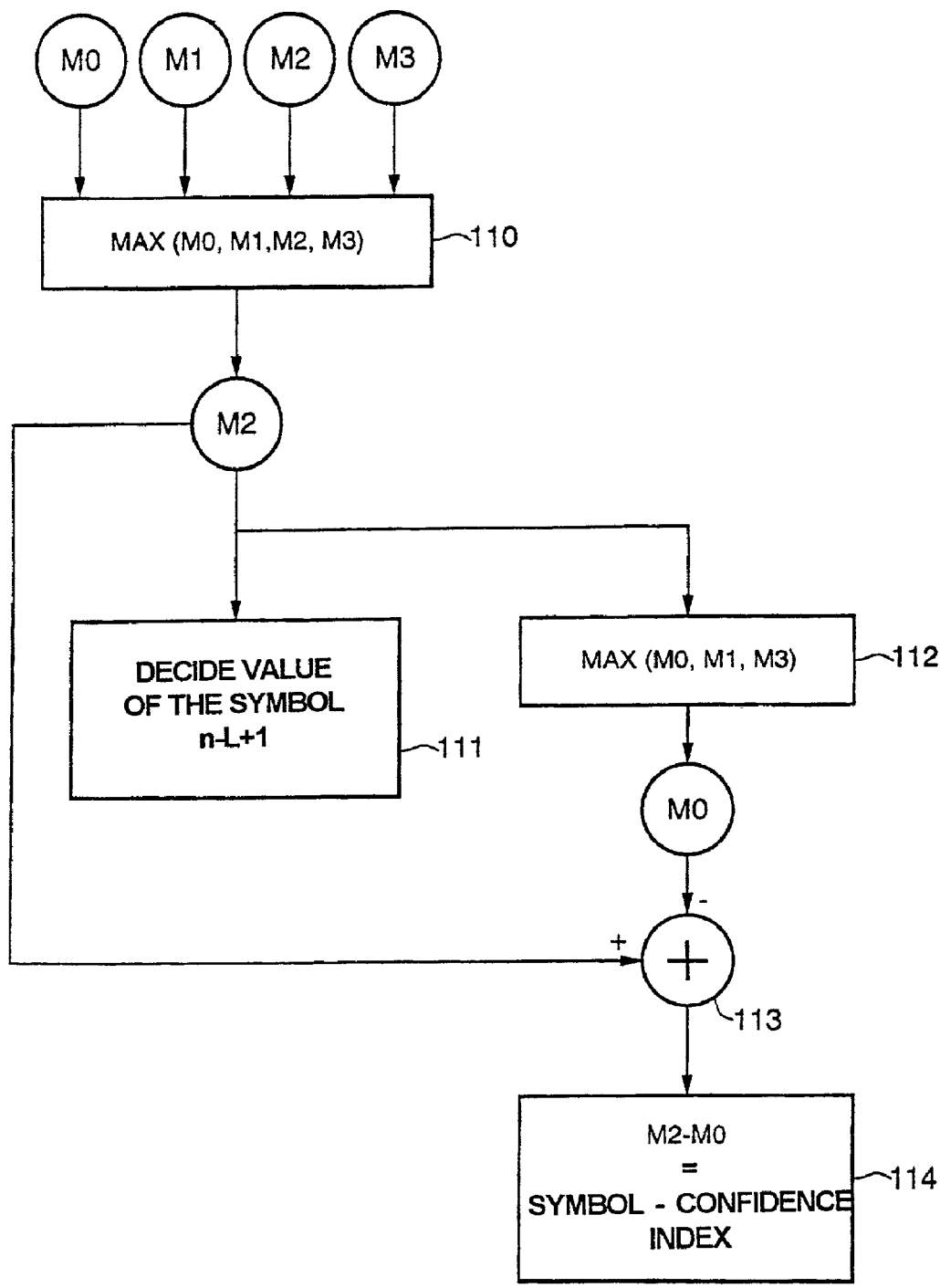
FIG. 11 is a flowchart illustrating a process for the first selection means to determine the largest of the M maximum aggregate metrics according to the present invention.

In an M-ary modulation, but in the case where a branch metric of the resemblance cue type is used, the first selection means SELL now determines (step 110, FIG. 11) the largest of the M maximum aggregate metrics delivered by the determination means. It is assumed in FIG. 11 that now the metrics M0, M1, M2 and M3 are the maximum aggregate metrics in each of the groups and that the largest maximum aggregate metric is again the metric M2. This makes it possible to take the decision regarding the value of the symbol of rank n–L+1 (step 111, FIG. 11) in a similar manner to that which has already been explained above.

Apart from the decision taking means MPD, the estimation means MEST comprises first formulation means MEB1 (FIG. 3) that is able to formulate from the M aggregate metrics (minimum or maximum) a symbol-confidence index assigned to the unique decision regarding the value of the symbol of rank n–L+1.

Referring again to FIGS. 4, 5, 9, 10 and 11, this formulating of the symbol-confidence index in each of the variations of the invention is illustrated. In the case of a binary modulation (M=2), and regardless of the type of metric used (error cue or resemblance cue), the first formulation means MEB1 comprises the subtractor STR (FIG. 4) as well as an absolute value operator VBS. The absolute value of the difference calculated by the subtractor (step 92, FIG. 9) yields the value of the symbol-confidence index.

In the case of an M-ary modulation (M>2) and in the case of a branch metric of the error cue type (e.g., Euclidean metric), the first formulation means comprises second selection means SEL2 (FIG. 5). These second selection means performs, from among the M–1 remaining minimum aggregate metrics (M0, M1, M3, FIG. 10) not selected on completion of the first selection 100 performed by the first selection means SEL1, the smallest of these M–1 remaining minimum aggregate metrics (step 102, FIG. 10). It is assumed, by way of example, and as illustrated also in FIG. 24, that the minimum aggregate metric thus selected in step 102 is the metric M0 corresponding to the transition TR0 ending up at the node nd1 of stage $ETG_n$.

The first formulation means then comprises a subtractor STR (FIG. 5) for calculating (step 103, FIG. 10) the difference between the two minimum aggregate metrics respectively arising from the first and from the second selections, in this instance the metrics M0 and M2. The positive value of this difference (step 104, FIG. 10) yields the value of the symbol-confidence index.

Everything that has just been described with reference to FIGS. 5 and 10 applies by analogy in the case when the branch metric is a metric of the resemblance cue type. The only difference between what has just been described and FIG. 11 resides simply in the fact that the second selection means performs the second selection from among the M–1 remaining maximum aggregate metrics not selected on completion of the first selection of the largest of these M–1 remaining maximum aggregate metrics (step 112, FIG. 11).

The invention thus makes it possible to obtain decisions regarding the symbols with a delay equal in the general case to k (L–1 in a trellis with $M^{L-1}$ states). This is a lesser delay as compared with the delay of a Viterbi algorithm of the prior art. Moreover, the gain in memory is considerable. In the invention, it is only necessary to have a storage vector for the current stage and the preceding stage of the trellis which stores the aggregate metrics. It is no longer necessary to store, as in the prior art, the symbol-confidence indices over a block of 5L samples.

Finally, apart from the advantage of having lower implementation cost and a gain in speed, the symbol-confidence indices (flexible outputs according to terminology well known to the person skilled in the art) exhibit augmented qualities. It has been observed that, after decoding, the performance is often as good, and even better than in the prior art.

It is also advantageous in particular to facilitate the subsequent processing operations, of channel decoding for the bit-confidence indices also to be assigned to each of the bits of the symbol of rank n–L+1 which was elected following the taking of a decision regarding its value. Now, if in the case of a binary modulation, the symbol-confidence index is merged with the bit-confidence index since in this case the symbols and the information bits merge. It is entirely otherwise in the case of a multidimensional modulation (M>2). The symbols of the modulation then represent several information bits. Also in the prior art, in the case of a multidimensional modulation, no processing is currently known which makes it possible to produce a confidence (bit-confidence index) associated with each of the bits forming the symbols regarding which decisions have been taken. The invention aims to plug this gap.

Figure 6:
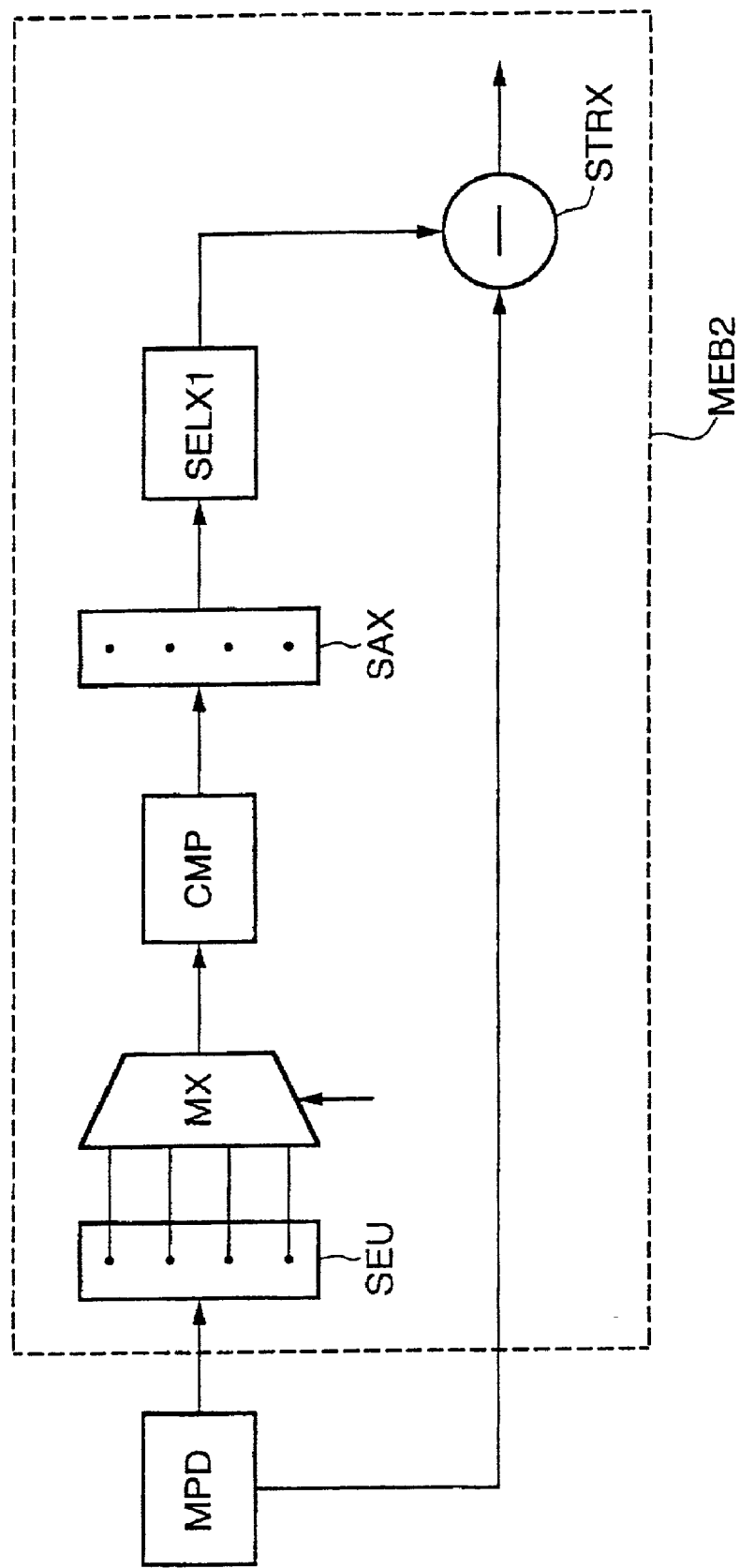
FIG. 6 is a block diagram illustrating a second formulation means in accordance with a first embodiment of the invention.

In this regard, each symbol being formed of b bits, with $M^{2b}$, the device comprises second formulation means MEB2 (FIGS. 6 and 7) that is able to formulate a bit-confidence index for each of the bits of the symbol of rank n+L−1 elected on completion of the taking of a unique decision. These second formulation means MEB2 use the elected symbol SEU and at least one auxiliary symbol formulated from the elected symbol by complementing at least the value of the relevant bit (FIGS. 12 to 15).

Here again, several variations are possible. According to a first variation of the invention, applicable when the branch metric is a metric of the error cue type (e.g., Euclidean metric), the second formulation means MEB2 comprises (FIG. 6) auxiliary formulation means able to formulate a single auxiliary symbol SAX by complementing only the value of the relevant bit while leaving unchanged the values of the other bits of the elected symbol.

More precisely, these auxiliary formulation means can be formed by a multiplexer MX connected to the decision taking means and capable of selecting the relevant bit of the elected symbol SEU for which one wishes to formulate a bit-confidence index. The auxiliary formulation means then also comprises means CMP making it possible to complement the bit value delivered by the multiplexer MX.

Figure 12:
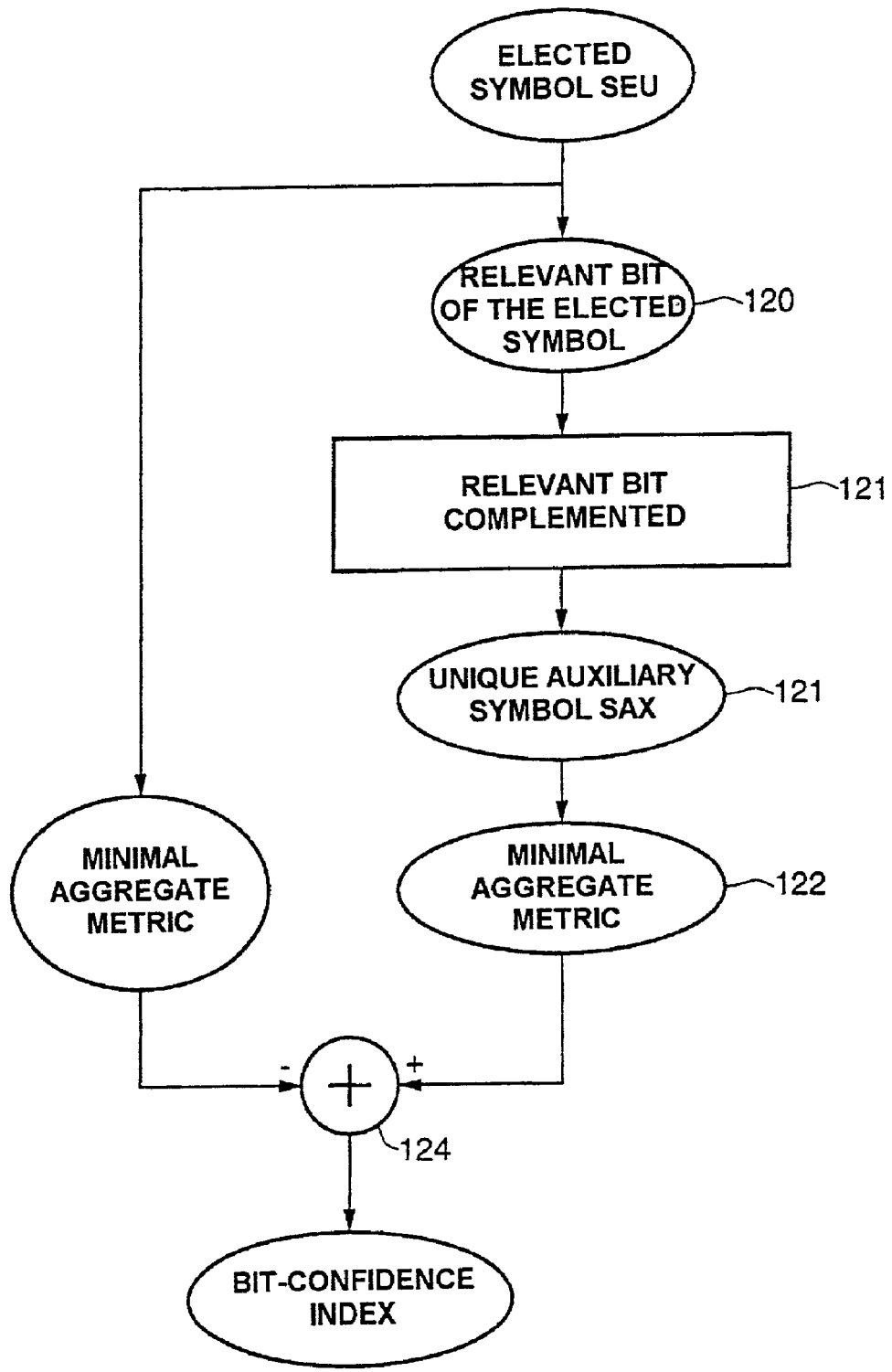
FIG. 12 is a flowchart illustrating a process for formulating a unique auxiliary symbol SAX according to a first embodiment of the present invention.

At this juncture of the process, also illustrated by steps 120 and 121 of FIG. 12, a unique auxiliary symbol SAX has been formulated. By way of example, reference may also be made to FIG. 24, in which the elected symbol SEU is regarded as the symbol 10. It is also assumed that one wishes to formulate a bit-confidence index for the bit of value 1 of the symbol SEU. The symbol SAX is therefore the symbol 00.

Once this auxiliary symbol SAX has been formulated, auxiliary selection means SELX1 are able to select the minimum aggregate metric associated with the group of transitions to which the auxiliary symbol SAX belongs (step 122, FIG. 12). In the example illustrated in FIG. 24, the symbol SAX belongs to the group GR0, and the minimum aggregate metric associated with the group GR0 is that associated with step $nd_1$ corresponding to the transition TR0.

Figure 24:
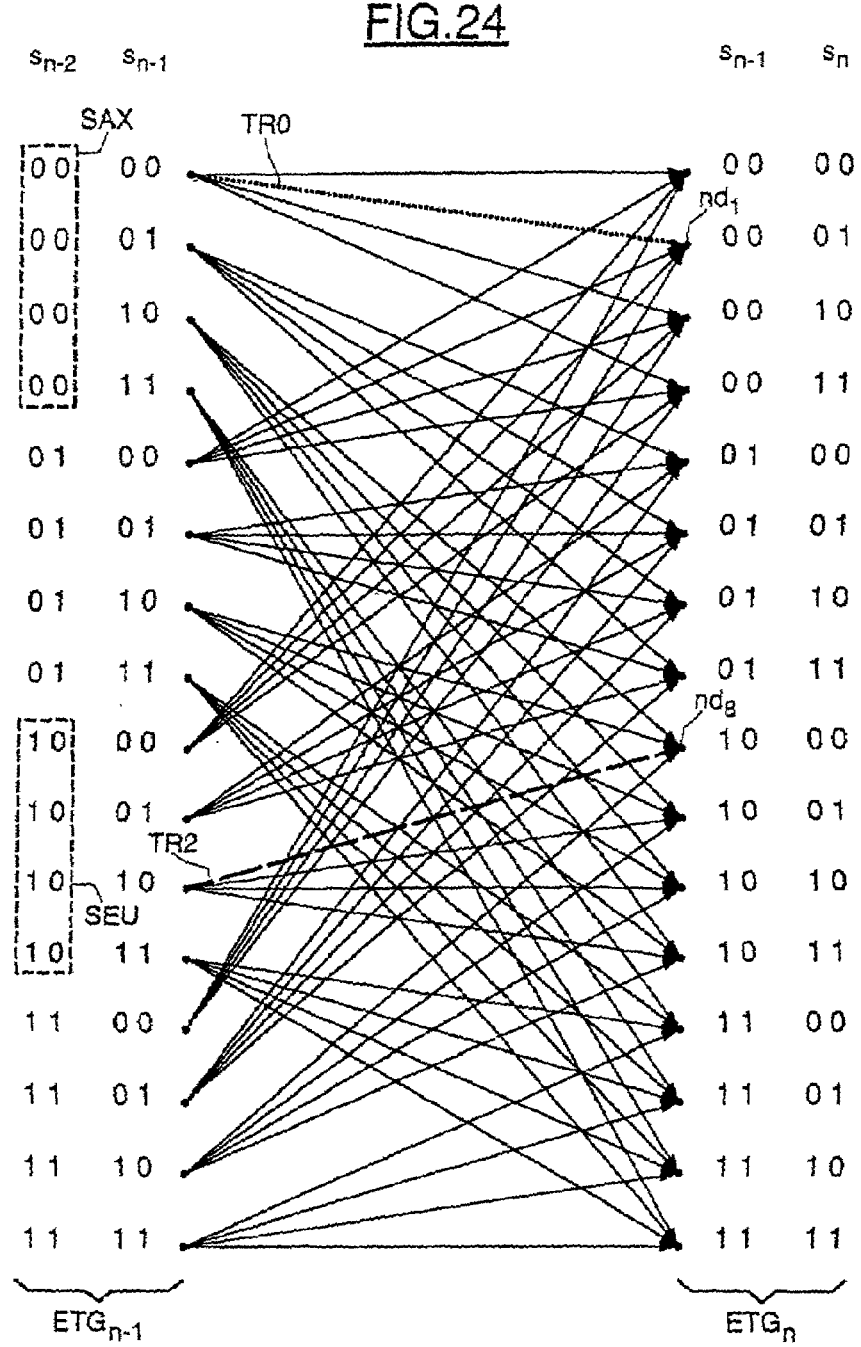
FIG. 24 illustrates an exemplary case of the process according to the invention.

An auxiliary subtractor STRX then forms the difference between the minimum aggregate metric associated with the group of transitions to which the elected symbol SEU belongs (i.e., the aggregate metric associated with state $nd_8$ of stage $ETG_n$ illustrated in FIG. 24), and the minimum aggregate metric associated with the group of transitions to which the auxiliary symbol belongs (i.e., the aggregate metric associated with state $nd_1$). The result of this difference yields the value of the bit-confidence index associated with the relevant bit of the symbol SEU (step 124, FIG. 12).

Figure 13:
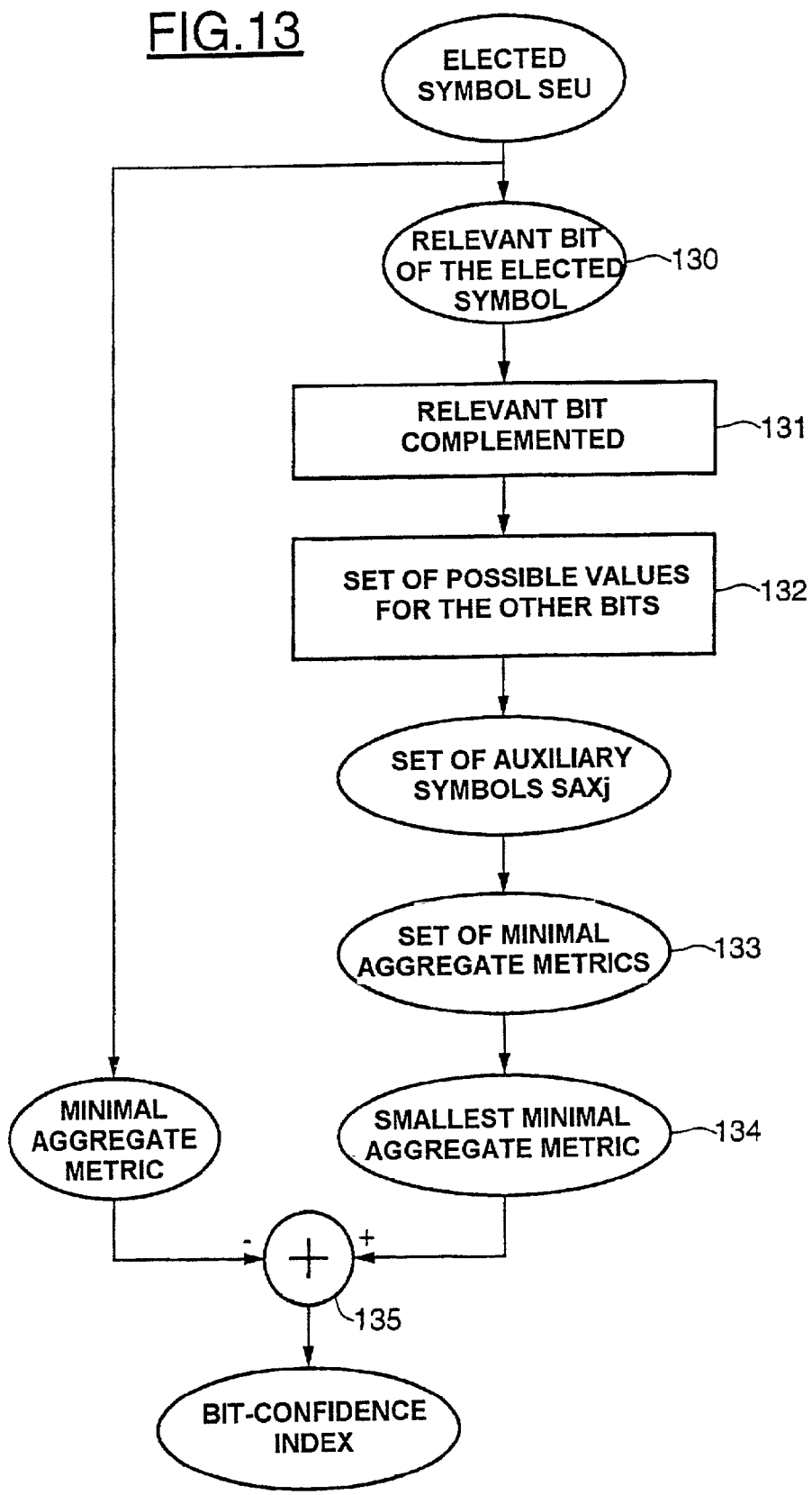
FIG. 13 is a flowchart illustrating a process for formulating a set of auxiliary symbols SAXj according to a first embodiment the present invention.

According to another variation of the invention, likewise applicable with a branch metric of the Euclidean type, the second formulation means comprises (FIG. 7) auxiliary formulation means MEBX able this time to formulate a set of auxiliary symbols SAXj by complementing the value of the relevant bit of the elected symbol SEU and by conferring all the possible values on the other bits of the elected symbol SEU (steps 130, 131 and 132, FIG. 13).

Figure 7:
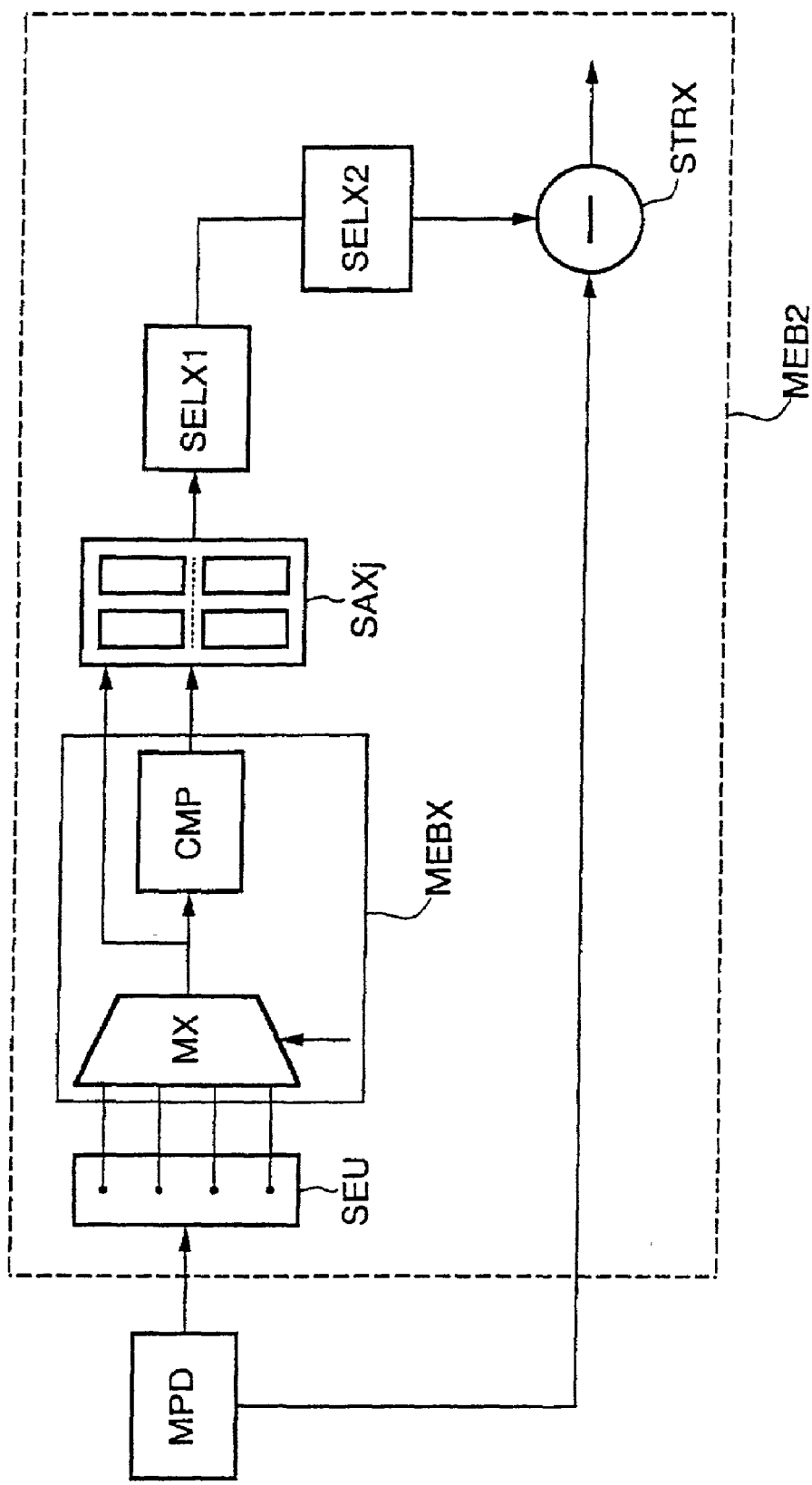
FIG. 7 is a block diagram illustrating a second formulation means in accordance with a second embodiment of the invention.

Here again, as illustrated in FIG. 7, the auxiliary formulation means comprises a multiplexer MX that is capable of selecting the relevant bit of the symbol SEU for which one wishes to establish a bit-confidence index as well as a means CMP capable of complementing only the value of this relevant bit.

By way of example, referring now to FIG. 5, it is assumed again that the elected symbol SEU is the symbol 10. One also wishes to formulate the bit-confidence index for the bit 1 of the symbol SEU. Consequently, two auxiliary symbols SAX1 and SAX2 are then formulated by complementing the bit 1 to 0 and by conferring either the value 0, or the value 1 on the other bit. Thus, the auxiliary symbol SAX1 has the value 00 and the auxiliary symbol SAX2 has the value 01.

First auxiliary selection means SELX1 then select respectively the minimum aggregate metrics associated with the group of transitions to which the auxiliary symbols SAX1 and SAX2 respectively belong. In this instance, the auxiliary symbols SAX1 and SAX2 belong to the groups GR0 and GR1, and the minimum aggregate metrics are those respectively associated with the states $nd_0$ and $nd_5$ ((FIG. 25), and step 133 (FIG. 13)).

Figure 25:
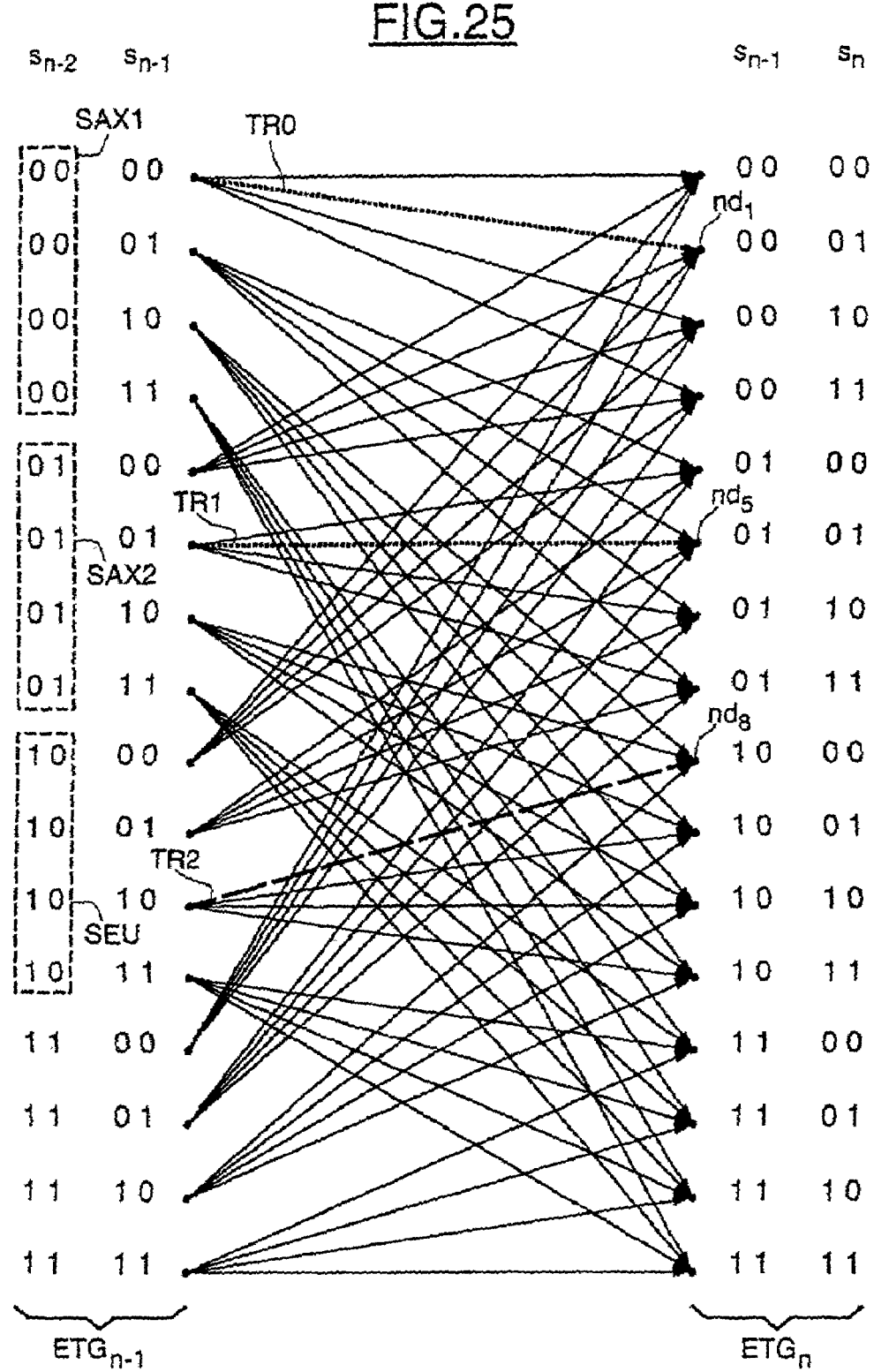
FIG. 25 illustrates an exemplary case of the process according to the invention.

The second auxiliary selection means SELAX2 selects the smallest of the minimum aggregate metrics respectively selected by the first auxiliary selection means (step 134, FIG. 13). It is assumed, for example, that the smallest metric is that assigned to the state $nd_1$ (FIG. 25).

An auxiliary subtractor STRX then forms the difference between the minimum aggregate metric associated with the group of transitions to which the elected symbol SEU belongs (i.e., the aggregate metric associated with the state $nd_8$) and the minimum aggregate metric selected by the second auxiliary selection means, that is, the metric associated with the transition TR0. The result of this difference (step 135, FIG. 13) yields the value of the bit-confidence index.

Figure 14:
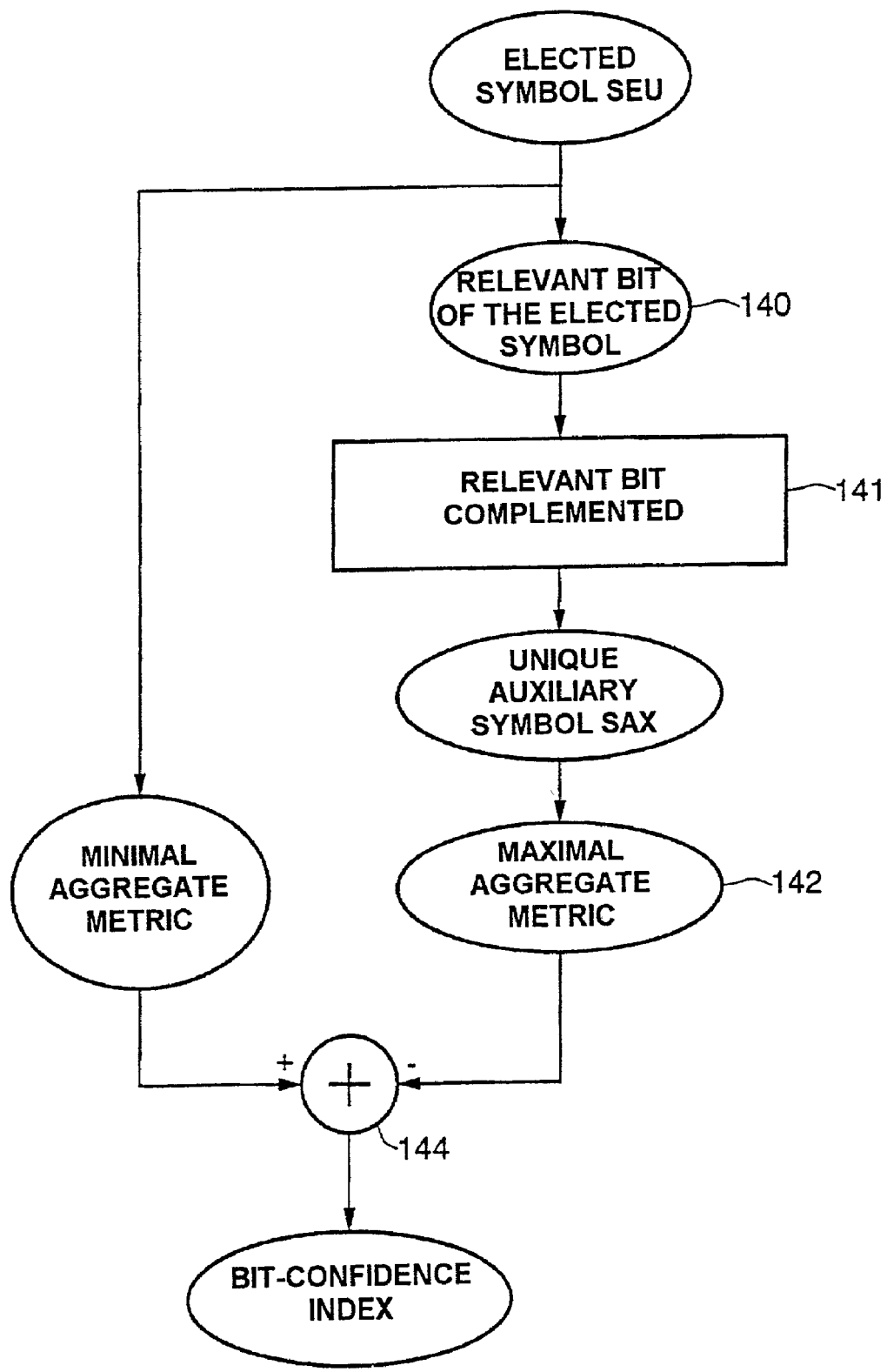
FIG. 14 is a flowchart illustrating a process for formulating a unique auxiliary symbol SAX according to second embodiment of the present invention.
Figure 15:
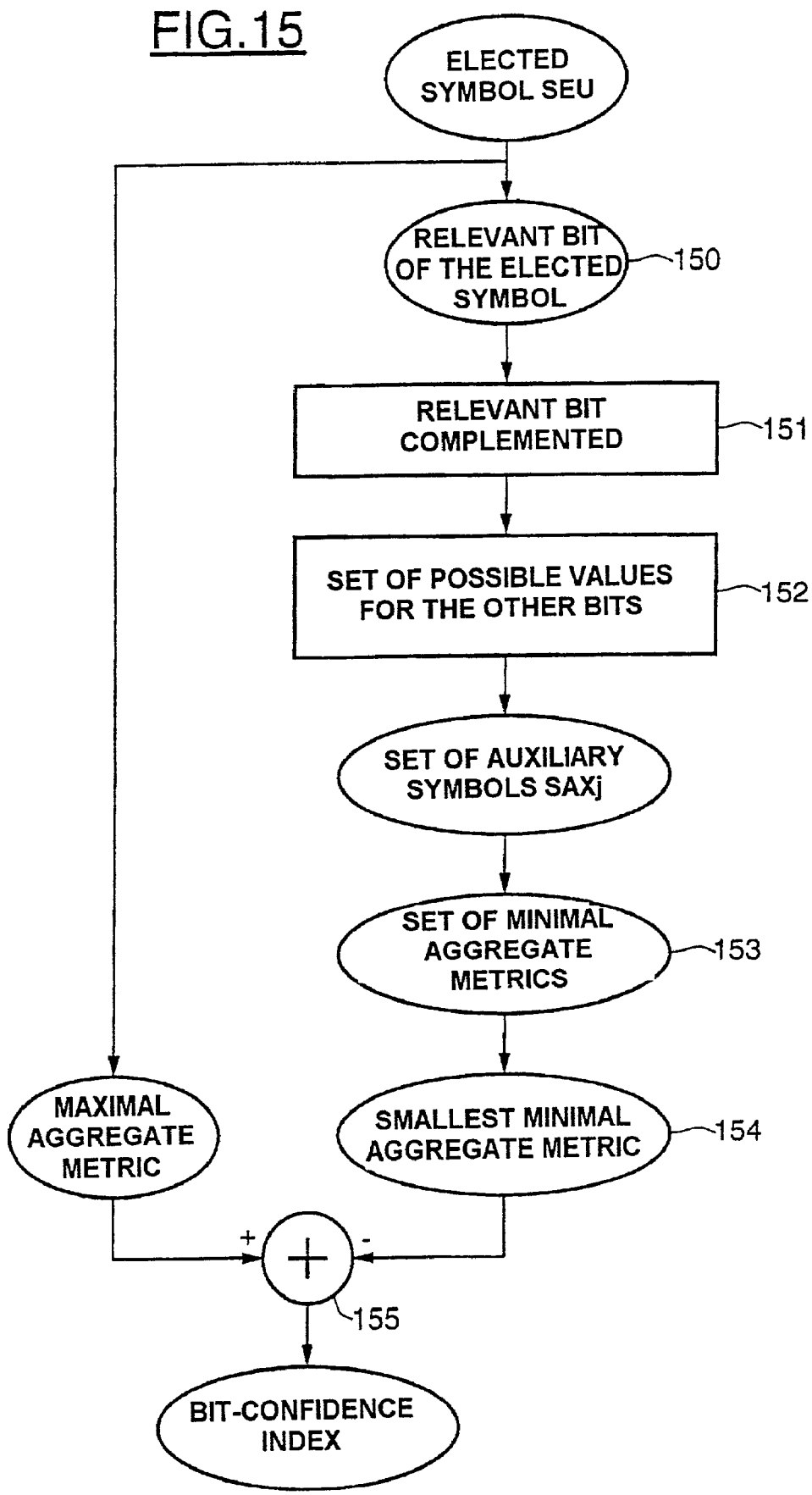
FIG. 15 is a flowchart illustrating a process for formulating a set of auxiliary symbols SAXj according to a second embodiment the present invention.

Everything that has just been described here with respect to the two variations making it possible to calculate a bit-confidence index for a relevant bit of the elected symbol also applies when the branch metric is a metric of the resemblance cue type. As illustrated in FIGS. 14 and 15, it is simply a matter of replacing the terms minimum by maximum and smallest by largest.

In terms of hardware, the assembly made up of the estimation means MEST and the means MEB2 can be embodied, for example, within a signal processor, with the processing operations performed within these means being carried out via software. These processing operations are then in the form of program codes which can easily be written by the person skilled in the art on the basis of the functional definition of these processing operations which have just been given above. The program-code means are then, for example, stored in a read-only memory associated with the processor. With this being so, an entirely hardware embodiment of the means MEST and MEB2 is also possible, for example, in the form of an application specific integrated circuit (ASIC).

By way of illustration, an example of program codes allowing progression through the trellis and the taking of a decision regarding the symbols as well as the calculation of the symbol-confidence indices, is given below in the case of a binary modulation.

```
#include<stdlib.h>
#include<stdio.h>
#include<math.h>
double Dist(double* A, double* B);
void Conv(double* C, short w, double* In, short N);
/* Number of coefficients of the impulse response of the
channel */
    #define S_L 5
    /* Number of states of the trellis */
    #define S_Ns (1<<(S_L-1))
    /* Half the number of states */
    #define S_Ns2 (S_Ns>>1)
/* Vector of flexible (real) decisions taken by the equalizer */
    double O_Out[116];
    /* Vector of (complex) samples received */
    double I_In[2*148];
/* Vector of the (complex) impulse response of the channel,
estimated elsewhere */
    double I_h[2*S_L];
    /* Vector of the aggregate metrics before
transition */
    double d2[S_Ns];
    double *S_d2 = d2;
    /* Vector of the aggregate metrics after transition */
    double D2[S_Ns];
    double *S_D2 = D2;
/* Lookup table of the (complex) outputs of the channel for all */
    /* the possible states and all the transitions */
    double S_Z[2*S_Ns] [2];
    void PSK2_Equalizer(void)
    short i, j, k;
    double M, *In, d0, d1, *Swap;
    /* Construction of a lookup table */
    /* Precalculation of the expected outputs of the
channel for */
    /* all the states and all the possible transitions */
    for (i=0; i<2*S_Ns; i++)
        Conv(S_Z[i], i, I_h, S_L);
/* Initialization of the metrics */
/* A single starting state is possible, the 0 state (example) */
/* Its metric is set to 0, the other states are rendered
impossible */
/* by assigning them an infinite metric (error cue) */
    for (i=0; i<S_Ns; i++)
        S_d2[i] = HUGE / 2;
    S_d2[0] = 0;
    /* Viterbi algorithm */
    /* We advance through the trellis by as many steps
as */
/* there are symbols to be detected (example 58) taking account */
/* of the decision delay of the algorithm (L-1) */
    for (j=0, In=I_In; j<58+S_L-1; j++, In+=2)
        d0 = d1 = HUGE / 2;
/* We describe the states of arrival i - In binary i may be */
    /* written [b3 b2 b1 b0] */
        for (i=0, k=S_Ns|i; i<S_Ns2; i++, k=S_Ns|i)
/* To arrive in state i, two possibilities: */
/* Either we come from state [0 b3 b2 b1], or we come from */
/* state [1 b3 b2 b1] */
/* These two possible origins correspond to the two histories */
/* [0 b3 b2 b1 b0] and [1 b3 b2 b1], labelled in decimal by i */
/* and k=S_Ns+i */
/* Under these conditions, the predecessors of state i appear
as */
/* being i>>1 and k>>1, corresponding respectively to a 0 or 1 */
/* decision regarding the bit which leaves the memory */
/* Hence the two metrics aggregated concurrently to arrive in */
/* state i */
/* On the one hand, metric of the state (i>>1) + transition */
/* metric associated with the history i, i.e. Dist(S_Z[i], */
/* observation */
/* On the other hand, metric of the state (k>>1) + transition */
```

```
/* metric associated with the history k, i.e. Dist(S_Z[k], */
/* observation */
    M = S_d2[k>>1] + Dist(S_Z[k]; In);
    S_D2[i] = S_d2[i>>1] + Dist(S_Z[i], In);
/* From among all the arrival states, we search for the path of */
/* minimum metric corresponding to a 1 bit which leaves the */
/* memory */
    if (M < d1)
        d1 = M;
/* In parallel with this we search for the path of minimum */
/* metric corresponding to a 0 bit which leaves the memory */
    if (S_D2[i] < d0)
        d0 = S_D2[i];
/* We retain as survivor the most probable path, that is
to say */
/* that one of the two concurrent paths which has the smallest */
/* aggregate metric */
    if (M < S_D2[i])
        S_D2[i] = M;
/* Decision taking */
/* The decision regarding the symbols is taken with a delay */
/* equal to the memory of the channel, i.e., L-1 */
/* We contrast the two categories of paths which correspond to */
/* different decisions regarding the bit which leaves the */
/* memory. Among each category, we have retained the most */
/* probable path. The larger the difference in probability, */
/* the more confidence we place in the choice made */
    O_Out[j] = d1 - d0;
/* We swap the vectors of the metrics: the final aggregate
metrics */
/* become the new initial aggregate metrics */
    Swap = S_d2; S_d2 = S_D2; S_D2 = Swap;
/*****************************************************
 * Convolution between a complex signal and a BPSK
binary word (+1/-1)
******************************************************/
    void Conv(double* C, short w, double* In, short N)
        short i;
        for (i=0, C[0]=C[1]=0; i<N; i++, w>>=1)
            C[0] += (w & 1) ? -(*In++) : +(*In++);
            C[1] += (w & 1) ? -(*In++) : +(*In++);
        return
/*****************************************************
 * Euclidean distance squared
******************************************************/
    double Dist (double* A, double* B)
        double dX = B[0] - A[0];
        double dY = B[1] - A[1];
        return(dX*dX + dY*dY);
```

The invention is not limited to the application of the equalization of a transmission channel. Indeed, it applies more generally to any estimation of successive values of digital symbols which can each take M different possible values. From the successive values of digital samples each of which results from the combination of at most L successive symbols, and comprising a stage-by-stage progression through a trellis of the Viterbi type. All the states of all the stages are respectively provided with aggregate metrics. This can in particular also be the case when the signal is deliberately modified on transmission for purposes of protection against errors, for example, or else encryption.

Furthermore the invention is not limited to the various embodiments and various implementations just described. Indeed, the invention applies in particular regardless of the number of states of the trellis (complete trellis or reduced trellis), whether the metric employed be the Euclidean metric, a modified metric at the output of the matched filter or any other metric.

More precisely, the Viterbi algorithm used with a complete trellis may become difficult to implement when the temporal dispersion induced by the transmission channel is too big (L is too large) or when the order of the modulation increases (M>2).

To alleviate this problem, there is a variation known to the person skilled in the art by the name DFSE (Decision Feedback Sequence Estimation), which makes it possible to work with a trellis having a reduced number of states. That is, a trellis whose number of states is equal to $M^k$, where k is less than L−1.

This algorithm is modified according to the invention with respect of the taking of decisions regarding the values of symbols. Referring more particularly in this regard to FIG. 26, which illustrates a reduced trellis in the particular case of a binary modulation (M=2), with a number of coefficients L=5 and a number k=2 (this leads to a reduced trellis with four states or nodes $nd_0$–$nd_3$). The number k can be regarded as the apparent memory of the channel.

The states of the stage $ETG_{n-1}$ correspond to the assumptions regarding the symbols $s_{n-2}$ and $s_{n-1}$. Furthermore, with each state is associated an estimation EST of the symbols which are missing by reason of the reduction of the trellis. Thus, at stage $ETG_{n-1}$, the estimation EST is an estimation on the symbols $s_{n-4}$ and $s_{n-3}$. Since the modulation is binary, each symbol equals 0 or 1, for example. For example, the node $nd_0$ is assigned the values 00 corresponding respectively to the two symbols $s_{n-1}$, $s_n$ of the stage $ETG_n$, or else to the two symbols $s_{n-3}$ $s_{n-2}$ of the stage $ETG_{n-2}$, etc. The values 01 are assigned to the node $nd_1$, the values 10 to the node $nd_2$ and the values 11 to the node $nd_3$.

Two transitions TR respectively arising from two nodes of the preceding stage which are associated with two opposite values (in the case where M=2) of the symbol of rank n−k converge upon each node of the current stage of rank n of the trellis. Each of these two transitions is assigned to the same assumption regarding the value of the symbol of rank n.

Figure 26:
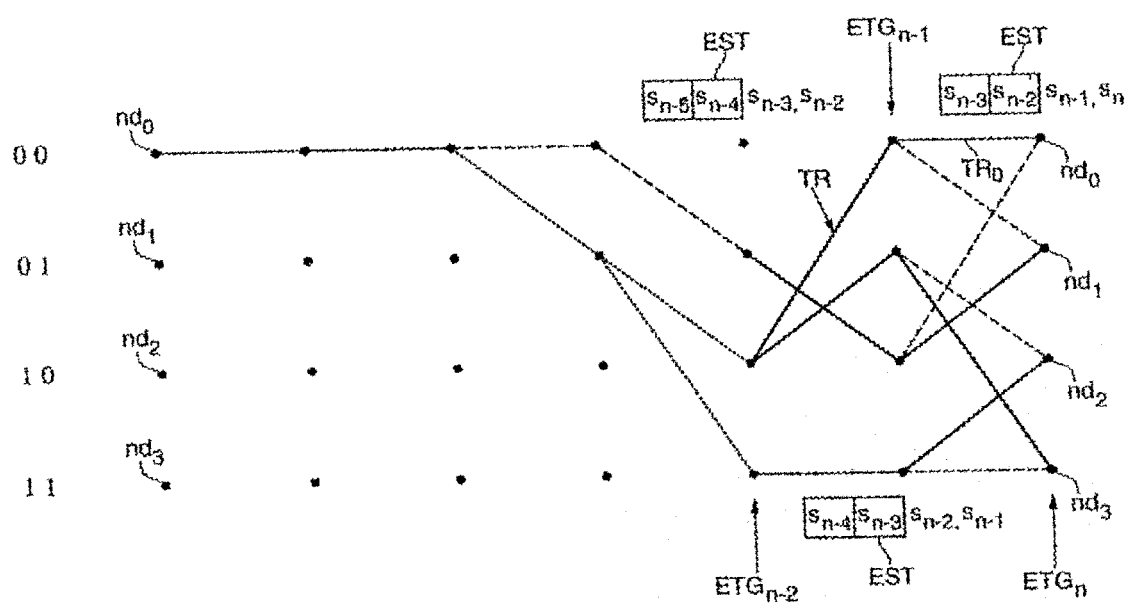
FIG. 26 illustrates a progression through a reduced trellis according to the present invention.

A conventional progression through the trellis, from one stage to another, is then performed by choosing from among these paths a surviving path defined as the one which leads, for the relevant state of the stage $ETG_n$, to the obtaining of a minimum or maximum aggregate metric depending on the metric used. In FIG. 26, for the sake of simplification only, the surviving paths ending up at stage $ETG_{n-1}$ have been represented together with those ending up at stage $ETG_n$ in solid lines. The competing paths which are not selected at stage $ETG_n$ are represented as dashed lines.

A new tag EST containing the estimation of the missing symbols $s_{n-3}$ and $s_{n-2}$ is also associated with this relevant state of the stage $ETG_n$ to determine the value of the tag EST. One then determines the node or the state from which the surviving path having led to the relevant state of the stage $ETG_n$ emanated. For example, the node $nd_0$ of stage $ETG_n$ is reached via the transition (surviving path) $TR_0$ arising from node $nd_0$ of stage $ETG_{n-1}$. Relative to the tag associated with the state $nd_0$ of the preceding stage $ETG_{n-1}$, namely the tag containing the estimation regarding the symbols $s_{n-4}$ and $s_{n-3}$, the same value as that which was contained in the tag associated with node $nd_0$ of stage $ETG_{n-1}$ is kept as the value of the symbol $s_{n-3}$ at node $nd_0$ of stage $ETG_n$ and the value of the symbol $s_{n-2}$ corresponding to the node $nd_0$ from which the transition $TR_0$ emanated is assigned to the value $s_{n-2}$ (here $s_{n-2}$ is equal to 0).

Independently of this conventional progression through the trellis, the decision taking means will, by analogy with a complete trellis, take a unique decision regarding the symbol of rank n−k (n−2 in the example described) when the sample of rank n is taken into account. This will, as has already been explained above, make it possible to avoid having to wait a relatively long time corresponding to 5L samples in order to take a decision regarding the symbol of rank n−5L−k, by backtracking along the path ending up at the node whose aggregate metric is minimum or maximum.

This unique decision taking for the symbol of rank n−k is illustrated in FIGS. 27 to 30 and is performed in a similar manner to what has already been explained with respect to a complete trellis. Only the main steps thereof will be recalled here. More precisely, in the example which is described, a partitioning is carried out of the transitions connecting the nodes of stage $ETG_{n-1}$ to the nodes of stage $ETG_n$, into two groups.

Figure 27:
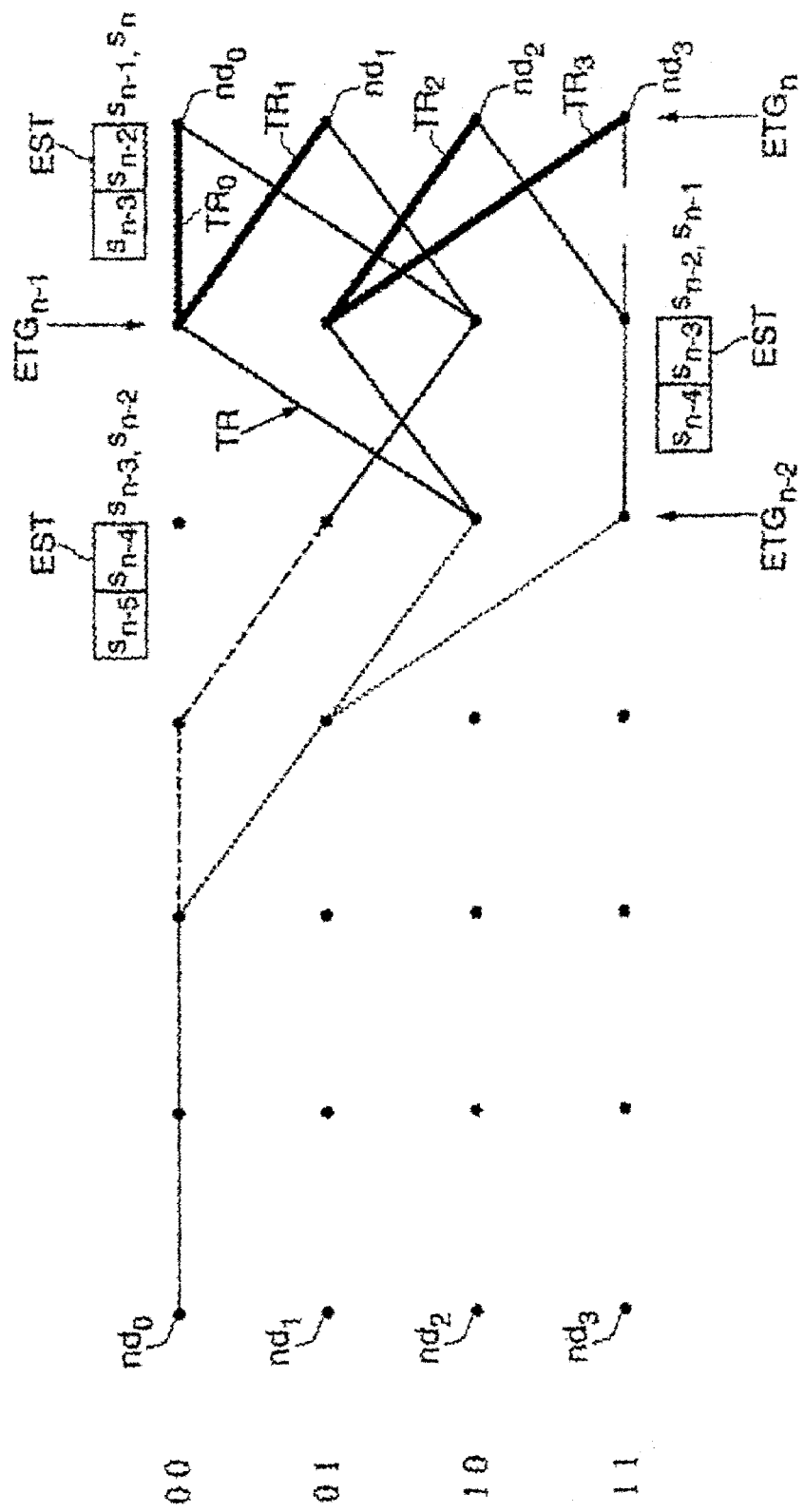
FIG. 27 illustrates a decision taking in a reduced trellis according to the present invention.
Figure 28:
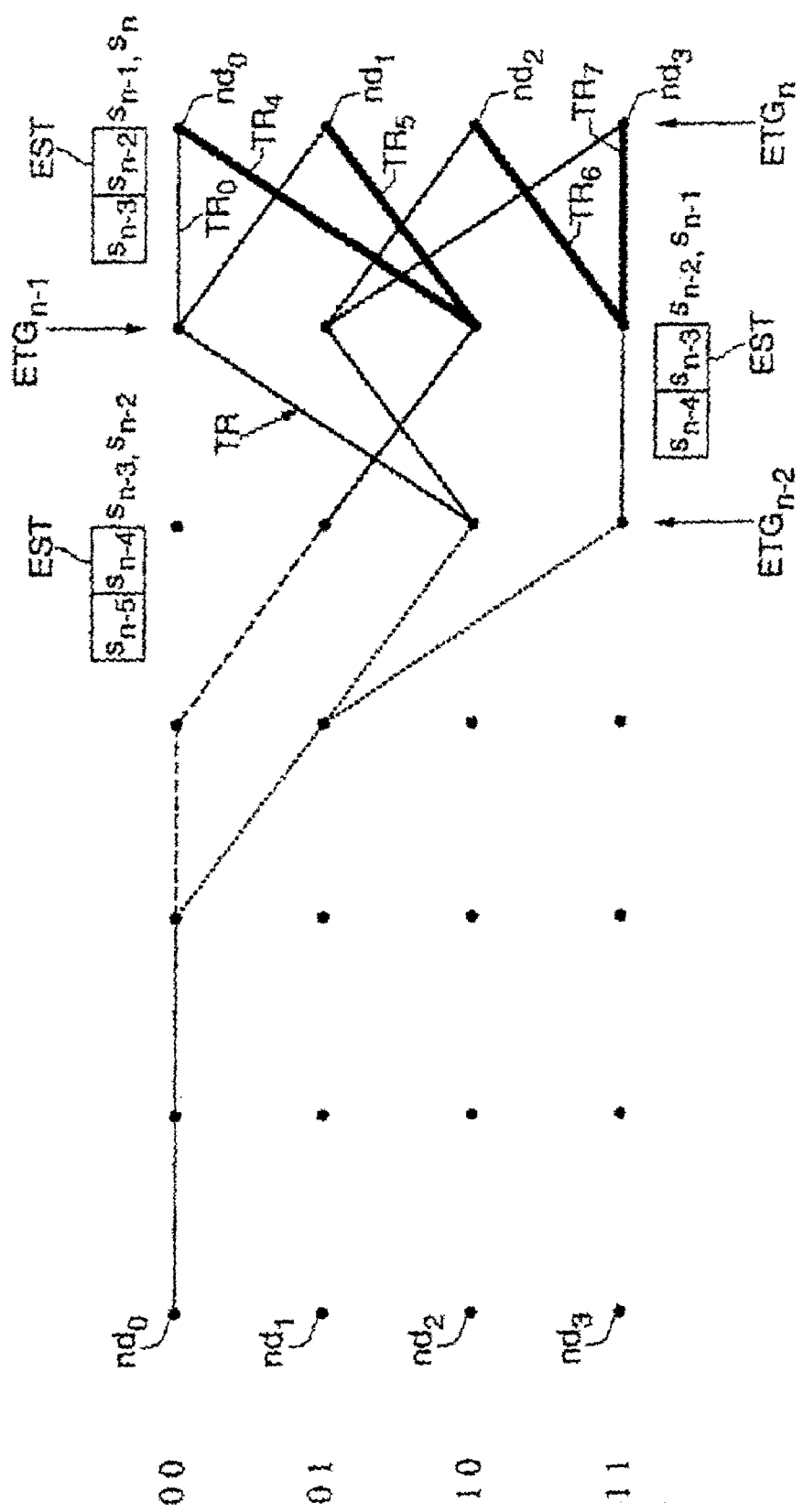
FIG. 28 illustrates a decision taking in a reduced trellis according to the present invention.

The first group corresponding to the value 0 of the symbol of rank n−k (here n−2) is formed of the transitions $TR_0$, $TR_1$, $TR_2$ and $TR_3$ (FIG. 27). The second group, illustrated in FIG. 28, corresponding to the value 1 of the symbol $s_{n-k}$, is formed of the transitions $TR_4$, $TR_5$, $TR_6$ and $TR_7$.

Figure 29:
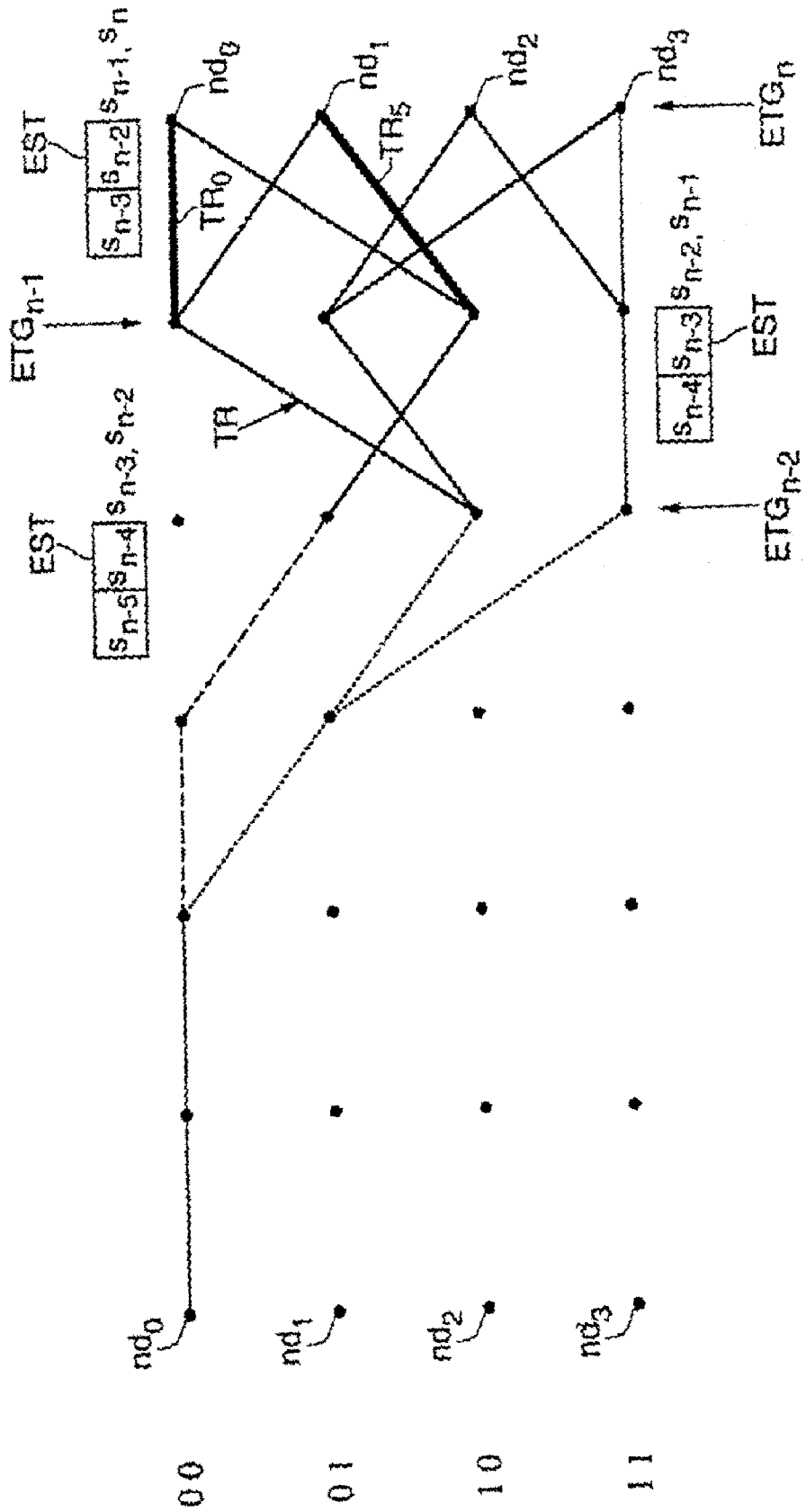
FIG. 29 illustrates a decision taking in a reduced trellis according to the present invention.
Figure 30:
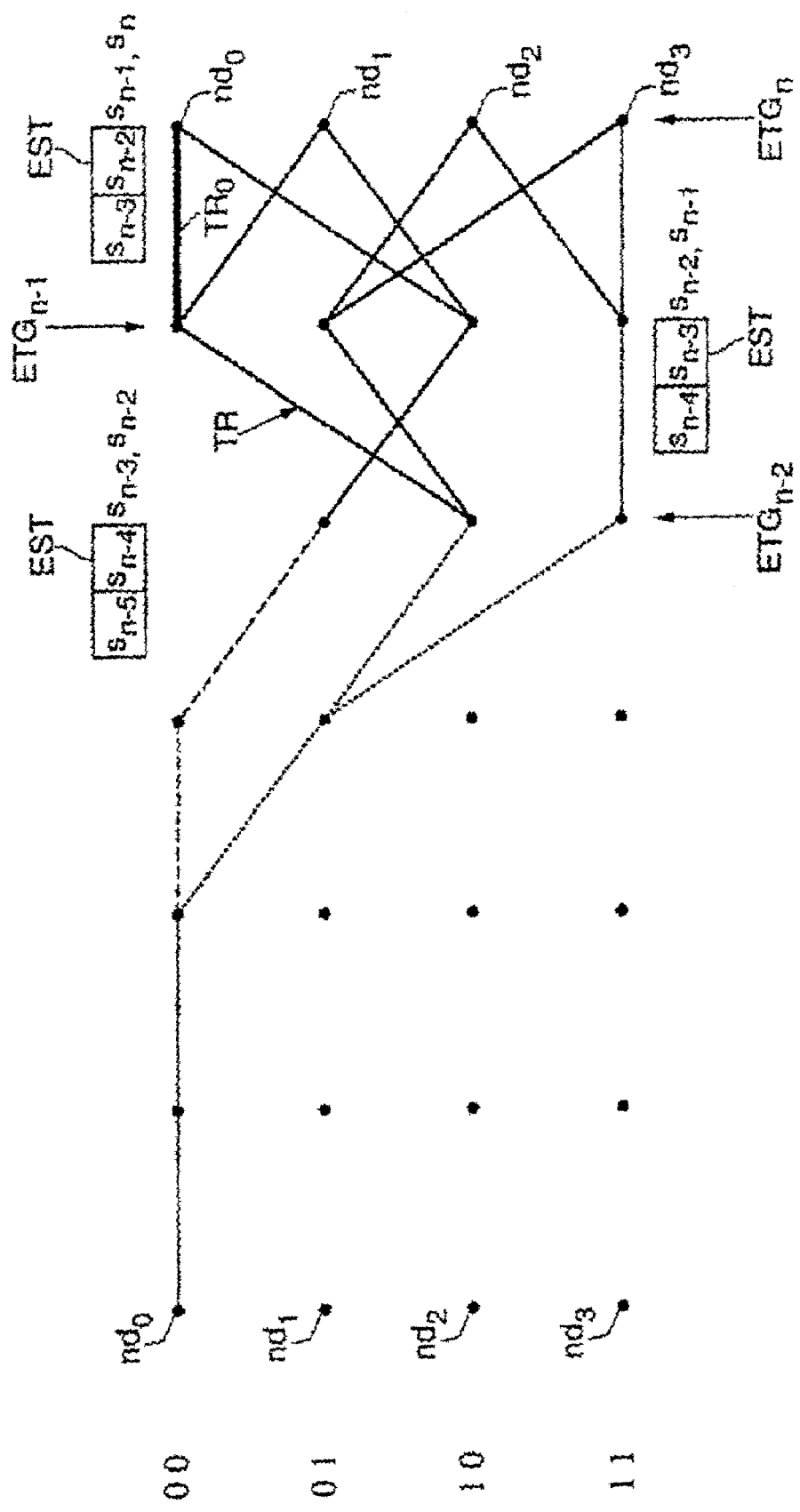
FIG. 30 illustrates a decision taking in a reduced trellis according to the present invention.

Next, in each group, one of the transitions which leads to the state provided with the minimum or extremum aggregate metric, as the case may be, is determined (FIG. 29). It is assumed here that the transitions $TR_0$ and $TR_5$ have been selected. Next, the unique decision regarding the value of the symbol $s_{n-2}$ is taken by detecting the group associated with the extremum of these two extremum aggregate metrics. In FIG. 30 it is assumed that it is the transition $TR_0$ which has been retained and that consequently the value of the symbol $s_{n-2}$ is equal to 0.

Whereas in the embodiment just described, the decision taken regarding the value of the symbol $s_{n-2}$ is different from the four values of the symbols $s_{n-2}$ contained in the four tags EST, and which are used for the progression through the trellis for choosing the surviving path, it is particularly advantageous to use, in another embodiment, the value of the symbol $s_{n-2}$ which was taken during the decision with respect of the calculation of the tags and the progression through the trellis. Indeed, in the preceding variation, it is necessary at each step, to store as many tags as there are states in the trellis. Also, the longer the channel, the larger the tag. This also results in numerous memory accesses, thus requiring durations which may prove to be penalizing.

The embodiment which will now be described makes it possible to remedy this drawback, by proposing a unique tag for all the nodes of a given stage of the trellis. More precisely, it is recalled that the states of the current stage of rank n of the trellis correspond to the assumptions regarding the k symbols of rank n to n−k+1. After having taken the unique decision regarding the symbol of rank n−k, the same tag EST containing the values of the symbols of rank n−k to n−L+2, obtained respectively during L−k−1 successive unique decision takings, is associated with all the states of the current stage $ETG_n$ of the trellis.

The aggregate metric of each state of the stage of rank n of the trellis is then calculated from the following: the transition metric (branch metric) associated with the transition ending up at the state of the stage of rank n and arising from the state of the stage of rank n−1, corresponding to the value of the symbol of rank n−k, contained in the tag; and the aggregate metric associated with the state of the stage of rank n−1 from which the transition arises.

Stated otherwise, referring again to FIG. 30, the decision taking means have decided that the value of the symbol of rank n−k (here n−2) was equal to 0. Consequently, the tag EST assigned to all the states of the stage $ETG_n$ will contain the value of the symbol $s_{n-3}$ resulting from the unique decision taking performed during the preceding step in the trellis, as well as the value of the decision regarding the symbol $s_{n-2}$.

Figure 31:
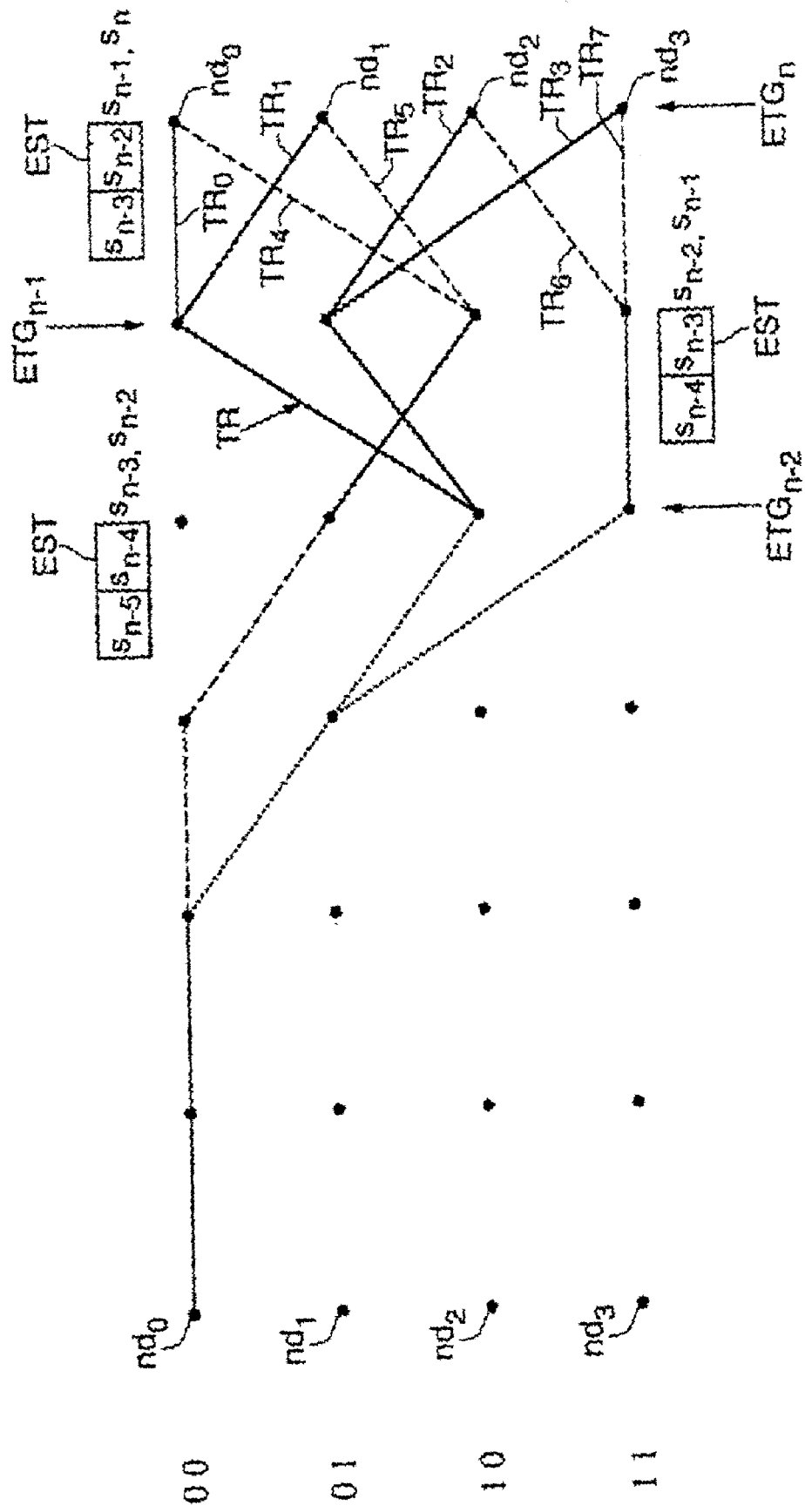
FIG. 31 illustrates another progression through a reduced trellis using the decision taking according to the present invention.

From this it follows, as illustrated in FIG. 31, that at each node of stage $ETG_n$, the choice of the surviving path will be conditioned by the value of the symbol $s_{n-2}$. More precisely, only the transitions $TR_0$, $TR_1$, $TR_2$ and $TR_3$ arising from states $nd_0$ and $nd_1$ corresponding to the value 0 of the symbol $s_{n-2}$ will be selected. The other transitions corresponding to the value 1 of the symbol $s_{n-2}$, namely the transitions $TR_4$, $TR_5$, $TR_6$ and $TR_7$, will not be selected. Also, the new aggregate metrics of the states of stage $ETG_n$ will consequently be calculated from the transitions thus selected. Stated otherwise, the progression through the trellis is conditioned to the successive decision takings regarding the values of the symbols.

The two variations just described with reference to FIG. 26 apply whether the metric used is a Euclidean metric or a modified metric. On the other hand, working with a modified metric affords advantages. By introducing the matched filter, the channel autocorrelation function is introduced. Thereby, the sample of rank n output by the matched filter depends on the symbols transmitted before the symbol of rank n and on the symbols transmitted after the symbol of rank n. Therefore, the modified DFSE algorithm, which operates on a reduced trellis, might be expected to be disturbed. Now, surprisingly it has been observed that this was not or practically not the case with the use of a modified metric.

Furthermore, by working at the output of the matched filter, the phase of the propagation channel need no longer be involved. Thus, whether it is a phase minimum channel or phase maximum channel or whether the phase is anywhere between these two extreme values, the signal is always exactly the same at the output of the matched filter.

Moreover, the modification of the metric to be made in order to take account of the presence of the matched filter also contributes towards simplification. With a metric of the resemblance cue type, certain terms may be precalculated so that the final calculation with respect to the progression through the trellis contains no multiplication (as against two multiplications for the Euclidean metric), thus allowing easier hardware implementation of the algorithm.

The conditioning of the progression through the trellis to the successive decision takings for the values of the symbols, which has just been described with respect to a reduced trellis, could of course be applied equally to a complete trellis.

That which is claimed is:

1. A process for estimating successive values of digital symbols based upon successive values of digital samples, with each symbol having M different possible values and each sample resulting from a combination of at most L successive symbols, the process comprising:

progressing stage-by-stage through a Viterbi trellis with $M^k$ states, with k being less than or equal to L−1 and all the states of all the stages being respectively provided with aggregate metrics;

partitioning into M groups all transitions arriving at the various states of a current stage of the trellis when taking into account a sample of rank n, with each group containing all the transitions arising from the states of a preceding stage which are associated with one of the M possible values of a symbol of rank n−k;

calculating the various aggregate metrics for the various states of the current stage of the trellis, and determining in each group one of the transitions which leads to the state provided with an extremum aggregate metric; and selecting a unique decision regarding the value of the symbol of rank n−k by detecting the group associated with the extremum of M extremum aggregate metrics, the unique decision being provided with a symbol-confidence index formulated from the M extremum aggregate metrics.

2. A process according to claim 1, wherein the aggregate metrics are error information aggregated between observed values and expected values of the samples; and wherein each extremum aggregate metric comprises a minimum aggregate metric.

3. A process according to claim 2, wherein M is equal to 2; and wherein the detecting comprises calculating a difference between two minimum aggregate metrics, and a sign of the difference yields a unique decision regarding the value of the symbol of rank n−k, and an absolute value of the difference yields a value of the symbol-confidence index.

4. A process according to claim 2, wherein M is greater than 2; and wherein the detecting comprises making a first selection of the smallest of the M minimum aggregate metrics; and wherein formulating the symbol-confidence index assigned to the unique decision comprises a second selection from among M−1 remaining minimum aggregate metrics not selected on completion of the first selection of the smallest of the M−1 remaining minimum aggregate metrics, and calculation of a difference between the two minimum aggregate metrics arises respectively from the first and second selections, and a positive value of the difference yields the value of the symbol-confidence index.

5. A process according to claim 1, wherein the aggregate metrics are resemblance information aggregated between observed values and expected values of the samples; and wherein each extremum aggregate metric comprises a maximum aggregate metric.

6. A process according to claim 5, wherein M is equal to 2; and wherein the detecting comprises calculating a difference between two maximum aggregate metrics, and a sign of the difference yields the unique decision regarding the value of the symbol of rank n−k, and an absolute value of the difference yields the value of the symbol-confidence index.

7. A process according to claim 5, wherein M is greater than 2; and wherein the detecting comprises making a first selection of the largest of the M maximum aggregate metrics; and wherein formulating the symbol-confidence index assigned to the unique decision comprises a second selection from among the M−1 remaining maximum aggregate metrics not selected on completion of the first selection, of the largest of the M−1 remaining maximum aggregate metrics, and the calculation of the difference between the two maximum aggregate metrics arises respectively from the first and second selections, and a positive value of the difference yields the value of the symbol-confidence index.

8. A process according to claim 1, wherein each symbol is formed of b bits and M is equal to $2^b$, and a bit-confidence index is formulated for each of the bits of the symbol of rank n−k elected on completion of the unique decision by using an elected symbol and at least one auxiliary symbol formulated from the elected symbol by complementing at least a value of a relevant bit.

9. A process according to claim 8, wherein formulating the bit-confidence index for a relevant bit of the elected symbol comprises;

formulating the at least one auxiliary symbol by complementing the value of the respective relevant bit while leaving unchanged the values of the other bits of the elected symbol;

selecting at least one extremum aggregate metric associated with the group of transitions to which the at least one auxiliary symbol belongs; and determining a difference between the at least one extremum aggregate metric associated with the group of transitions to which the elected symbol belongs and to the at least one extremum aggregate metric associated with the group of transitions to which the at least one auxiliary symbol belongs, and a result of the difference yields the value of the bit-confidence index.

10. A process according to claim 1, wherein the trellis is a reduced trellis with $M^k$ states, with k being less than L−1; and wherein the states of the current stage of rank n of the trellis correspond to the k symbols of rank n to n−k+1, in that after having selected the unique decision regarding the symbol of rank n−k, one tag containing the values of the symbols of rank n−k to n−L+2 respectively obtained upon L−k−1 selections of successive unique decisions is associated with all the states of the current stage of the trellis, and in that the aggregate metric of each state of the stage of rank n of the trellis is calculated from a transition metric associated with the transition ending at the state of the stage of rank n and arising from the state of the stage of rank n−1 corresponding to the value of the symbol of rank n−k, contained in the tag, and from the aggregate metric associated with the state of the stage of rank n−1 from which the transition arises.

11. A process according to claim 1, wherein the stage-by-stage progression through the trellis is conditioned to the selection of successive unique decisions regarding the values of the symbols.

12. A process according to claim 1, wherein the progressing, partitioning, calculating and selecting are stored as instructions on a computer readable medium for execution by a processor.

13. A process for equalizing an information transmission channel having an impulse response with L coefficients, the information transmission channel delivering successive digital samples corresponding to successively transmitted symbols, with each symbol having M different possible values, the process comprising:
estimating successive values of the symbols by progressing stage-by-stage through a Viterbi trellis with $M^k$ states, with k being less than or equal to L−1, and with all the states of all the stages being respectively provided with aggregate metrics;
partitioning into M groups all transitions arriving at the various states of a current stage of the trellis on receipt of a sample of rank n, with each group containing all the transitions arising from the states of a preceding stage which are associated with one of the M possible values of a symbol of rank n−k;
calculating the various aggregate metrics for the various states of a current stage of the trellis;
determining in each group one of the transitions which leads to a state provided with an extremum aggregate metric; and
selecting a unique decision regarding the value of the symbol of rank n−k by detecting the group associated with the extremum of M extremum aggregate metrics, the unique decision being provided with a symbol-confidence index formulated from the M extremum aggregate metrics.

14. A process according to claim 13, wherein the aggregate metrics are error information aggregated between observed values and expected values of the samples; and wherein each extremum aggregate metric comprises a minimum aggregate metric.

15. A process according to claim 14, wherein M is equal to 2; and wherein the detecting comprises calculating a difference between two minimum aggregate metrics, and a sign of the difference yields a unique decision regarding the value of the symbol of rank n−k, and an absolute value of the difference yields a value of the symbol-confidence index.

16. A process according to claim 14, wherein M is greater than 2; and wherein the detecting comprises making a first selection of the smallest of the M minimum aggregate metrics; and wherein formulating the symbol-confidence index assigned to the unique decision comprises a second selection from among M−1 remaining minimum aggregate metrics not selected on completion of the first selection of the smallest of the M−1 remaining minimum aggregate metrics, and calculation of a difference between the two minimum aggregate metrics arises respectively from the first and second selections, and a positive value of the difference yields the value of the symbol-confidence index.

17. A process according to claim 13, wherein the aggregate metrics are resemblance information aggregated between observed values and expected values of the samples; and wherein each extremum aggregate metric comprises a maximum aggregate metric.

18. A process according to claim 17, wherein M is equal to 2; and wherein the detecting comprises calculating a difference between two maximum aggregate metrics comprises calculating a difference between the two maximum aggregate metrics, and a sign of the difference yields the unique decision regarding the value of the symbol of rank n−k, and an absolute value of the difference yields the value of the symbol-confidence index.

19. A process according to claim 17, wherein M is greater than 2; and wherein the detecting comprises making first selection of the largest of the M maximum aggregate metrics; and wherein formulating the symbol-confidence index assigned to the unique decision comprises a second selection from among the M−1 remaining maximum aggregate metrics not selected on completion of the first selection, of the largest of the M−1 remaining maximum aggregate metrics, and a calculation of a difference between the two maximum aggregate metrics arises respectively from the first and second selections, and a positive value of the difference yields the value of the symbol-confidence index.

20. A process according to claim 13, wherein each symbol is formed of b bits and M is equal to $2^b$, and a bit-confidence index is formulated for each of the bits of the symbol of rank n−k elected on completion of the unique decision by using an elected symbol and at least one auxiliary symbol formulated from the elected symbol by complementing at least a value of a relevant bit.

21. A process according to claim 20, wherein formulating the bit-confidence index for a relevant bit of the elected symbol comprises:
formulating the at least one auxiliary symbol by complementing the value of the respective relevant bit while leaving unchanged the values of the other bits of the elected symbol;
selecting at least one extremum aggregate metric associated with the group of transitions to which the at least one auxiliary symbol belongs; and
determining a difference between the at least one extremum aggregate metric associated with the group of transitions to which the elected symbol belongs and to the at least one extremum aggregate metric associated with the group of transitions to which the at least one auxiliary symbol belongs, and a result of the difference yields the value of the bit-confidence index.

22. A process according to claim 13, wherein the trellis is a reduced trellis with $M^k$ states, with k being less than L−1;

and wherein the states of the current stage of rank n of the trellis correspond to the k symbols of rank n to n−k+1, in that after having selected the unique decision regarding the symbol of rank n−k, one tag containing the values of the symbols of rank n−k to n−L+2 respectively obtained upon L−k−1 selections of successive unique decisions is associated with all the states of the current stage of the trellis, and in that the aggregate metric of each state of the stage of rank n of the trellis is calculated from a transition metric associated with the transition ending at the state of the stage of rank n and arising from the state of the stage of rank n−1 corresponding to the value of the symbol of rank n−k, contained in the tag, and from the aggregate metric associated with the state of the stage of rank n−1 from which the transition arises.

23. A process according to claim 22, further comprising filtering the samples received using a filter matched to an impulse response of the transmission channel, and wherein the estimating is performed on the filtered samples.

24. A process according to claim 13, wherein the stage-by-stage progression through the trellis is conditioned to the selection of successive unique decisions regarding the values of the symbols.

25. A process according to claim 13, wherein the estimating, partitioning, calculating, determining and selecting are stored as instructions on a computer readable medium for execution by a processor.

26. A device for estimating successive values of digital symbols, with each symbol having M different possible values, the device comprising:
    reception means for receiving successive values of digital samples, each sample resulting from a combination of at most L successive symbols; and
    estimation means for estimating the successive values of the symbols based upon a stage-by-stage progression through a Viterbi trellis with $M^k$ states, with k being less than or equal to L−1 and all the states of all the stages being respectively provided with aggregate metrics, said estimation means comprising
        partition means for partitioning all the transitions arriving at the various states of a corresponding current stage of the trellis into M groups when taking into account a sample of rank n, each group containing all the transitions arising from the states of a preceding stage associated with one of the M possible values of a symbol of rank n−k,
        calculation means for calculating the various aggregate metrics for the various states of the current stage of the trellis,
        determination means connected to said partition means and to said calculation means for determining in each group one of the transitions which leads to the state provided with an extremum aggregate metric,
        decision selection means connected to said determination means for selecting a unique decision regarding the value of the symbol of rank n−k by detecting the group associated with the extremum of the M extremum aggregate metrics, and
        first formulation means connected to said decision selection means for formulating from the M extremum aggregate metrics a symbol-confidence index assigned to the unique decision.

27. A device according to claim 26, wherein the aggregate metrics are error information aggregated between observed values and expected values of the samples; and wherein each extremum aggregate metric comprises a minimum aggregate metric.

28. A device according to claim 27, wherein M is equal to 2; and wherein said first formulation means comprises a subtracter for calculating a difference between two minimum aggregate metrics, and a sign of the difference yields the unique decision regarding the value of the symbol of rank n−k, and an absolute value of the difference calculated by said subtracter yields the value of the symbol-confidence index.

29. A device according to claim 27, wherein M is greater than 2; and wherein said decision selection means comprises first selection means for performing a first selection of the smallest of the M minimum aggregate metrics; and wherein said first formulation means comprises:
    second selection means for performing a second selection, from among the M−1 minimum aggregate metrics not selected on completion of the first selection, of the smallest of the M−1 remaining minimum aggregate metrics; and
    a subtractor connected to said second selection means for calculating the difference between the two minimum aggregate metrics respectively arising from the first and second selections, and a positive value of the difference yields the value of the symbol-confidence index.

30. A device according to claim 26, wherein the aggregate metrics are resemblance information aggregated between observed values and expected values of the samples; and wherein each extremum aggregate metric comprises a maximum aggregate metric.

31. A device according to claim 30, wherein M is equal to 2; and wherein said first formulation means comprises a subtractor for calculating a difference between two maximum aggregate metrics, and a sign of the difference yields the unique decision regarding the value of the symbol of rank n−k, and an absolute value of the difference calculated by said subtractor yields the value of the symbol-confidence index.

32. A device according to claim 30, wherein M is greater than 2; and wherein said decision selection means comprises first selection means for performing a first selection of the largest of the M maximum aggregate metrics; and wherein said first formulation means comprises:
    second selection means for performing a second selection, from among the M−1 remaining maximum aggregate metrics not selected on completion of the first selection, of the largest of the M−1 remaining maximum aggregate metrics; and
    a subtractor connected to said second selection means for calculating a difference between the two maximum aggregate metrics respectively arising from the first and second selections, and a positive value of the difference yields the value of the symbol-confidence index.

33. A device according to claim 26, wherein each symbol is formed of b bits, with M being equal to $2^b$; and wherein said first formulation means further comprises second formulation means for formulating a bit-confidence index for each of the bits of the symbol of rank n−k elected on completion of the unique decision, by using the elected symbol and at least one auxiliary symbol formulated from the elected symbol by complementing at least a value of a relevant bit.

34. A device according to claim 33, wherein said second formulation means comprises:
    auxiliary formulation means for formulating the at least one auxiliary symbol by complementing the respective value of the relevant bit while leaving unchanged the values of the other bits of the elected symbol;

auxiliary selection means connected to said auxiliary formulation means for selecting the at least one extremum aggregate metric associated with the group of transitions to which the auxiliary symbol belongs; and an auxiliary subtractor connected to said auxiliary selection means for calculating the difference between the at least one extremum aggregate metric associated with the group of transitions to which the elected symbol belongs and the at least one extremum aggregate metric associated with the group of transitions to which the auxiliary symbol belongs, and a result of the difference yields the value of the bit confidence index.

35. A device according to claim 26, wherein the trellis is a reduced trellis with $M^k$ states, with k being less than L−1; and wherein the states of the current stage of rank n of the trellis correspond to assumptions regarding the k symbols of rank n to n−k+1, in that said decision selection means selects a unique decision regarding the symbol of rank n−k, in that said estimation means associates a same tag containing the values of the symbols of rank n−k to n−L+2 respectively obtained upon L−k−1 selections of successive unique decisions delivered by said decision selection means with all the states of the current stage of the trellis, and said calculation means calculates the aggregate metric of each state of the stage of rank n of the trellis from the transition metric associated with the transition ending up at the state of the stage of rank n and arising from the state of the stage of rank n−1 corresponding to the value of the symbol of rank n−k contained in the tag, and from the aggregate metric associated with the state of the stage of rank n−1 from which the transition arises.

36. A device according to claim 26, wherein said reception means and said estimation means are configured as a digital receiver for a cellular telephone.

37. A device for equalizing an information transmission channel, the device comprising:

a memory for storing L coefficients representative of an impulse response of the transmission channel;

reception means for receiving successive digital samples corresponding to successively transmitted symbols, each symbol having M different possible values; and an equalization circuit comprising estimation means for estimating the successive values of the symbols based upon a stage-by-stage progression through a Viterbi trellis with $M^k$ states, with k being less than or equal to L−1 and all the states of all the stages being respectively provided with aggregate metrics, said estimation means comprising partition means for partitioning all transitions arriving at the various states of a corresponding current stage of the trellis into M groups on receipt of a sample of rank n, each group containing all the transitions arising from the states of a preceding stage which are associated with one of the M possible values of the symbol of rank n−k, calculation means for calculating the various aggregate metrics for the various states of the current stage of the trellis, determination means connected to said partition means and to said calculation means for determining in each group one of the transitions which leads to the state provided with an extremum aggregate metric, decision selection means connected to said determination means for selecting a unique decision regarding the value of the symbol of rank n−k by detecting the group associated with an extremum of M extremum aggregate metrics, and first formulation means connected to said decision selection means for formulating from the M extremum aggregate metrics a symbol-confidence index assigned to said unique decision.

38. A device according to claim 37, wherein the aggregate metrics are error information aggregated between observed values and expected values of the samples; and wherein each extremum aggregate metric comprises a minimum aggregate metric.

39. A device according to claim 38, wherein M is equal to 2; and wherein said first formulation means comprises a subtractor for calculating a difference between two minimum aggregate metrics, and a sign of the difference yields the unique decision regarding the value of the symbol of rank n−k, and an absolute value of the difference calculated by said subtractor yields the value of the symbol-confidence index.

40. A device according to claim 38, wherein M is greater than 2; and wherein said decision selection means comprises first selection means for performing a first selection of the smallest of the M minimum aggregate metrics; and wherein said first formulation means comprises:

second selection means for performing a second selection, from among the M−1 minimum aggregate metrics not selected on completion of the first selection, of the smallest of the M−1 remaining minimum aggregate metrics; and a subtractor connected to said second selection means for calculating the difference between the two minimum aggregate metrics respectively arising from the first and second selections, and a positive value of the difference yields the value of the symbol-confidence index.

41. A device according to claim 37, wherein the aggregate metrics are resemblance information aggregated between observed values and expected values of the samples; and wherein each extremum aggregate metric comprises a maximum aggregate metric.

42. A device according to claim 41, wherein M is equal to 2; and wherein said first formulation means comprises a subtractor for calculating a difference between two maximum aggregate metrics, and a sign of the difference yields the unique decision regarding the value of the symbol of rank n−k, and an absolute value of the difference calculated by said subtractor yields the value of the symbol-confidence index.

43. A device according to claim 41, wherein M is greater than 2; and wherein said decision selection means comprises first selection means for performing a first selection of the largest of the M maximum aggregate metrics; and wherein said first formulation means comprises:

second selection means for performing a second selection, from among the M−1 remaining maximum aggregate metrics not selected on completion of the first selection, of the largest of the M−1 remaining maximum aggregate metrics; and a subtractor connected to said second selection means for calculating a difference between the two maximum aggregate metrics respectively arising from the first and second selections, and a positive value of the difference yields the value of the symbol-confidence index.

44. A device according to claim 37, wherein each symbol is formed of b bits, with M being equal to $2^b$; and wherein said first formulation means further comprises second formulation means for formulating a bit-confidence index for each of the bits of the symbol of rank n−k elected on completion of the unique decision by using the elected symbol and at least one auxiliary symbol formulated from the elected symbol by complementing at least a value of a relevant bit.

45. A device according to claim 44, wherein said second formulation means comprises:
 auxiliary formulation means for formulating at least one single auxiliary symbol by complementing the respective value of the relevant bit while leaving unchanged the values of the other bits of the elected symbol;
 auxiliary selection means connected to said auxiliary formulation means for selecting the at least one extremum aggregate metric associated with the group of transitions to which the auxiliary symbol belongs; and
 an auxiliary subtractor connected to said auxiliary selection means for calculating the difference between the at least one extremum aggregate metric associated with the group of transitions to which the elected symbol belongs and the at least one extremum aggregate metric associated with the group of transitions to which the auxiliary symbol belongs, and a result of the difference yields the value of the bit-confidence index.

46. A device according to claim 37, wherein the trellis is a reduced trellis with $M^k$ states, with k being less than L−1; and wherein the states of the current stage of rank n of the trellis correspond to assumptions regarding the k symbols of rank n to n−k+1, in that said decision selection means selects a unique decision regarding the symbol of rank n−k, in that said estimation means associates a same tag containing the values of the symbols of rank n−k to n−L+2 respectively obtained upon L−k−1 selections of successive unique decisions delivered by said decision selection means with all the states of the current stage of the trellis, and said calculation means calculates the aggregate metric of each state of the stage of rank n of the trellis from the transition metric associated with the transition ending up at the state of the stage of rank n and arising from the state of the stage of rank n−1 corresponding to the value of the symbol of rank n−k contained in the tag, and from the aggregate metric associated with the state of the stage of rank n−1 from which the transition arises.

47. A device according to claim 45, wherein said equalization circuit further comprises a filter matched to the impulse response of the transmission channel.

48. A device according to claim 37, wherein said memory, reception means and said equalization circuit are configured as a digital receiver for a cellular telephone.

49. A device for estimating successive values of digital symbols, with each symbol having M different possible values, the device comprising:
 a reception circuit for receiving successive values of digital samples, each sample resulting from a combination of at most L successive symbols; and
 an estimation circuit for estimating the successive values of the symbols based upon a stage-by-stage progression through a Viterbi trellis with $M^k$ states, with k being less than or equal to L−1 and all the states of all the stages being respectively provided with aggregate metrics, said estimation circuit comprising
 a partition circuit for partitioning all the transitions arriving at the various states of a corresponding current stage of the trellis into M groups when taking into account a sample of rank n, each group containing all the transitions arising from the states of a preceding stage associated with one of the M possible values of a symbol of rank n−k,
 a calculation circuit for calculating the various aggregate metrics for the various states of the current stage of the trellis,
 a determination circuit connected to said partition circuit and to said calculation circuit for determining in each group one of the transitions which leads to the state provided with an extremum aggregate metric,
 a decision selection circuit connected to said determination circuit for selecting a unique decision regarding the value of the symbol of rank n−k by detecting the group associated with the extremum of M extremum aggregate metrics, and
 a first formulation circuit connected to said decision selection circuit for formulating from the M extremum aggregate metrics a symbol-confidence index assigned to the unique decision.

50. A device according to claim 49, wherein the aggregate metrics are error information aggregated between observed values and expected values of the samples; and wherein each extremum aggregate metric comprises a minimum aggregate metric.

51. A device according to claim 49, wherein the aggregate metrics are resemblance information aggregated between observed values and expected values of the samples; and wherein each extremum aggregate metric comprises a maximum aggregate metric.

52. A device according to claim 49, wherein each symbol is formed of b bits, with M being equal to $2^b$; and wherein said first formulation circuit further comprises a second formulation circuit for formulating a bit-confidence index for each of the bits of the symbol of rank n−k elected on completion of the unique decision, by using the elected symbol and at least one auxiliary symbol formulated from the elected symbol by complementing at least a value of a relevant bit.

53. A device according to claim 49, wherein the trellis is a reduced trellis with $M^k$ states, with k being less than L−1.

54. A device according to claim 49, wherein said reception circuit and said estimation circuit are configured as a digital receiver for a cellular telephone.

55. A device for equalizing an information transmission channel, the device comprising:
 a memory for storing L coefficients representative of an impulse response of the transmission channel;
 a reception circuit for receiving successive digital samples corresponding to successively transmitted symbols, each symbol having M different possible values; and
 an equalization circuit comprising an estimation circuit for estimating the successive values of the symbols based upon a stage-by-stage progression through a Viterbi trellis with $M^k$ states, with k being less than or equal to L−1 and all the states of all the stages being respectively provided with aggregate metrics, said estimation circuit comprising
 a partition circuit for partitioning all transitions arriving at the various states of a corresponding current stage of the trellis into M groups on receipt of a sample of rank n, each group containing all the transitions arising from the states of a preceding stage which are associated with one of the M possible values of the symbol of rank n−k,
 a calculation circuit for calculating the various aggregate metrics for the various states of the current stage of the trellis,
 a determination circuit connected to said partition circuit and to said calculation circuit for determining in each group one of the transitions which leads to the state provided with an extremum aggregate metric,
 a decision selection circuit connected to said determination circuit for selecting a unique decision regarding the value of the symbol of rank n−k by detecting the group associated with an extremum of M extremum aggregate metrics, and a first formulation circuit connected to said decision selection circuit for formulating from the M extremum aggregate metrics a symbol-confidence index, assigned to said unique decision.

56. A device according to claim 55, wherein the aggregate metrics are error information aggregated between observed values and expected values of the samples; and wherein each extremum aggregate metric comprises a minimum aggregate metric.

57. A device according to claim 55, wherein the aggregate metrics are resemblance information aggregated between observed values and expected values of the samples; and wherein each extremum aggregate metric comprises a maximum aggregate metric.

58. A device according to claim 55, wherein each symbol is formed of b bits, with M being equal to $2^b$; and wherein said first formulation circuit further comprises a second formulation circuit for formulating a bit-confidence index for each of the bits of the symbol of rank n–k elected on completion of the unique decision, by using the elected symbol and at least one auxiliary symbol formulated from the elected symbol by complementing at least a value of a relevant bit.

59. A device according to claim 55, wherein the trellis is a reduced trellis with $M^k$ states, with k being less than L–1.

60. A device according to claim 55, wherein said memory, reception circuit and said equalization circuit are configured as a digital receiver for a cellular telephone.

* * * * *

UNITED STATES PATENT AND TRADEMARK OFFICE
CERTIFICATE OF CORRECTION

PATENT NO. : 7,054,392 B2
APPLICATION NO. : 10/006995
DATED : May 30, 2006
INVENTOR(S) : Chappaz It is certified that error appears in the above-identified patent and that said Letters Patent is hereby corrected as shown below:

Delete Title page illustrating a figure, and substitute therefor, new Title page illustrating a figure. (attached)

Sheet 8 of 31     Delete: "Current drawing"
                  Insert: --

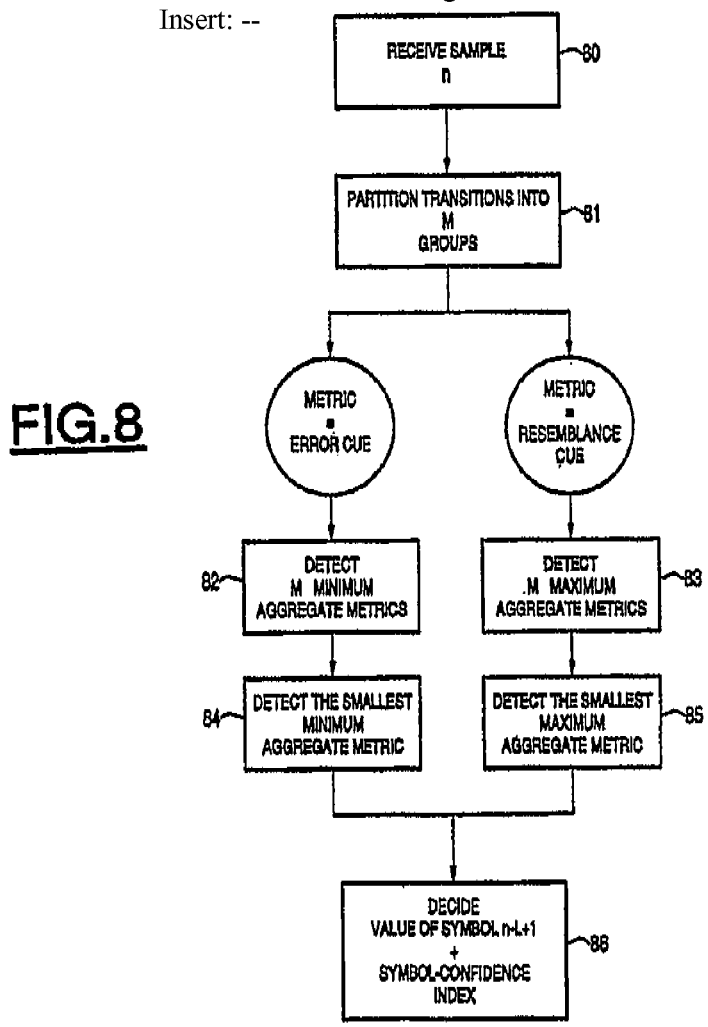

--

UNITED STATES PATENT AND TRADEMARK OFFICE
CERTIFICATE OF CORRECTION

PATENT NO. : 7,054,392 B2
APPLICATION NO. : 10/006995
DATED : May 30, 2006
INVENTOR(S) : Chappaz It is certified that error appears in the above-identified patent and that said Letters Patent is hereby corrected as shown below:

Sheet 13 of 31      Delete: "Current drawing"
                    Insert: --

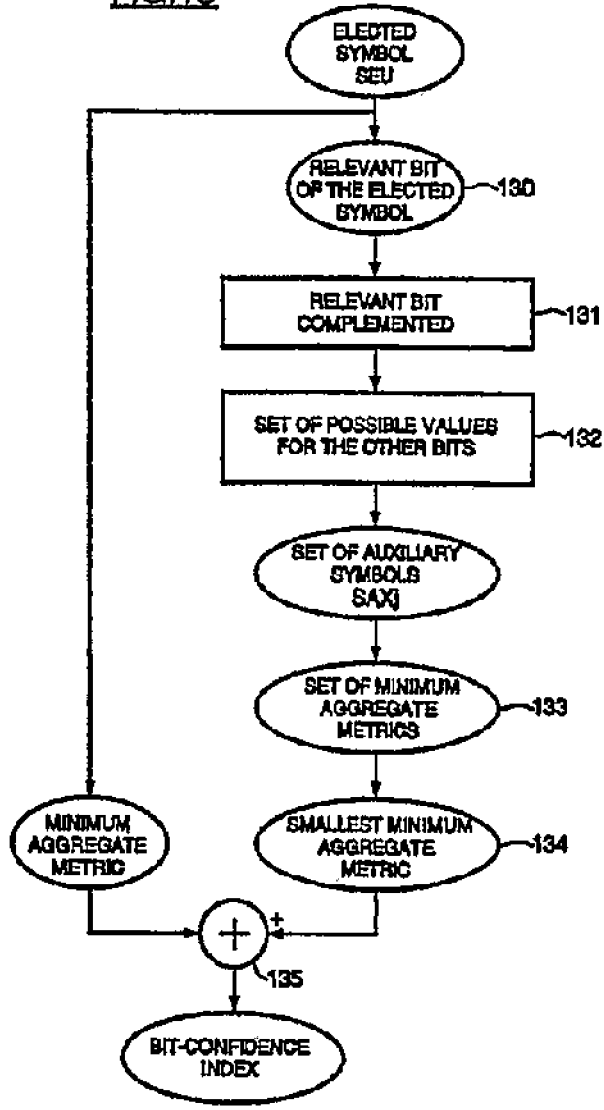

--

UNITED STATES PATENT AND TRADEMARK OFFICE
CERTIFICATE OF CORRECTION

PATENT NO. : 7,054,392 B2
APPLICATION NO. : 10/006995
DATED : May 30, 2006
INVENTOR(S) : Chappaz It is certified that error appears in the above-identified patent and that said Letters Patent is hereby corrected as shown below:

Sheet 14 of 31    Delete: "Current drawing"
Insert: --

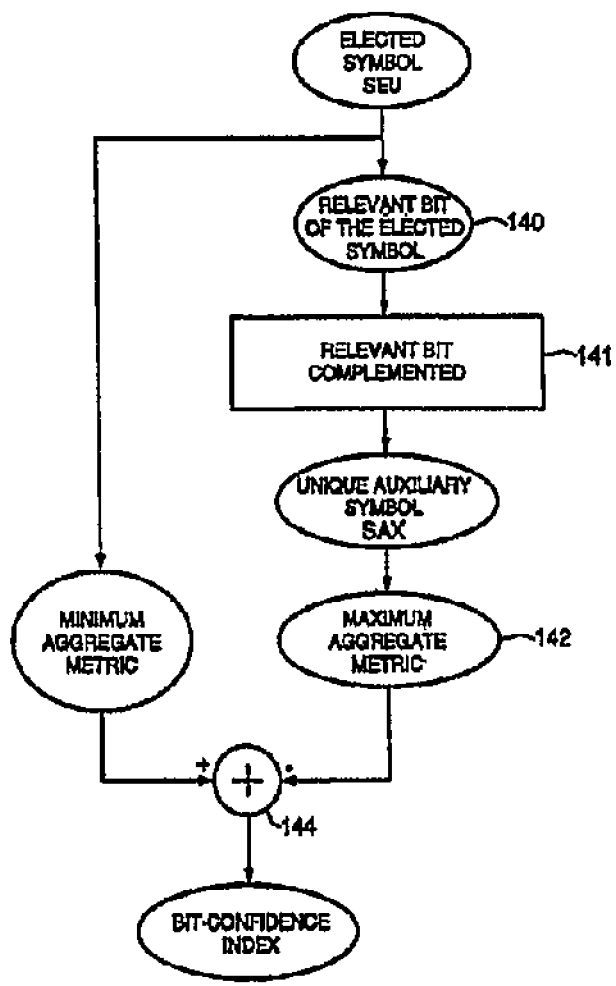

--

UNITED STATES PATENT AND TRADEMARK OFFICE
CERTIFICATE OF CORRECTION

PATENT NO. : 7,054,392 B2  Page 4 of 6
APPLICATION NO. : 10/006995
DATED : May 30, 2006
INVENTOR(S) : Chappaz It is certified that error appears in the above-identified patent and that said Letters Patent is hereby corrected as shown below:

Sheet 15 of 31     Delete: "Current drawing"
                   Insert: --

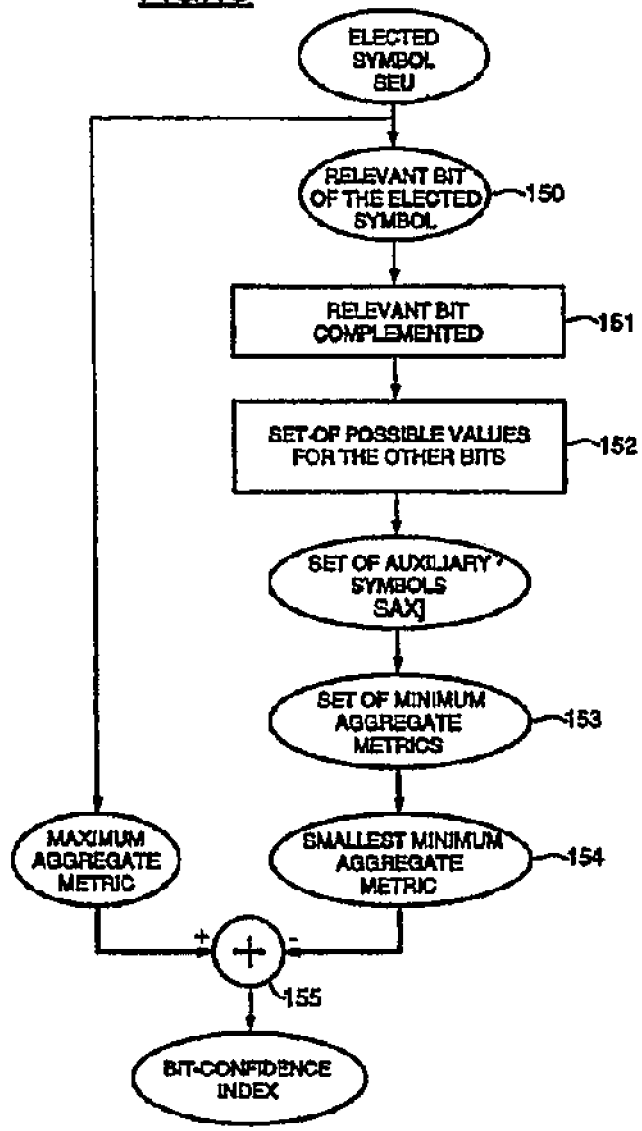

--

UNITED STATES PATENT AND TRADEMARK OFFICE
CERTIFICATE OF CORRECTION

PATENT NO. : 7,054,392 B2
APPLICATION NO. : 10/006995
DATED : May 30, 2006
INVENTOR(S) : Chappaz It is certified that error appears in the above-identified patent and that said Letters Patent is hereby corrected as shown below:

| | |
|---|---|
| Column 13, Line 24 | Delete: "resemblance, information"<br>Insert: -- resemblance information -- |
| Column 14, Line 17 | Delete: "ETGN"<br>Insert: -- $ETG_n$ -- |
| Column 15, Line 54 | Delete: "SELL"<br>Insert: -- SEL1 -- |
| Column 15, Line 56 | Delete "MO"<br>Insert: -- M0 -- |
| Column 15, Line 67 | Delete: "SELL"<br>Insert: -- SEL1 -- |
| Column 30, Line 64 | Delete: "decision by"<br>Insert: -- decision, by -- |
| Column 31, Line 38 | Delete: "45"<br>Insert: -- 46 -- |

Signed and Sealed this

Thirteenth Day of March, 2007

JON W. DUDAS
*Director of the United States Patent and Trademark Office*

(12) United States Patent
Chappaz

(10) Patent No.: US 7,054,392 B2
(45) Date of Patent: May 30, 2006

(54) PROCESS AND DEVICE FOR ESTIMATING THE SUCCESSIVE VALUES OF DIGITAL SYMBOLS, IN PARTICULAR FOR THE EQUALIZATION OF AN INFORMATION TRANSMISSION CHANNEL IN MOBILE TELEPHONY

(75) Inventor: David Chappaz, Saint Julien en Genevois (FR)

(73) Assignee: STMicroelectronics N.V., Amsterdam (NL)

(*) Notice: Subject to any disclaimer, the term of this patent is extended or adjusted under 35 U.S.C. 154(b) by 792 days.

(21) Appl. No.: 10/006,995

(22) Filed: Dec. 3, 2001

(65) Prior Publication Data

US 2002/0126775 A1 Sep. 12, 2002

(30) Foreign Application Priority Data

Dec. 4, 2000 (EP) .................. 00125395
May 29, 2001 (EP) .................. 01112095

(51) Int. Cl.
*H03D 1/00* (2006.01)
*H04L 27/06* (2006.01)

(52) U.S. Cl. .............. 375/341; 375/262; 375/265; 714/792; 714/795; 714/796

(58) Field of Classification Search ........ 375/229–233, 375/262, 265, 285, 227, 341, 346, 350; 708/300, 708/319–323; 714/792, 795, 796
See application file for complete search history.

(56) References Cited

U.S. PATENT DOCUMENTS

| | | | |
|---|---|---|---|
| 5,144,644 A | 9/1992 | Borth | 375/96 |
| 5,375,129 A | 12/1994 | Cooper | 371/43 |
| 6,347,125 B1* | 2/2002 | Dent | 375/341 |
| 6,622,283 B1* | 9/2003 | Cohen | 714/794 |
| 6,707,849 B1* | 3/2004 | Zangi et al. | 375/233 |
| 6,829,297 B1* | 12/2004 | Xia et al. | 375/232 |

FOREIGN PATENT DOCUMENTS

EP 0858195 8/1998

OTHER PUBLICATIONS

Mueller et al., "Reduced-State Soft-Output Trellis-Equalization Incorporating Soft Feedback", Global Telecommunications Conference (Globecom), US, New York, IEEE, Nov. 18, 1996, pp. 95-100, XP000742133.

* cited by examiner

*Primary Examiner*—Jean B. Corrielus
(74) *Attorney, Agent, or Firm*—Lisa K. Jorgenson; Allen, Dyer, Doppelt, Milbrath & Gilchrist, P.A.

(57) ABSTRACT

A process for estimating successive values of digital symbols which can each take M different possible values, on the basis of the successive values of digital samples each of which results from the combination of at most L successive symbols. This process includes a stage by stage progression through a trellis of the Viterbi type with $M^k$ states, with k being less than or equal to L−1. All the stages are respectively provided with aggregate metrics.

60 Claims, 31 Drawing Sheets

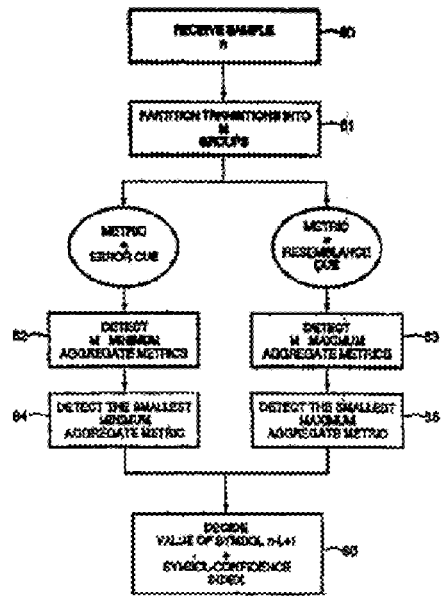

UNITED STATES PATENT AND TRADEMARK OFFICE
CERTIFICATE OF CORRECTION

PATENT NO. : 7,054,392 B2 Page 1 of 1
APPLICATION NO. : 10/006995
DATED : May 30, 2006
INVENTOR(S) : David Chappaz It is certified that error appears in the above-identified patent and that said Letters Patent is hereby corrected as shown below:

Cover Page (54)   Delete: "Process and Device for Estimating the Successive values .........Telephony"

Insert: -- Process and Device for Estimating the Successive Values of Digital Symbols of An Information Transmission Channel --

Signed and Sealed this

Sixteenth Day of October, 2007

JON W. DUDAS
*Director of the United States Patent and Trademark Office*